US006992897B2

(12) United States Patent
Shimada et al.

(10) Patent No.: US 6,992,897 B2
(45) Date of Patent: Jan. 31, 2006

(54) ELECTRONIC APPARATUS AND INFORMATION PROCESSING APPARATUS

(75) Inventors: Tsutomu Shimada, Tokyo (JP); Hideaki Kajihara, Kanagawa (JP)

(73) Assignee: Canon Kabushiki Kaisha, (JP)

( * ) Notice: Subject to any disclaimer, the term of this patent is extended or adjusted under 35 U.S.C. 154(b) by 0 days.

(21) Appl. No.: 10/636,911

(22) Filed: Aug. 7, 2003

(65) Prior Publication Data

US 2005/0030721 A1    Feb. 10, 2005

(30) Foreign Application Priority Data

Aug. 9, 2002  (JP)  .............................. 2002-233118

(51) Int. Cl.
H05K 5/00        (2006.01)
(52) U.S. Cl. .................. 361/726; 361/685; 312/223.1; 312/223.2; 439/162
(58) Field of Classification Search ........ 361/683–686, 361/724–734, 740, 752, 754, 759; 710/303, 710/304; 312/223.1, 223.2, 332.1, 333; 439/152–160
See application file for complete search history.

(56) References Cited

U.S. PATENT DOCUMENTS 5,886,869 A * 3/1999 Fussell et al. ............... 361/685
6,121,967 A * 9/2000 Foster et al. ................ 715/772
6,252,514 B1 * 6/2001 Nolan et al. ............. 340/686.4
6,774,808 B1 * 8/2004 Hibbs et al. ............. 340/686.4

* cited by examiner

*Primary Examiner*—Lynn Feild
*Assistant Examiner*—Anthony Q. Edwards
(74) *Attorney, Agent, or Firm*—Rossi, Kimms & McDowell, LLP

(57) ABSTRACT

There is provided an electronic apparatus that can solve the problem with the prior art that a removable electronic device is removed while the removable electronic device is in operation, leading to unfavorable results. A disk unit is removably attached to the main body of the electronic apparatus and receives at least one removable hard disk as a removable electronic device removably attached thereto. A locking mechanism locks together the disk unit and the main body. A CPU controls the locking mechanism to inhibit the disk unit and the main body from being locked together while the removable hard disk is in operation.

16 Claims, 44 Drawing Sheets

ELECTRONIC APPARATUS AND INFORMATION PROCESSING APPARATUS

BACKGROUND OF THE INVENTION

1. Field of the Invention

The present invention relates to an electronic apparatus and an information processing apparatus which enable a user to easily and safely remove a removable electronic device, such as a modular removable hard disk, from the apparatus or replace such a device with another device.

2. Description of the Related Art

In recent years, with the advent of the Internet and e mails transmitted and received via the Internet, personal computers have become widely diffused at a rapidly increasing rate as a means for accessing the Internet and for transmitting and receiving e mails, as well as a means for sharing information and improving productivity in offices. On the other hand, manufacturers of personal computers have had to manufacture many different models in order to accommodate the diversifying user needs. Furthermore, electronic devices, such as hard disks and CD-ROM drives that are used in personal computers, are upgraded constantly and can quickly become outdated. For these reasons, removable hard disks, which can be removed from personal computers, have been proposed. Furthermore, modular electronic devices have been proposed for use in personal computers, so that the users would be able to easily replace such modular electronic devices.

Such a prior art technology, however, faces a problem. That is, with a modular electronic device such as a hard disk, which is designed to allow a user to easily remove the electronic device from a personal computer and replace it with another electronic device, the user, for example, may inadvertently remove the hard disk from the personal computer while the hard disk is in operation, which may lead to unfavorable results.

SUMMARY OF THE INVENTION

It is an object of the present invention to provide an electronic apparatus and an information processing apparatus that can solve the problem with the prior art that a removable electronic device is removed while the removable electronic device is in operation, leading to unfavorable results.

To attain the above object, in a first aspect of the present invention, there is provided an electronic apparatus which comprises a main body, a receiving unit that is removably attached to the main body and receives at least one removable electronic device removably attached thereto, a locking device that locks together the receiving unit and the main body, and a controller that controls the locking device to inhibit the receiving unit and the main body from being released from a state in which they are locked together while the removable electronic device is in operation.

According to this construction, the controller of the electronic apparatus controls the locking device to inhibit the receiving unit and the main body from being locked together while the removable electronic device is in operation. As a result, it is possible to solve the problem with the prior art that a removable electronic device is removed while the removable electronic device is in operation, which leads to unfavorable results. Further, the electronic apparatus according to the first aspect is simple in construction and flexible in function.

Preferably, the electronic apparatus comprises an electronic device removing device that removes the removable electronic device from the receiving unit, and the controller controls the electronic device removing device to inhibit the removable electronic device from being removed from the receiving unit while the removable electronic device is in operation. As a result, the above described effect can be surely and more effectively provided.

Preferably, the electronic apparatus comprises a connector unit provided in the main body, the receiving unit is removably attached to the connector unit, the locking device locks together the receiving unit and the connector unit, and the controller controls the locking device to inhibit the receiving unit from being removed from the connector unit together while the removable electronic device is in operation. As a result, the receiving unit cannot be inadvertently removed from the connector unit.

More preferably, the receiving unit has formed therein at least one recess at such a location that the recess is hidden inside the main body when the receiving unit is attached to the connector unit, and is exposed externally when the receiving unit is removed from the connector unit. As a result, the user can easily carry the receiving unit by hand when the disk unit 5 is removed from the connector unit, thus facilitating handling of the receiving unit.

More preferably, the locking device comprises a locking mechanism that locks together the connector unit and the receiving unit when the receiving unit is attached to the connector unit, the locking mechanism being responsive to a lock release command from the controller, for releasing locking of the connector unit and the receiving unit. As a result, the receiving unit can be prevented from being inadvertently removed from the connector unit in the same manner as described above.

More preferably, the electronic apparatus comprises a unit removing device that is responsive to a removal command from the controller, for removing the receiving unit from the connector unit, when the receiving unit is attached to the connector unit. As a result, the receiving unit can be prevented from being inadvertently removed from the connector unit in the same manner as described above.

Still more preferably, the controller controls the unit removing device to inhibit the receiving unit from being removed from the receiving unit while the removable electronic device is operation. As a result, the receiving unit can be prevented from being inadvertently removed from the connector unit in the same manner as described above.

Still more preferably, the electronic apparatus comprises a single driver that drives the locking device and the unit removing device, that is, a single driver is shared by the locking device and the unit removing device. As a result, the locking device and the ejection device can be realized without increasing the number of component parts.

More preferably, the removable electronic device is configured such that the removable electronic device can be removed from the receiving unit when the receiving unit is removed from the connector unit. As a result, the removable hard disk can be safely exchanged.

More preferably, the removable electronic device comprises a plurality of removable electronic devices of the same type or of different types. As a result, the electronic apparatus according to the first aspect is flexible in function.

Still more preferably, the electronic apparatus comprises a plurality of electronic device removing devices that are provided in association with respective ones of the plurality of removable electronic devices, for removing the respective removable electronic devices from the receiving unit, and the controller controls any of the removable electronic device removing devices to enable a corresponding one of the removable electronic devices that is not in operation to be removed from the receiving unit. As a result, the removable electronic devices can be safely exchanged.

Still more preferably, the electronic apparatus comprises a display device that displays an indication as to which of the plurality of removable electronic devices attached to the receiving unit has failed in a case where any of the removable electronic devices fails, and the display device continues displaying the indication even after the receiving unit is removed from the connector unit. As a result, the user can immediately determine which of the removable electronic device has failed.

Still more preferably, the electronic apparatus comprises a plurality of electronic device removing devices that are provided in association with respective ones of the plurality of removable electronic devices, for removing the respective removable electronic devices from the receiving unit, and the controller issues a removal command to any of the removable electronic device removing device corresponding to any of the removable electronic devices that has failed, for removing the failed removable electronic device from the receiving unit. As a result, there is no need to manually remove the failed removable hard electronic device, thus improving the usability.

Still more preferably, the electronic apparatus comprises a single driver that drives the removable electronic device removing devices and the display device, that is, a single driver is shared by the removable electronic device removing devices and the display device. As a result, the failure indication for the failed removable electronic device can be realized without increasing the number of component parts.

More preferably, the removable electronic device is positioned such that the outer surfaces thereof lie inwardly of the outer surface of the receiving unit on a side thereof at which the removable electronic devices are attached to the receiving unit. As a result, the user cannot forcibly pull out the removable electronic device to impair the same.

To attain the above object, in a second aspect of the present invention, there is provided an information processing apparatus that comprises the electronic apparatus according to the first aspect.

According to this construction, as is the case with the electronic apparatus according to the first aspect, it is possible to solve the problem with the prior art that a removable electronic device is removed while the removable electronic device is in operation, which leads to unfavorable results. Further, the information processing apparatus according to the second aspect is simple in construction and flexible in function.

The above and other objects, features, and advantages of the invention will become more apparent from the following detailed description taken in conjunction with the accompanying drawings.

DETAILED DESCRIPTION OF THE PREFERRED EMBODIMENTS

The present invention will now be described in detail below with reference to the accompanying drawings showing preferred embodiments thereof.

Figure 1:
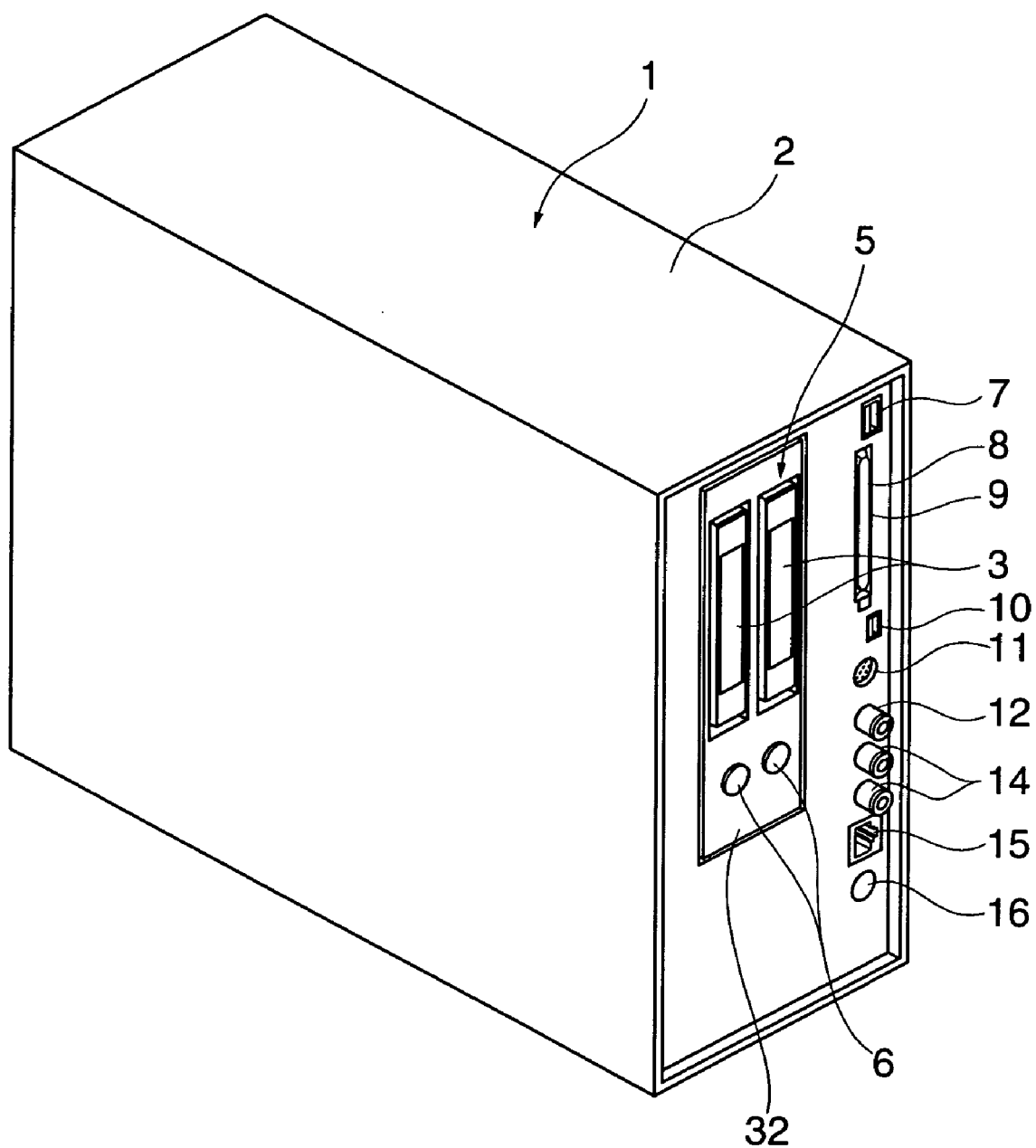
FIG. 1 is a perspective view showing a personal computer as an information processing apparatus according to a first embodiment of the present invention, as viewed from above to the left on a front side thereof.
Figure 2:
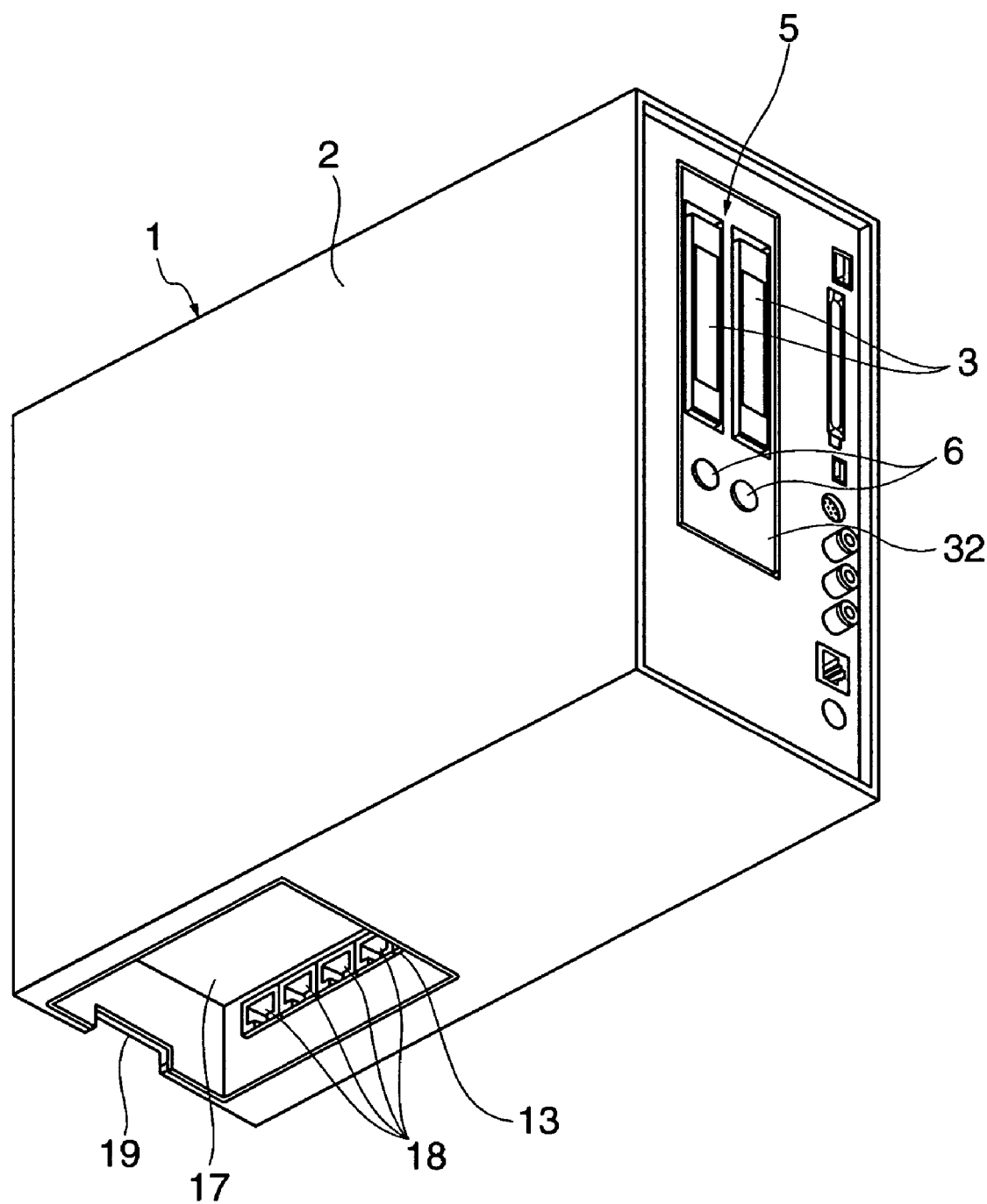
FIG. 2 is a perspective view showing the personal computer of FIG. 1, as viewed from below to the left on the front side thereof.

FIG. 1 is a perspective view showing a personal computer 1, as an information processing apparatus according to a first embodiment of the present invention, as viewed from above to the left on a front side thereof. FIG. 2 is a perspective view showing the personal computer 1 of FIG. 1, as viewed from below to the left on the front side.

In FIG. 1, the personal computer 1 has a body thereof covered by a casing 2, and a disk unit 5 is attached to the personal computer 1 in such a way that the disk unit 5 can be removed. The disk unit 5 can be attached to and removed from the personal computer 1 through a front side thereof. Further, the disk unit 5 is comprised, for example, of two removable hard disks 3,3 of an identical model mounted in the body of the disk unit 5 in such a way that the removable hard disks 3,3 can be removed. The two removable hard disks 3,3 can be attached to and removed from the disk unit 5 through a front side thereof.

Switches 6,6 for instructing ejection of the two removable hard disks 3,3 are also provided on the front side of the disk unit 5. Also provided on the front side of the personal computer 1 are a Universal Serial Bus (USB) connector 7; a PC card slot 9, into which a PC card 8 is inserted; an IEEE (Institute of Electrical and Electronics Engineers) 1394 connector 10; a S-video terminal 11; a video terminal 12; an audio terminal 14; a local area network (LAN) connector 15; a power supply switch 16, and so forth.

In FIG. 2, a large recess 17 is formed in a bottom wall of the personal computer 1. In the recess 17, there are provided, for example, four LAN connectors 18, a dual USB connector 13, and a power supply connector (not shown). Furthermore, a cutout part 19 for allowing cables, such as a power supply cable and a LAN cable, to pass through, is also provided to open into the recess 17. It should be noted that input devices, such as a keyboard and a mouse for entering data and giving instructions, as well as a display device are also connected to the personal computer 1, though not shown in FIG. 2.

Figure 3:
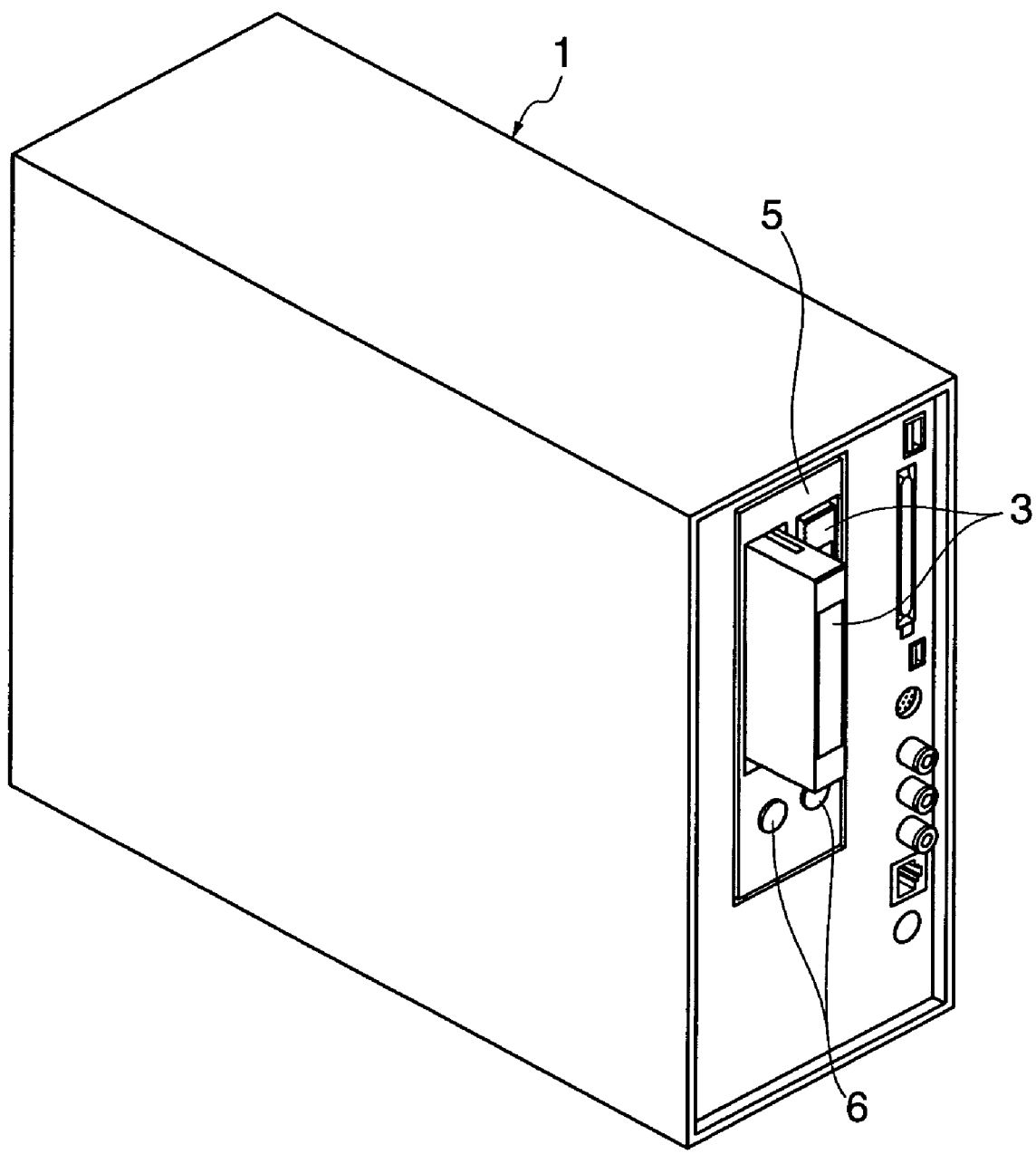
FIG. 3 is a perspective view showing the personal computer of FIG. 1 from which a removable hard disk on the left hand side has been ejected.

FIG. 3 is a perspective view showing the personal computer 1 with the removable hard disk 3 on the left hand side being ejected, out of the two removable hard disks 3,3, that are attached to the disk unit 5, as shown in FIG. 1 and FIG. 2. The disk unit 5 includes a mechanism that allows the removable hard disks 3 to be automatically ejected. While only the removable hard disk 3 on the left hand side is ejected in FIG. 3, the removable hard disk 3 on the right hand side can also be ejected in a similar manner. The mechanism that enables ejection will be described later in detail.

Figure 4:
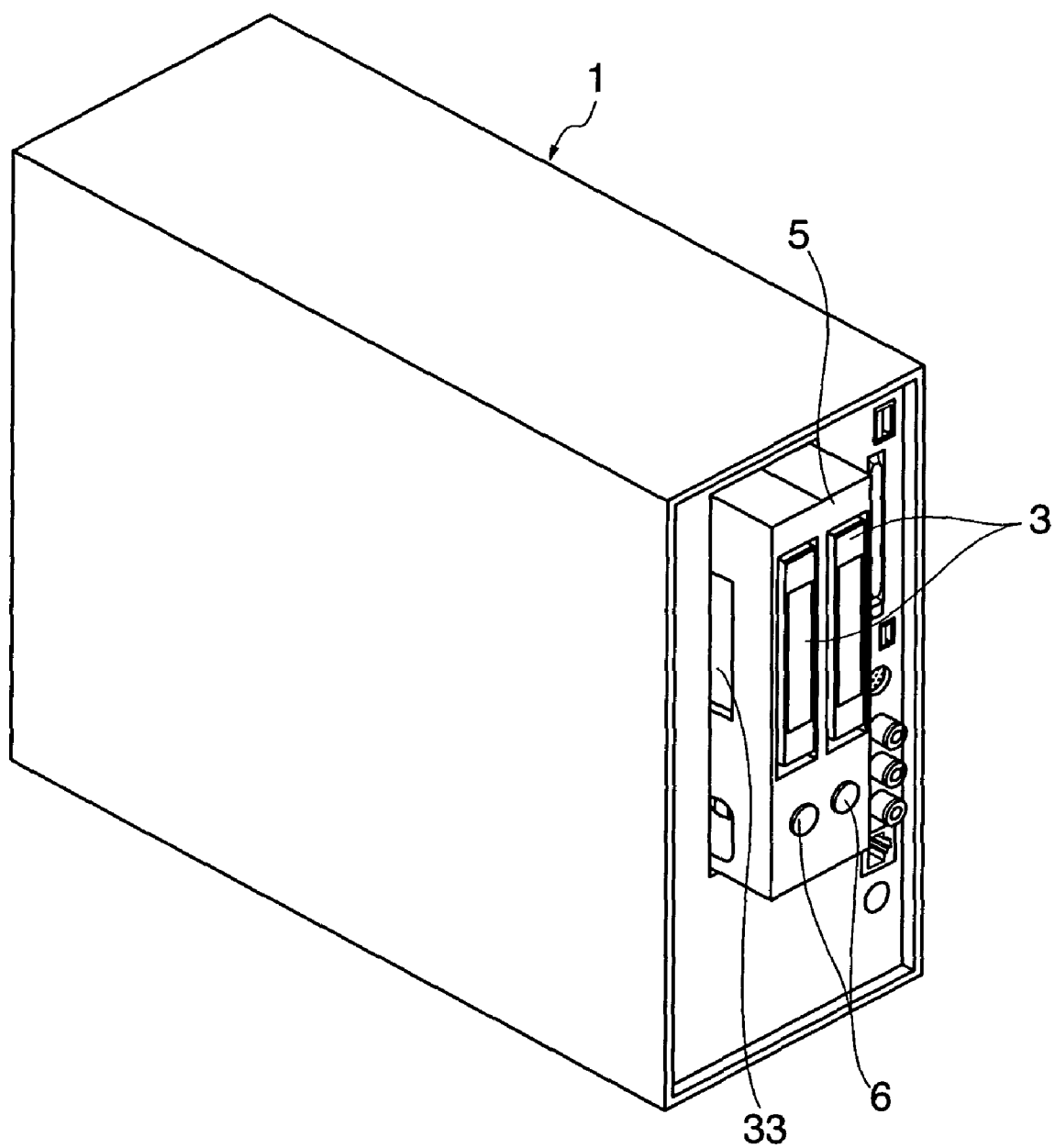
FIG. 4 is a perspective view showing the personal computer of FIG. 1 from which a disk unit has been ejected, as viewed from above to the left on the front side thereof.

FIG. 4 is a perspective view showing the personal computer 1 with the disk unit 5, which is shown in FIG. 1 and FIG. 2, being ejected from the personal computer 1. As shown in FIG. 4, the personal computer 1 of the present embodiment enables the user to easily remove the disk unit 5 without using a tool such as a driver, because of an ejection mechanism that will be described later.

Figure 5:
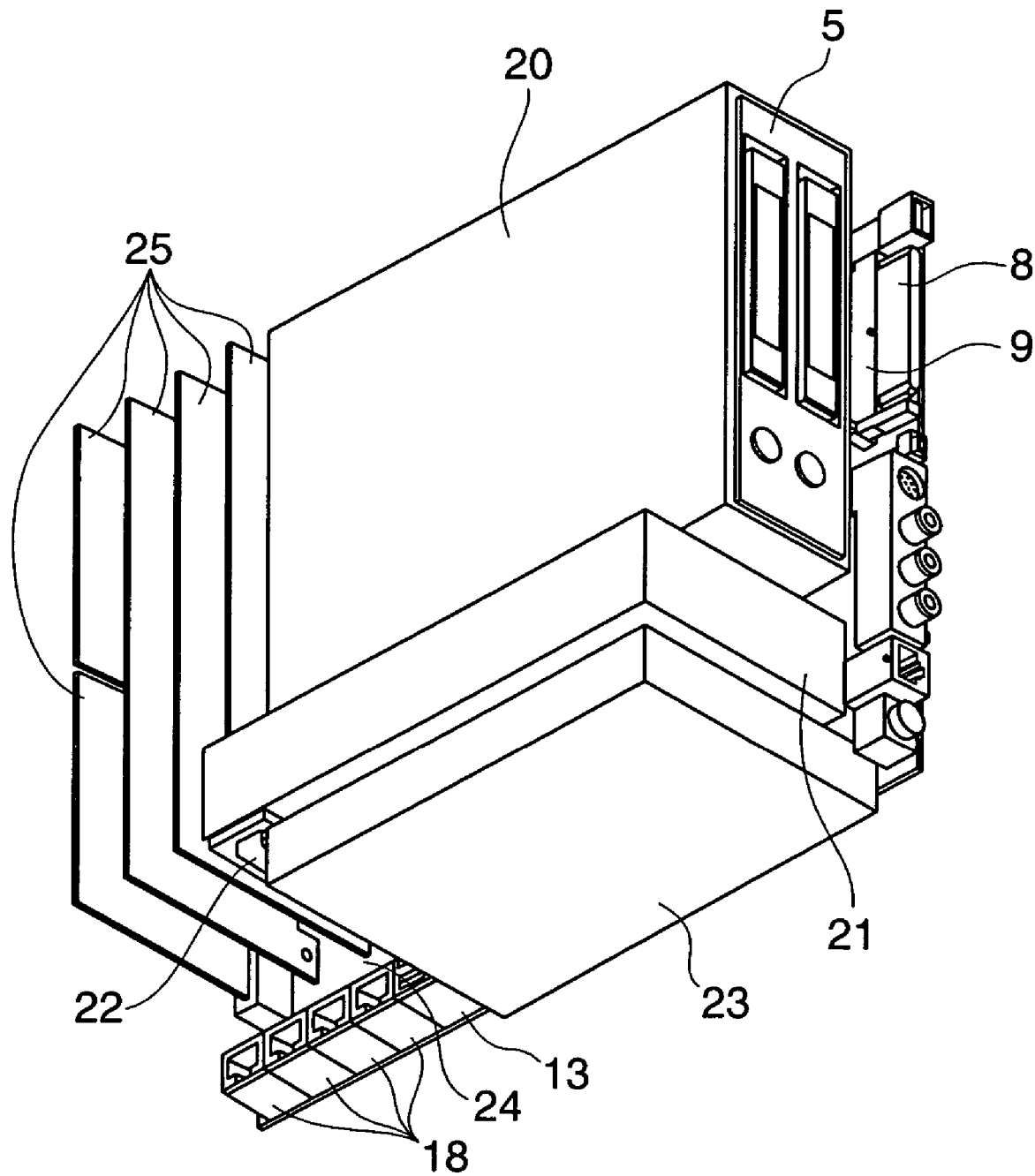
FIG. 5 is a perspective view showing the inside of the personal computer of FIG. 1, as viewed from below to the left on the front side thereof.

FIG. 5 is a perspective view showing the inside of the personal computer of FIG. 1, as viewed from below to the left on the front side.

In FIG. 5, the disk unit 5 is inserted into a unit chassis 20. A power supply 21 is disposed below the disk unit 5, and a power supply connector 22 is provided on the lower side of the power supply 21. A battery 23 is also provided on the lower side of the power supply 21. The various types of connectors, shown in FIG. 1 and FIG. 2, are soldered to a motherboard 24 inside the personal computer 1. Various types of expansion boards 25 are also connected to the motherboard 24. It should be noted that the unit chassis 20, the power supply 21, the battery 23, the motherboard 24, and the like are fixed to, for example, a chassis, not shown in FIG. 5.

Next, the disk unit 5 and a connector unit 28 will be described next.

Figure 6:
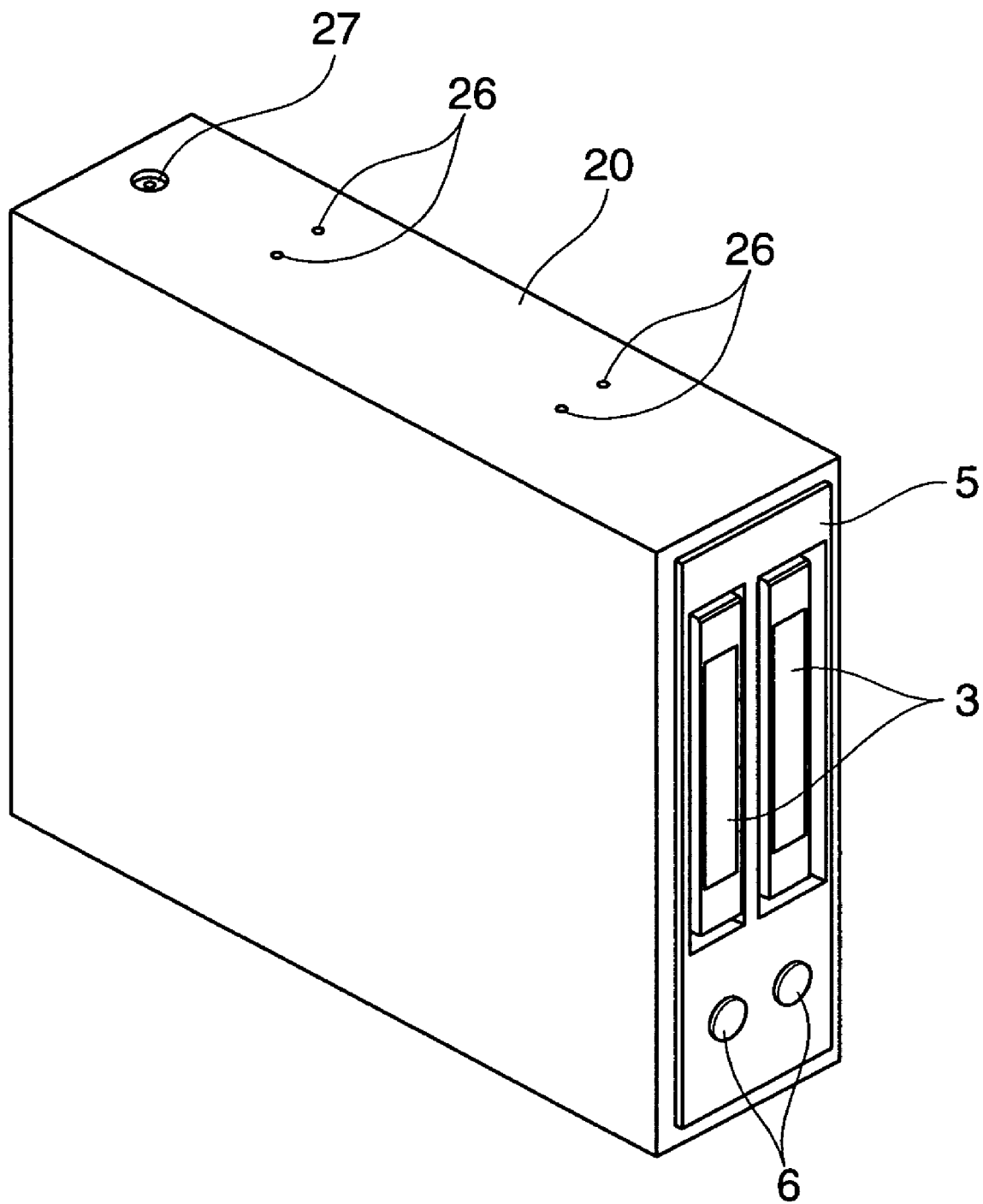
FIG. 6 is a perspective view showing the disk unit in FIG. 1 that has been inserted into a unit chassis, as viewed from above to the left on the front side thereof.
Figure 7:
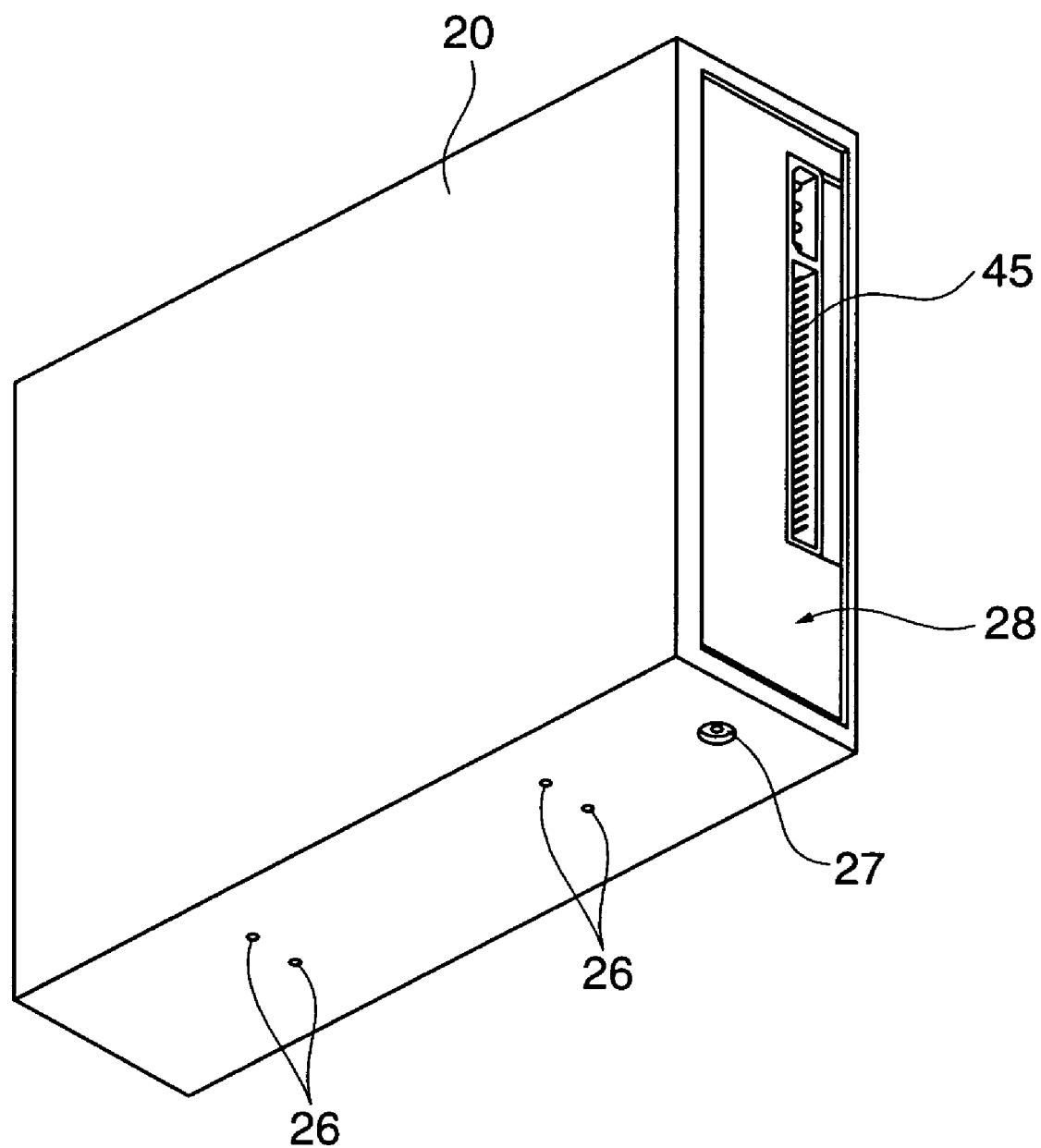
FIG. 7 is a perspective view showing the disk unit in FIG. 6, as viewed from below to the left on a back side thereof.

FIG. 6 is a perspective view of the disk unit 5 in FIG. 1, which is inserted into the unit chassis 20, as viewed from above to the left on the front side thereof. FIG. 7 is a perspective view of the disk unit 5 in FIG. 6, as viewed from below to the left on a back side thereof. In FIGS. 6 and 7, each of the top and bottom side surfaces of the unit chassis 20 has formed therein, for example, four screw holes 26 for securing the unit chassis 20 to the main chassis of the personal computer 1. Furthermore, screws 27 are fitted in both the top side surface and the bottom side surface of the unit chassis 20, to secure the connector unit 28, which will be described later, to the unit chassis 20.

Figure 8:
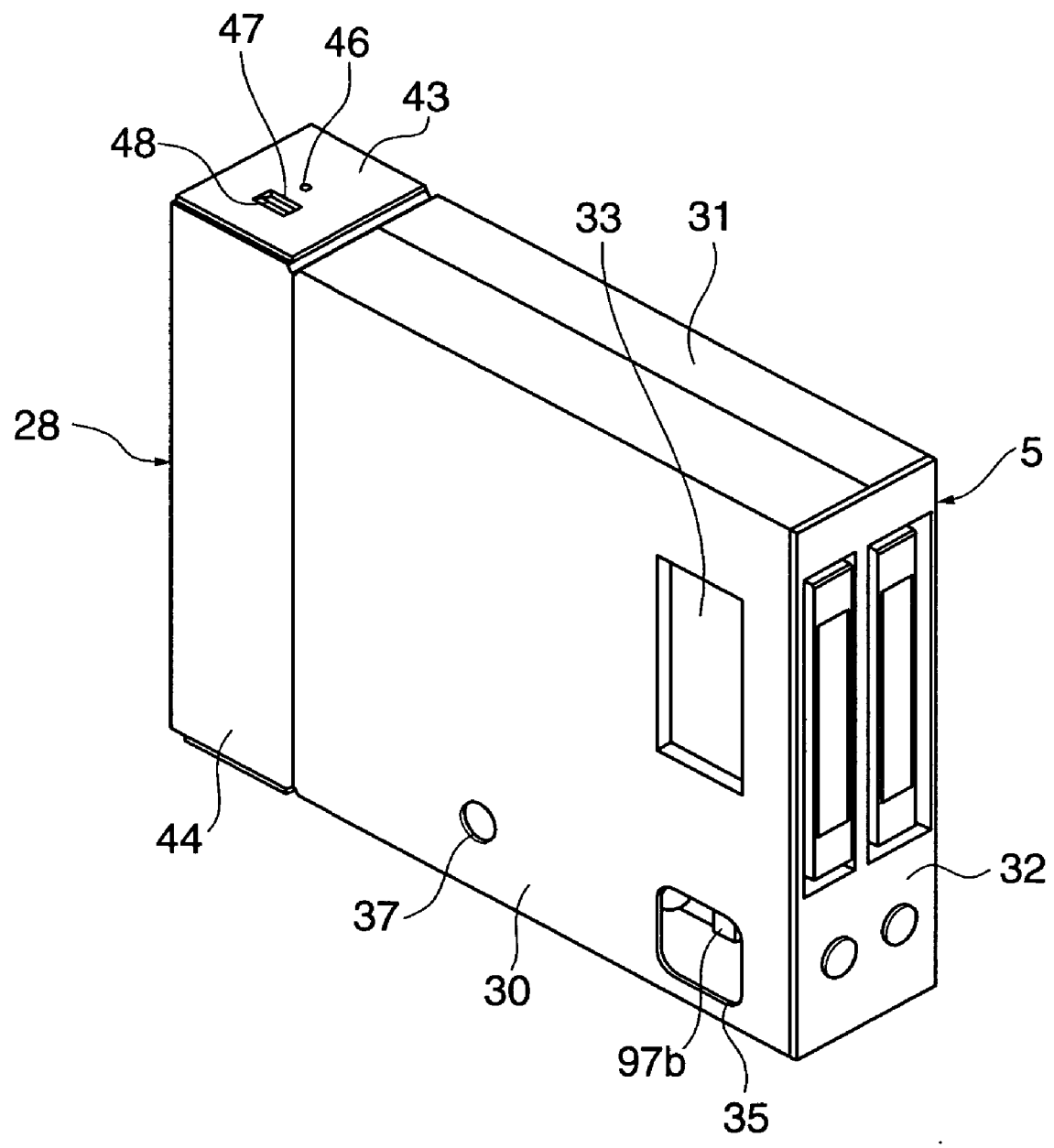
FIG. 8 is a perspective view showing the disk unit in FIG. 6 from which the unit chassis has been removed, as viewed from above to the left on the front side thereof.
Figure 9:
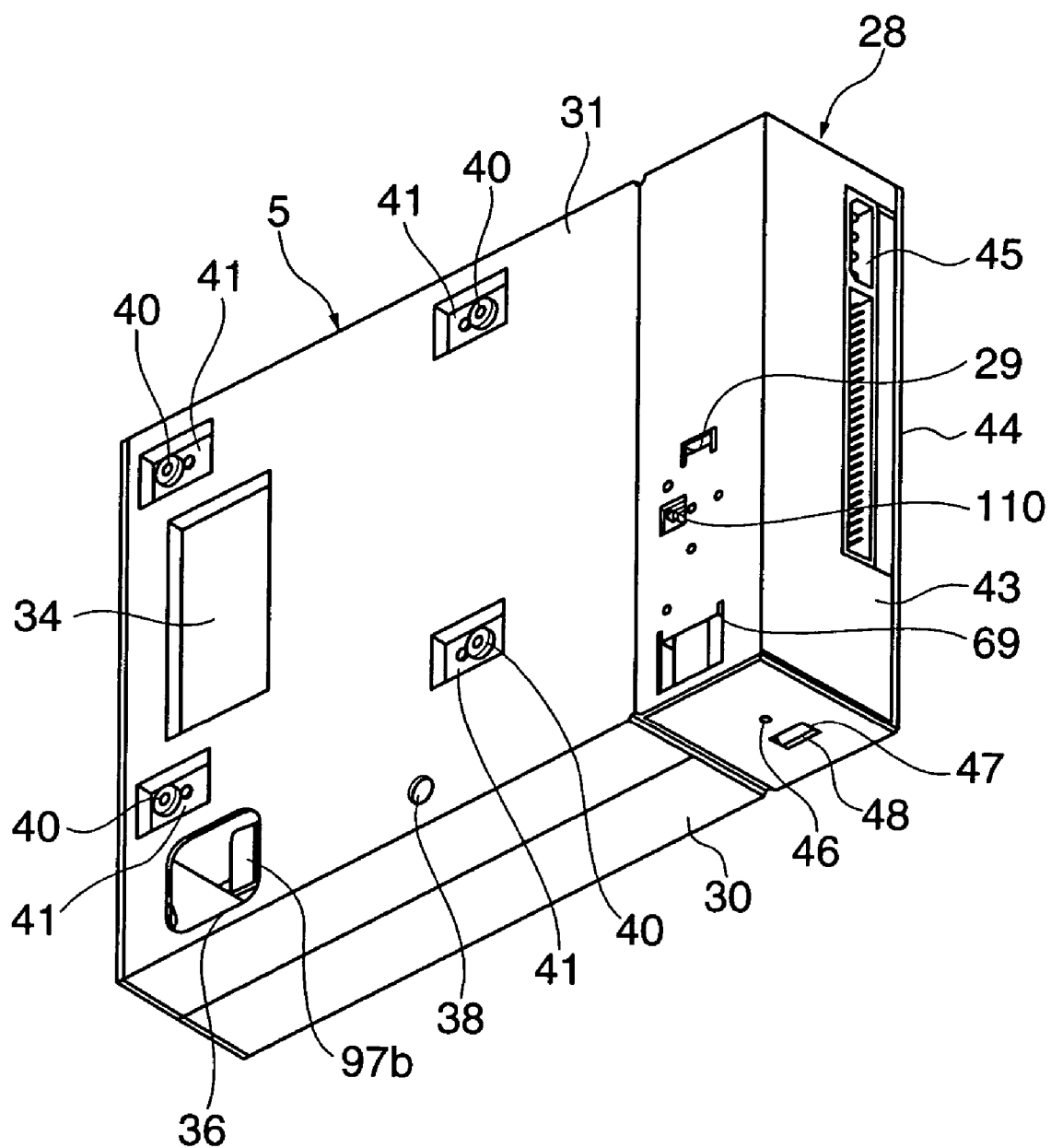
FIG. 9 is a perspective view showing the disk unit in FIG. 7 from which the unit chassis has been removed, as viewed from below to the left on the back side thereof.

FIG. 8 and FIG. 9 are perspective views of the disk unit 5, with the unit chassis 20 removed from the disk unit 5, as shown in FIG. 6 and FIG. 7. In FIG. 8 and FIG. 9, the disk unit 5 is connected to the connector unit 28 on the main body of the personal computer 1. The left and right side surfaces, as well as the back side surface of the disk unit 5, are covered by cover members 30, 31, while the front side is covered by a front cover member 32. The cover member 30 has a recess 33 formed therein, while the cover member 31 has a recess 34 formed therein. With this configuration, the user can easily carry the disk unit 5 by hand when removed from the personal computer 1. Further, the cover member 31 has recesses 41 formed therein at, for example, four locations. Four screws 40 in the recesses 41 secure an ejection unit of the removable hard disk 3, which will be described later, to the cover member 31. Furthermore, the cover members 30, 31 for the disk unit 5 also has formed therein ejection holes 35, 36, as well as failure indicator holes 37, 38. Functions provided by these holes will be described later.

The connector unit 28 is covered by a cover member 43 and a base 44, and a connector 45 is exposed on the back side surface of the connector unit 28. The connector 45 is electrically connected to the motherboard 24 (see FIG. 5) with a connector cable, not shown. Screw holes 46 are formed in both the top side surface and the bottom side surface of the cover member 43 for the connector unit 28. As shown in FIGS. 6 and 7, the connector unit 28 is secured to the unit chassis 25 by the screws 27 fitted into the screw holes 46. Further, a square hole 47 is formed in each of the top side surface and the bottom side surface of the cover member 43, in which is fitted a claw 48 which is formed integrally with the base 44.

Thus, the personal computer 1 of the present embodiment is comprised of the connector unit 28, which is secured to the main body of the personal computer 1, and the disk unit 5, which can be removed from the main body of the personal computer 1. The connector unit 28 and the disk unit 5 can be electrically connected to each other, and the disk unit 5 can be electrically connected to the removable hard disk 3, which can be removed. The personal computer 1 is configured such that the disk unit 5 cannot be removed from the connector unit 28 while either of the removable hard disks 3 is in operation, and either of the removable hard disks 3, while in operation, cannot be removed from the disk unit 5.

Next, a locking mechanism and an ejection mechanism for the disk unit 5 will be described.

Figure 10:
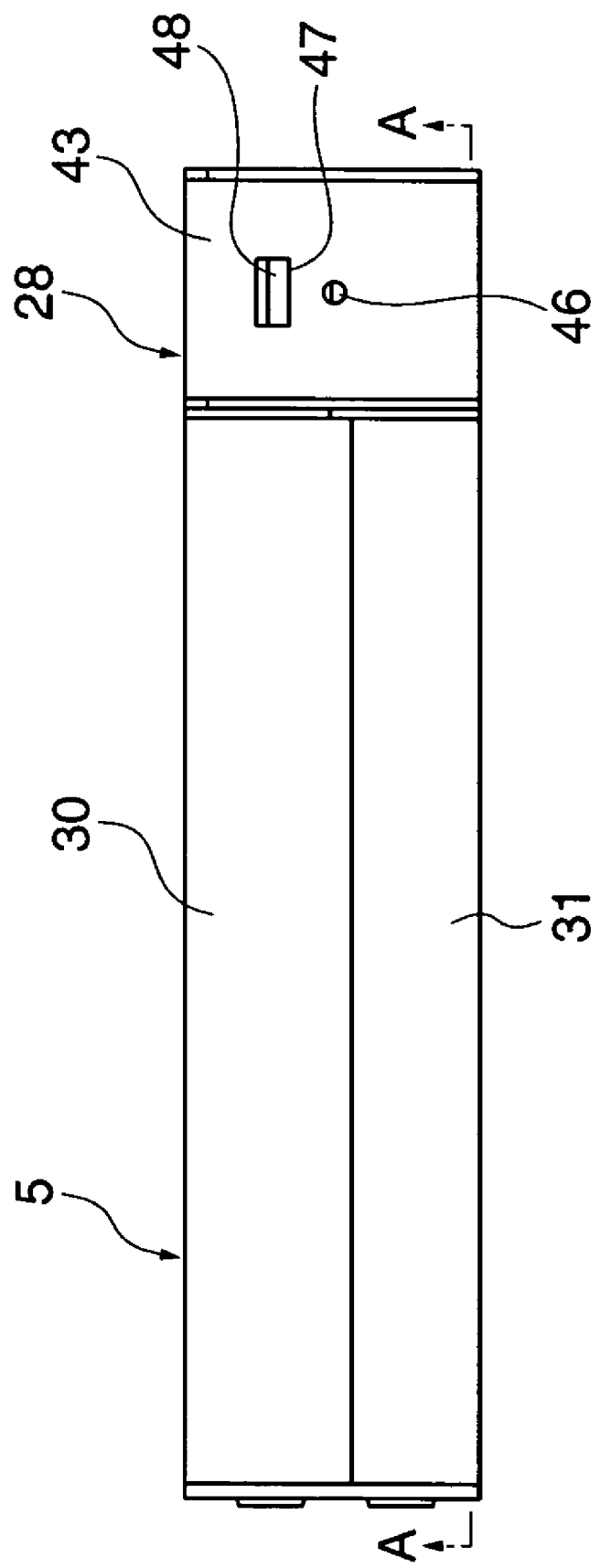
FIG. 10 is a top plan view showing the disk unit of FIG. 6 that is joined to a connector unit.
Figure 11:
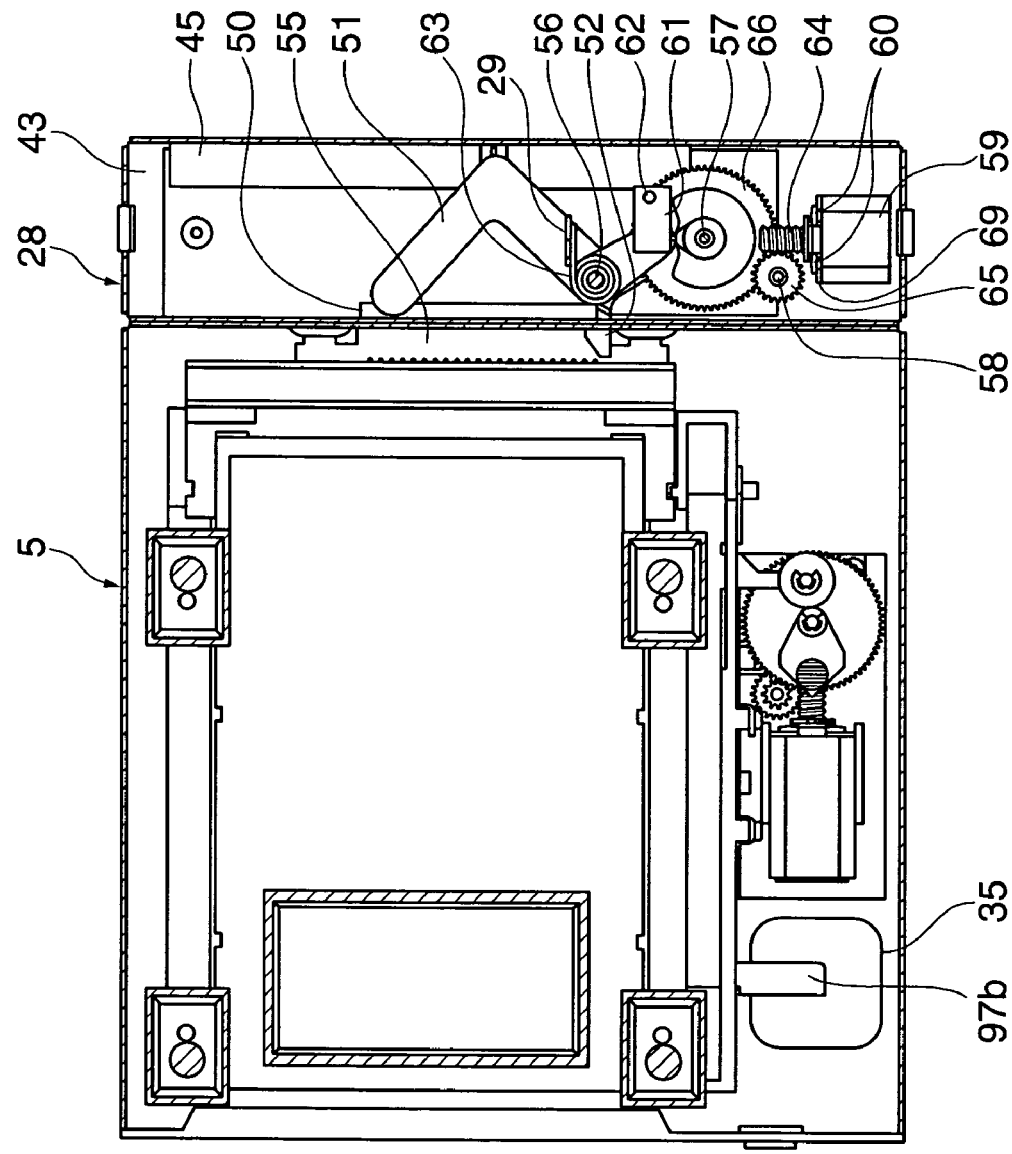
FIG. 11 is a cross sectional view taken along line A—A in FIG. 10.
Figure 12:
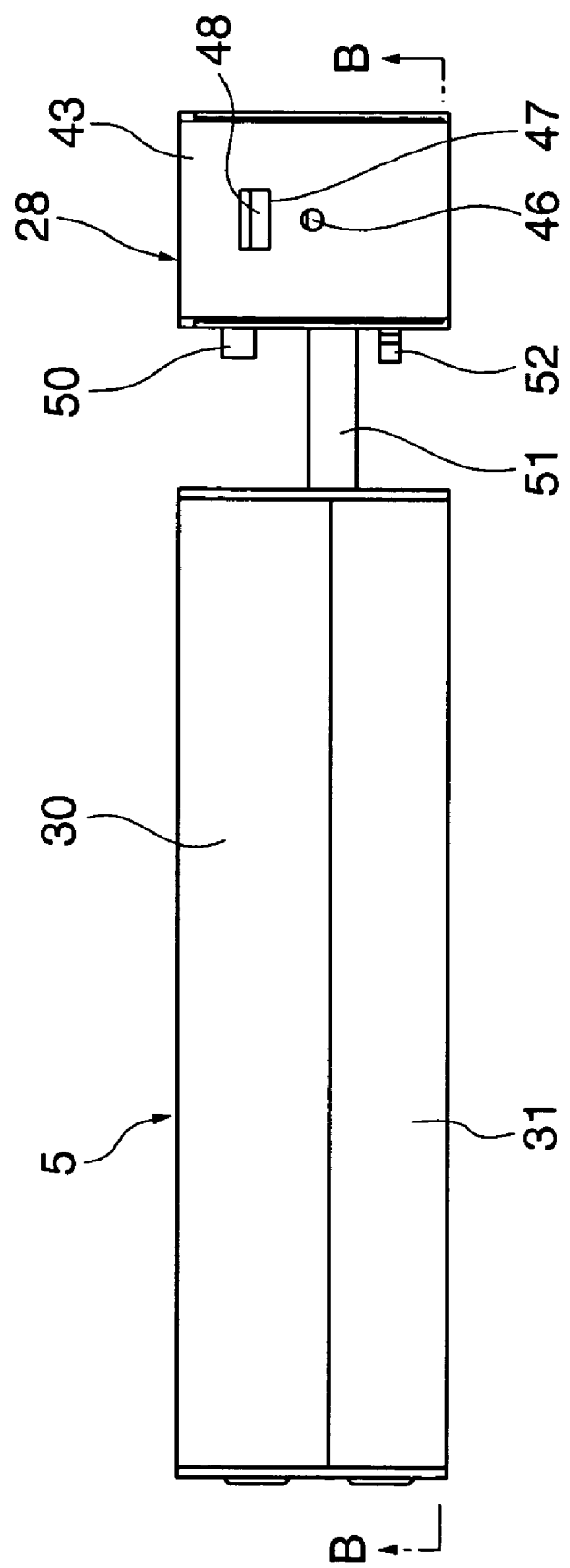
FIG. 12 is a top plan view showing the disk unit of FIG. 10 that has been ejected from the connector unit.
Figure 13:
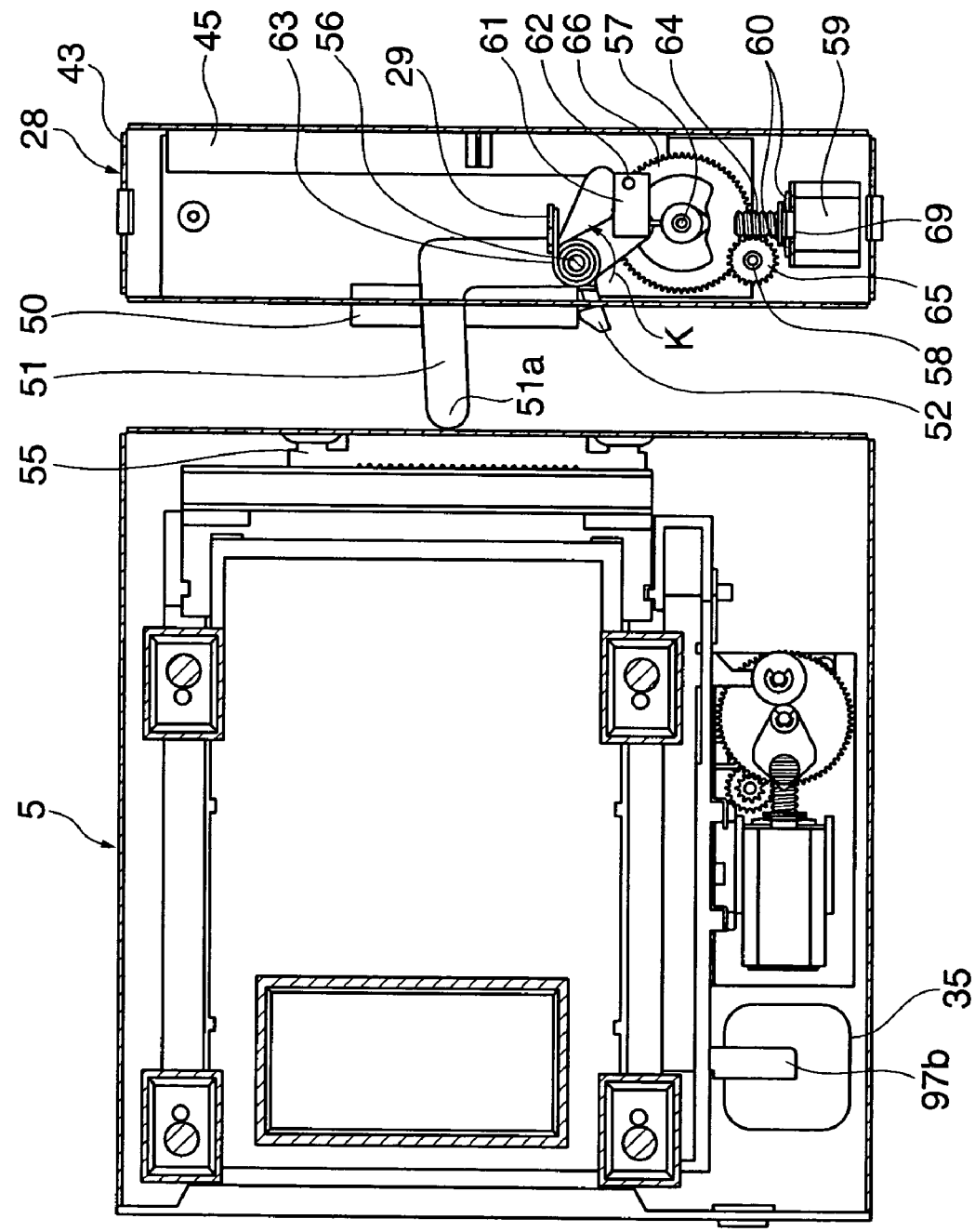
FIG. 13 is a cross sectional view taken along line B—B in FIG. 12.
Figure 14:
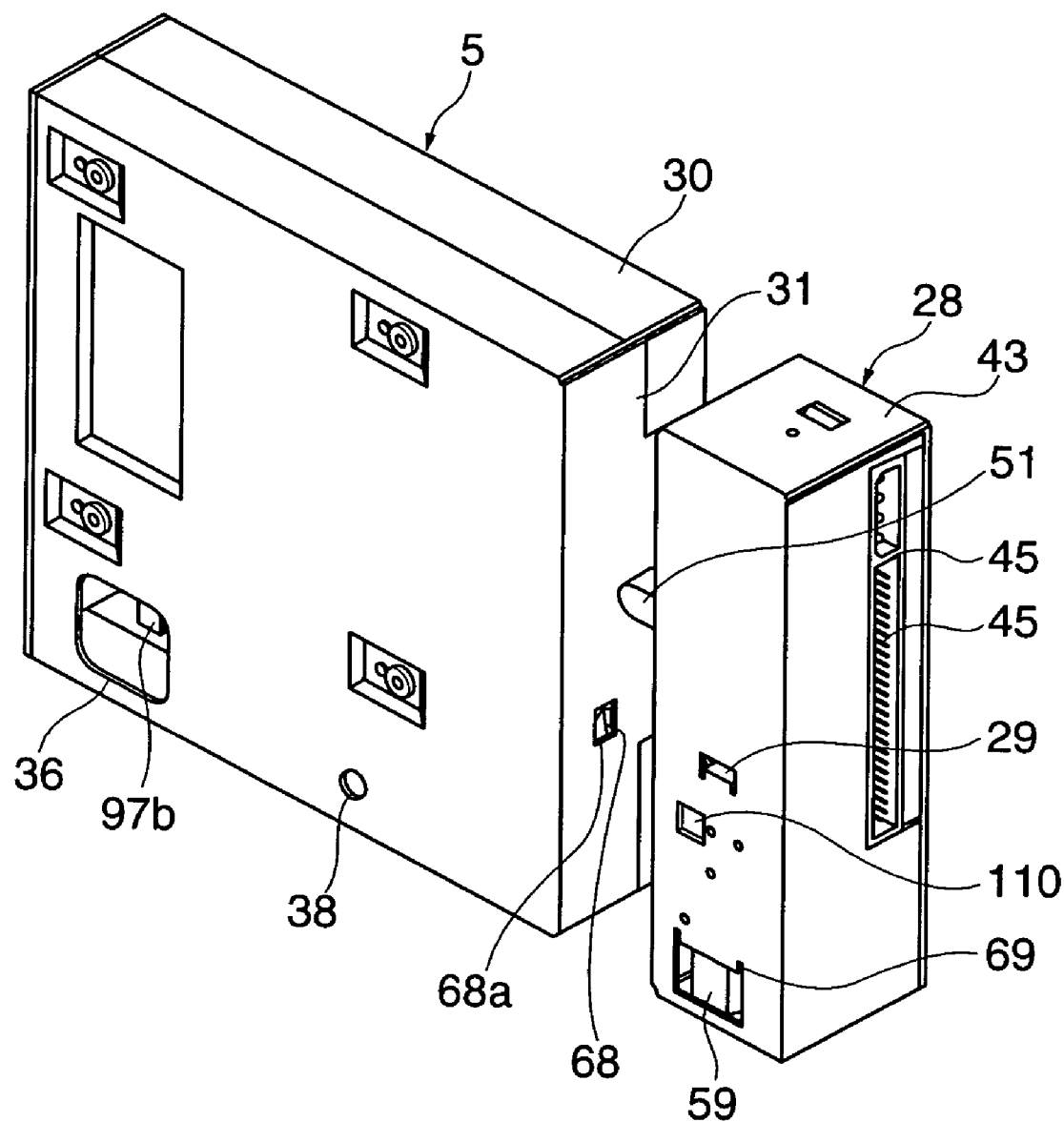
FIG. 14 is a perspective view showing the disk unit of FIG. 12 that has been ejected from the connector unit, as viewed from above to the left on the back side.
Figure 15:
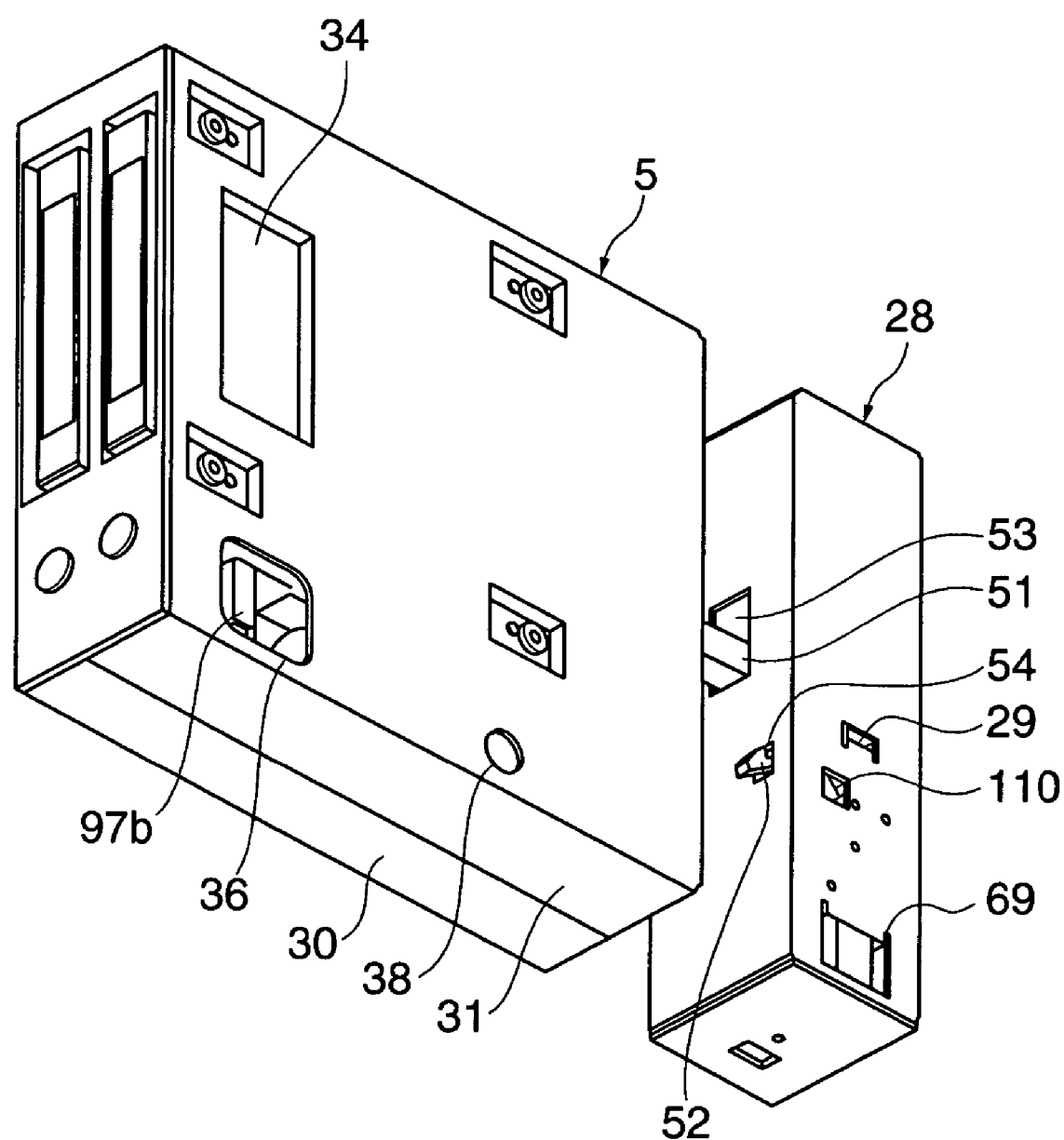
FIG. 15 is a perspective view showing the disk unit of FIG. 12 that has been ejected from the connector unit, as viewed from below to the right on the front side thereof.
Figure 16:
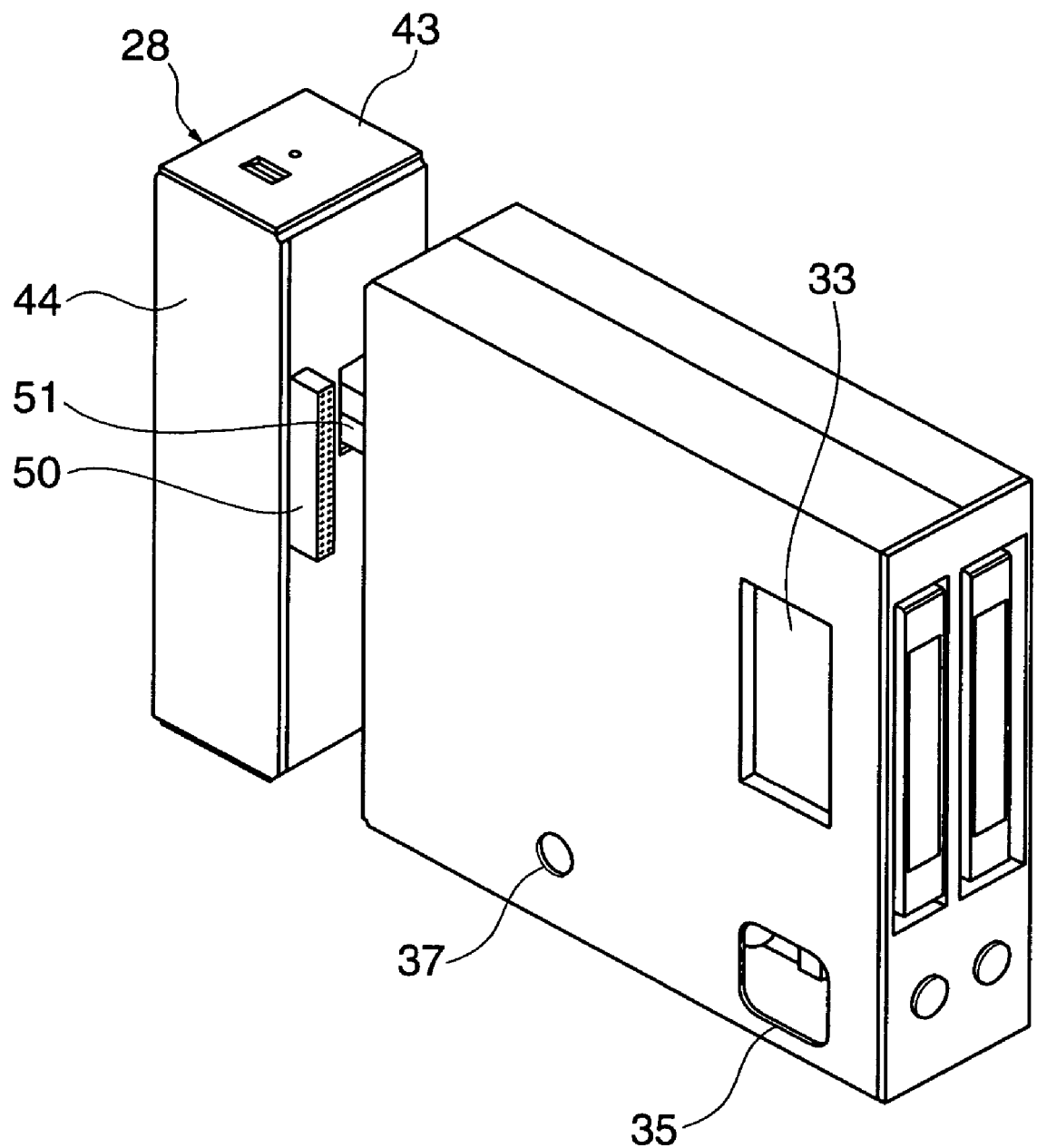
FIG. 16 is a perspective view showing the disk unit of FIG. 12 that has been ejected from the connector unit, as viewed from above to the left on a front side thereof.
Figure 17:
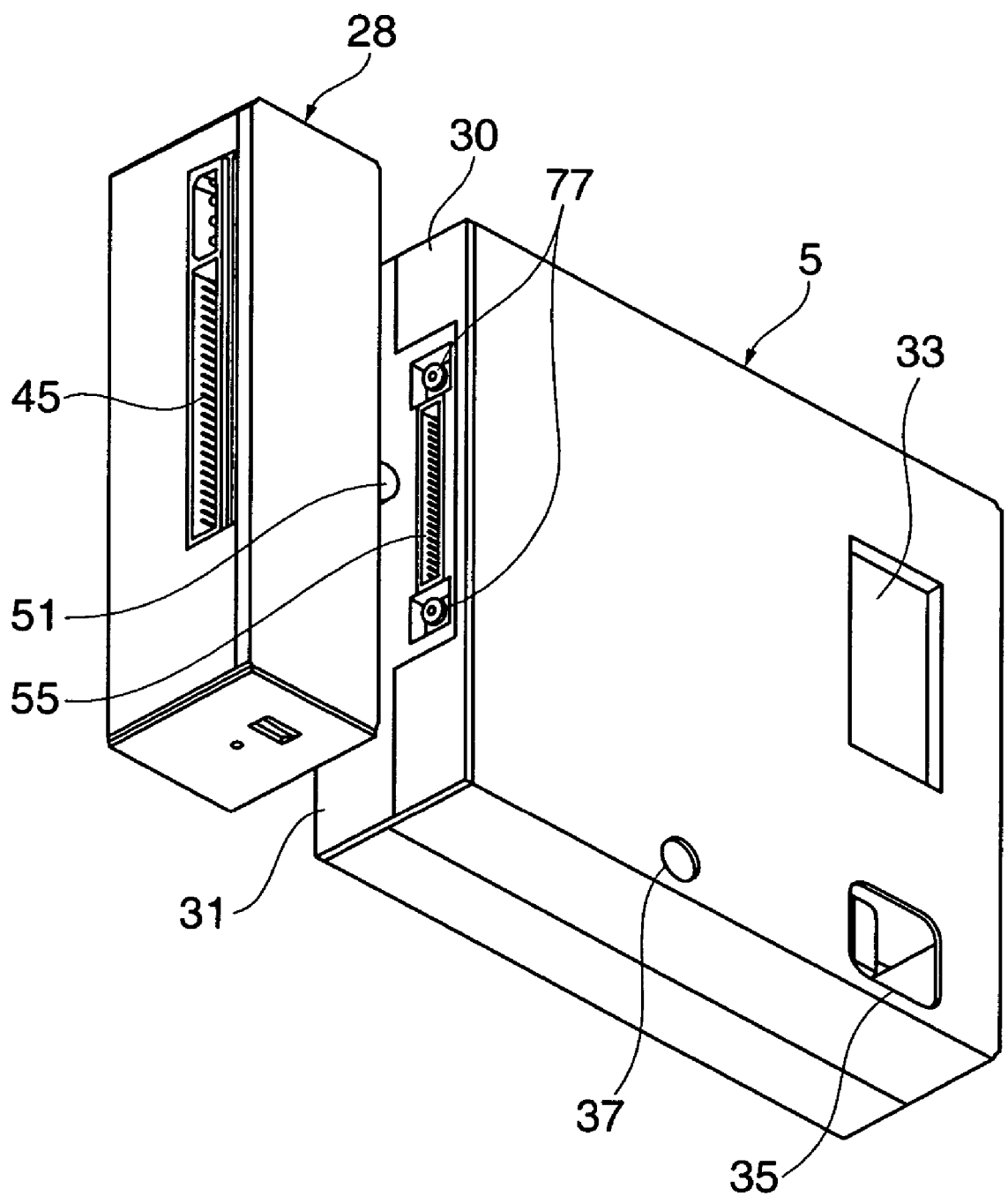
FIG. 17 is a perspective view showing the disk unit of FIG. 12 that has been ejected from the connector unit, as viewed from below to the right on the back side.

FIG. 10 is a top plan view of the disk unit 5 of FIG. 6 in a state connected to the connector unit 28, while FIG. 11 shows a cross sectional view taken along line A—A in FIG. 10. Further, FIG. 12 through FIG. 17 show the disk unit 5 of FIG. 10 ejected from the connector unit 28 as shown in FIG. 4, as viewed from various directions. FIG. 12 is a top plan view showing the disk unit 5 of FIG. 10 ejected from connector unit 28, while FIG. 13 shows a cross sectional view taken along line B—B in FIG. 12. FIG. 14 is a perspective view of the ejected disk unit 5 of FIG. 12, as viewed from above to the left on the back side of the connector unit 28. FIG. 15 is a perspective view of the ejected disk unit 5 of FIG. 12, as viewed from below to the right on the front side thereof. FIG. 16 is a perspective view of the ejected disk unit 5 of FIG. 12, as viewed from above to the left on the front side thereof. FIG. 17 is a perspective view of the ejected disk unit 5 of FIG. 12, as viewed from below to the right on the back side of the connector unit 28.

Figure 18:
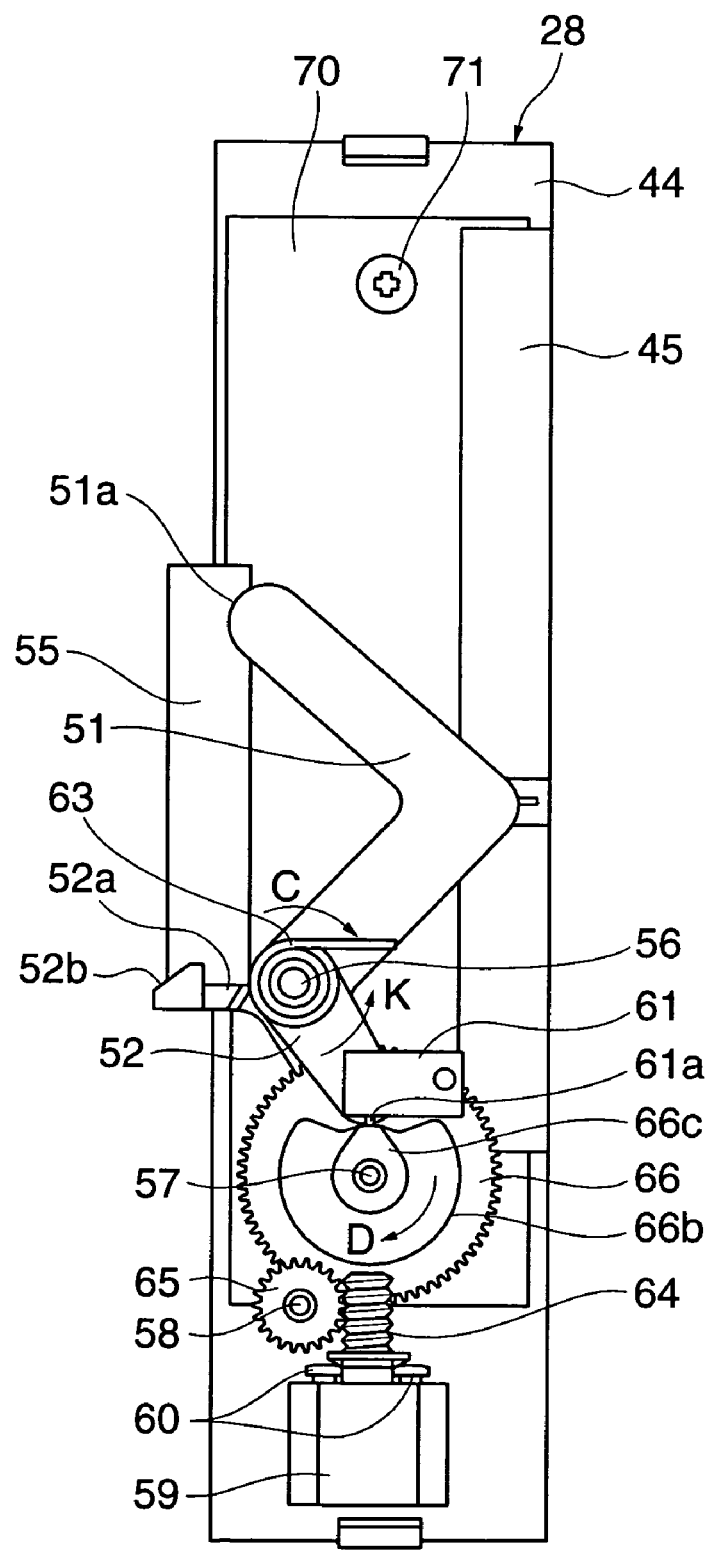
FIG. 18 is an enlarged view showing the connector unit in FIG. 11.
Figure 19:
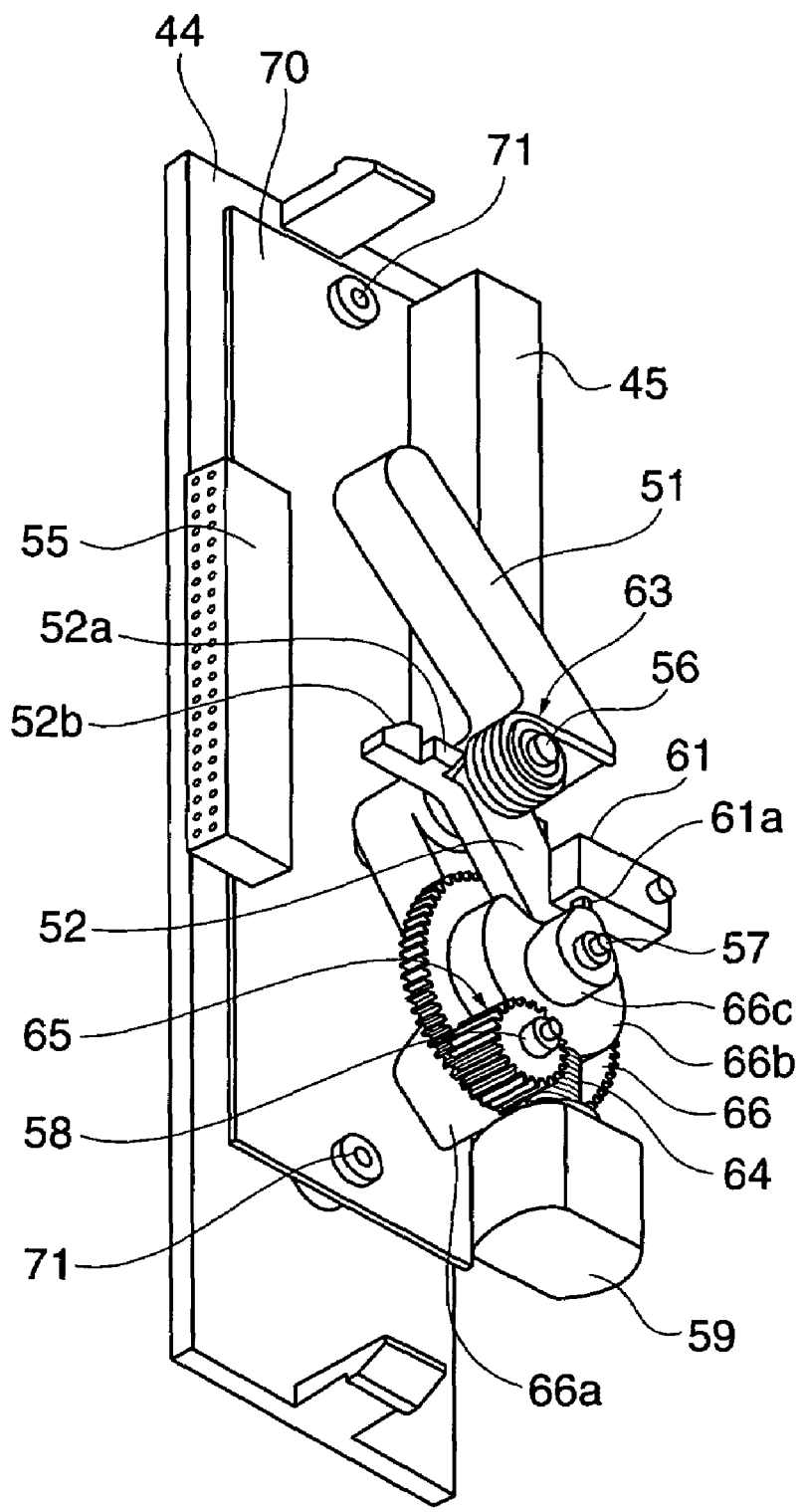
FIG. 19 is a perspective view showing the connector unit in FIG. 18, as viewed from below to the left on the front side thereof.
Figure 20:
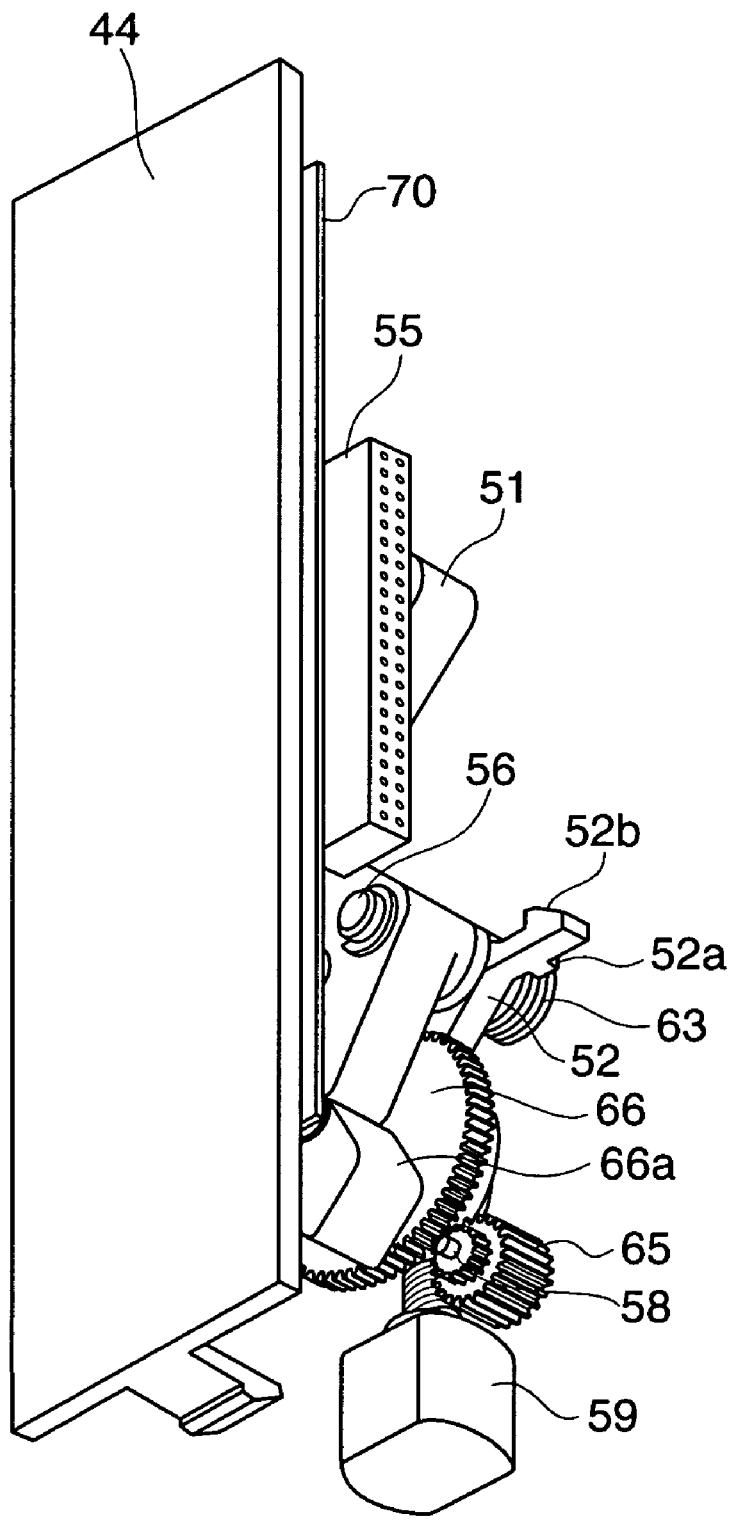
FIG. 20 is a perspective view showing the connector unit in FIG. 18, as viewed from below to the right on the back side thereof.

First, the outlines of the locking mechanism and the ejection mechanism for the disk unit 5 will be described. In FIGS. 10 and 11, an ejection lever 51 for ejecting the disk unit 5 from the main body of the personal computer 1 is seen to be in a receded position as a non-ejection position within the connector unit 28. The ejection lever 51 is rotatably fitted on a fulcrum shaft 56, as shown in FIGS. 18 to 20, referred to hereinafter. A locking claw 52 is seen to be hooked in a square hole 68 formed in the cover member 31 of the disk unit 5 as shown in FIG. 14 to lock the disk unit 5 to the connector unit 28. The locking claw 52 is also rotatably fitted on the fulcrum shaft 56 together with the ejection lever 51. Furthermore, a connector 50 on the connector unit 28 is in a state being electrically connected to a connector 55 on the disk unit 5.

As shown in FIGS. 12 and 13, when the locking claw 52 rotates slightly in a direction indicated by the arrow K about the fulcrum shaft 56, the locking claw 52 disengages from the square hole 68 in the cover member 31 so that the disk unit 5 is unlocked from the connector unit 28. At the same time, the ejection lever 51 rotates slightly about the fulcrum shaft in the direction indicated by the arrow K to springout of a square hole 53 formed in the connector unit 28, as shown in FIG. 15 and FIG. 16 and push the cover member 31 of the disk unit 5, to thereby cause the disk unit 5 to be ejected from the main body of the personal computer 1, as shown in FIG. 14 and FIG. 17. Of course, the connector 50 and the connector 55 become disconnected at the same time. As is clear from the description so far given, the major parts of the locking mechanism and the ejection mechanism for the disk unit 5 are provided on the side of the connector unit 28. As a result, the disk unit 5 is prevented from being inadvertently pulled out.

Next, the locking mechanism and the ejection mechanism for the disk unit 5 will be described in detail. In FIGS. 11 and 13, the fulcrum shaft, and a fulcrum shaft 57, and a fulcrum shaft 58 are calked to the cover member 43, and a switch 61 is secured to the cover member 43 by means of a screw 62. A motor 59 is secured to a raised bent part 69 of the cover member 43 by screws 60. Further, a stopper 29 is formed integrally on the cover member 43, and a torsional coil spring 63 has one end thereof supported by the stopper 29.

FIG. 18 through FIG. 23 show the connector unit 28 with the cover member 43 removed. FIG. 18 shows an enlarged view of the connector unit 28, which is shown in FIG. 11. FIG. 19 is a perspective view showing the connector unit 28 of FIG. 18, as viewed from below to the left on the front side thereof, while FIG. 20 is a perspective view showing the connector unit 28 of FIG. 18, as viewed from below to the right on the back side thereof.

In FIGS. 18 to 20, the connector 55 and the connector 45 of the connector unit 28 are soldered to a sub substrate 70, and the sub substrate 70 is secured to the base 44 by screws 71. The motor 59 is electrically connected to the base 44 by lead wires, not shown. Furthermore, a worm gear 64 is press fitted into the body of the motor 59. The worm gear 64 meshes with one of gears that constitute a two-stage gear 65 that is rotatably fitted on the fulcrum shaft 58. The other gear of the two-stage gear 65 meshes with a gear 66, which is fitted on the fulcrum shaft 57. The gear 66 is formed integrally with a cam 66a, a cam 66b and a cam 66c. The switch 61 is electrically connected to the sub substrate 70 by lead wires, not shown. The switch 61 has a push button 61a which is urged by a projecting part of the cam 66c to be held ON.

The torsional coil spring 63 is disposed relative to the locking claw 52 such that one end of the spring 63 is supported by a projection 52a on the locking claw 52, while the other end of the spring 63 is supported by the stopper 29 provided on the cover member 43 (see FIG. 11). With this arrangement, the locking claw 52 receives a force in a direction indicated by an arrow C about the fulcrum shaft 56 and swings about the shaft 56 as the cam 66b rotates to cause the ejection lever 51 to come into alternate contact with the projecting part and a non-projecting part of the cam 66b. When the disk unit 5 is inserted into the connector unit 28, a slanted face part 52b of the locking claw 52 is pushed by a marginal edge 68a of the square hole 68 in the disk unit 5, which is shown in FIG. 14, so that the locking claw 52 swings in the direction indicated by the arrow K. When the coupling of the disk unit 5 with the connector unit 28 is completed, the tilted part 52b goes into the square hole 68, and the locking claw 52 rotates in a direction indicated by the arrow C to bring the disk unit 5 and the connector unit 28 into a locked state.

The ejection lever 51 is mounted on the fulcrum shaft, and one end 51a of the ejection lever 51 urges a rear end surface of the cover member 31 of the disk unit 5 when the disk unit 5 is ejected, as mentioned earlier (see FIG. 13). The other end of the ejection lever 51 is in contact with the cam 66a and swings as the cam 66a rotates to cause the other end of the ejection lever 51 to come into alternate contact with the projecting part and non-projecting part of the cam 66a. In the present embodiment, the ejection lever 51 rotates in the direction indicated by the arrow K and ejects the disk unit 5, when the projecting part of the cam 66a is in contact with the other end of the ejection lever 51.

Figure 21:
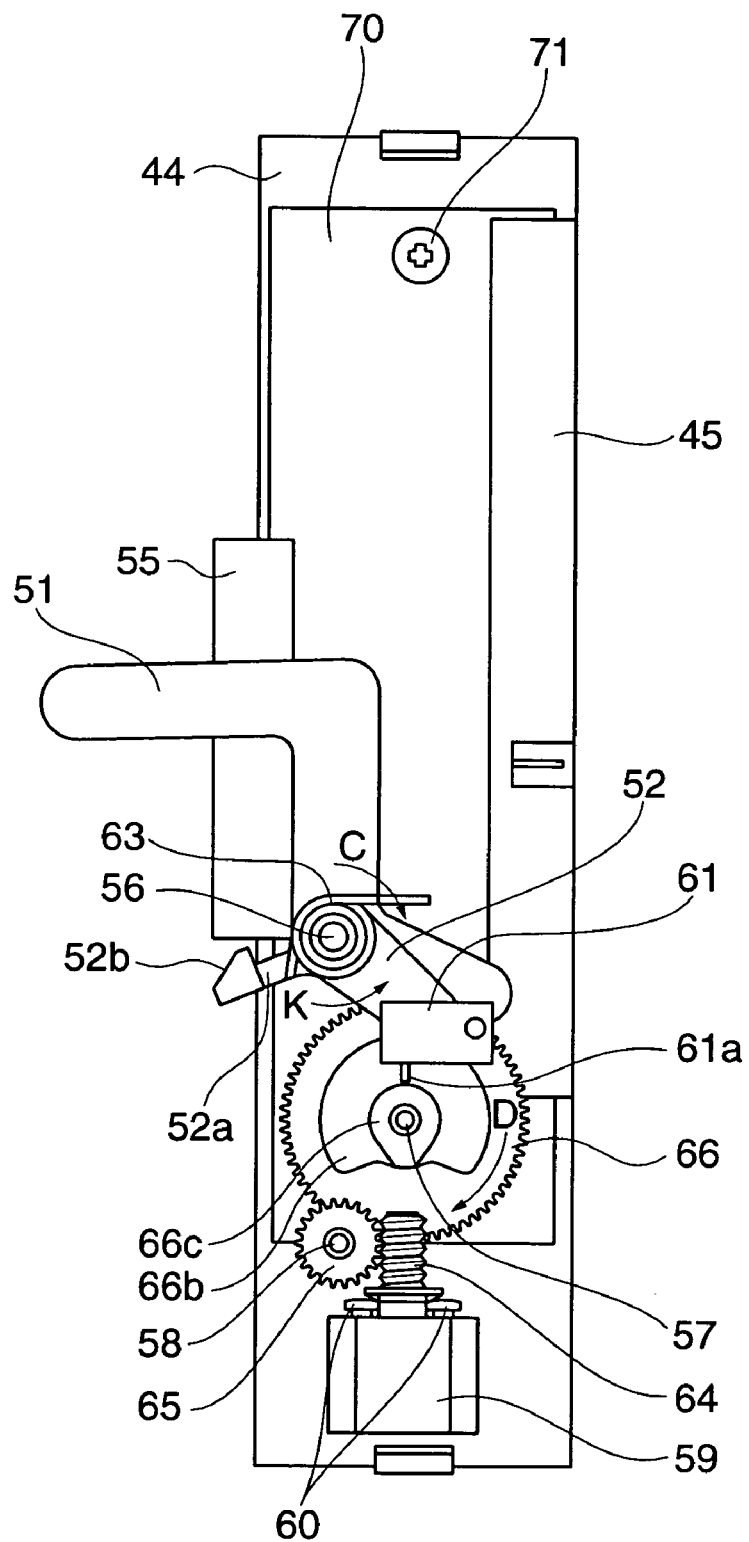
FIG. 21 is an enlarged view showing the connector unit in FIG. 13.
Figure 22:
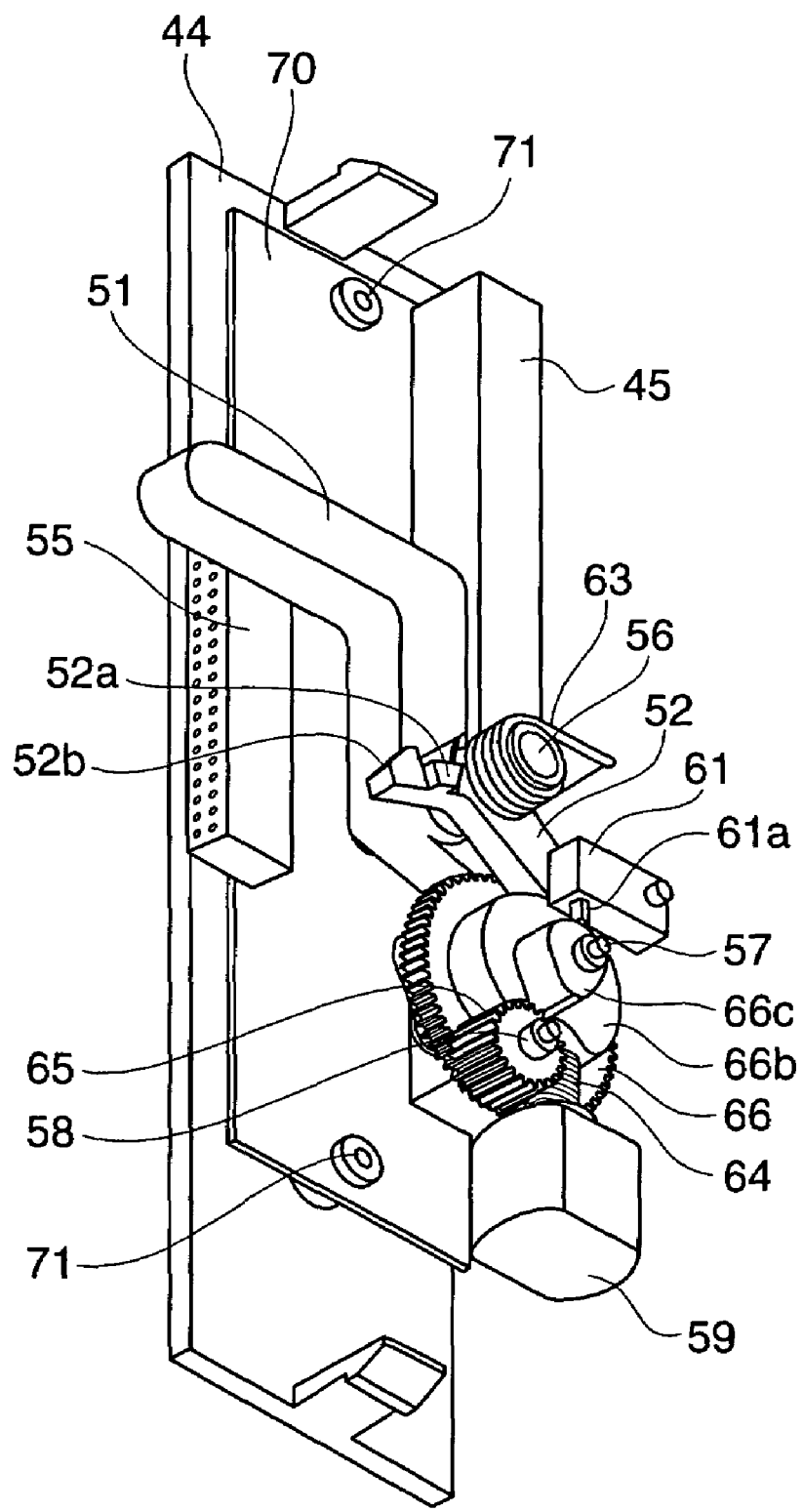
FIG. 22 is a perspective view showing the connector unit of FIG. 21, as viewed from below to the left on a front side thereof.
Figure 23:
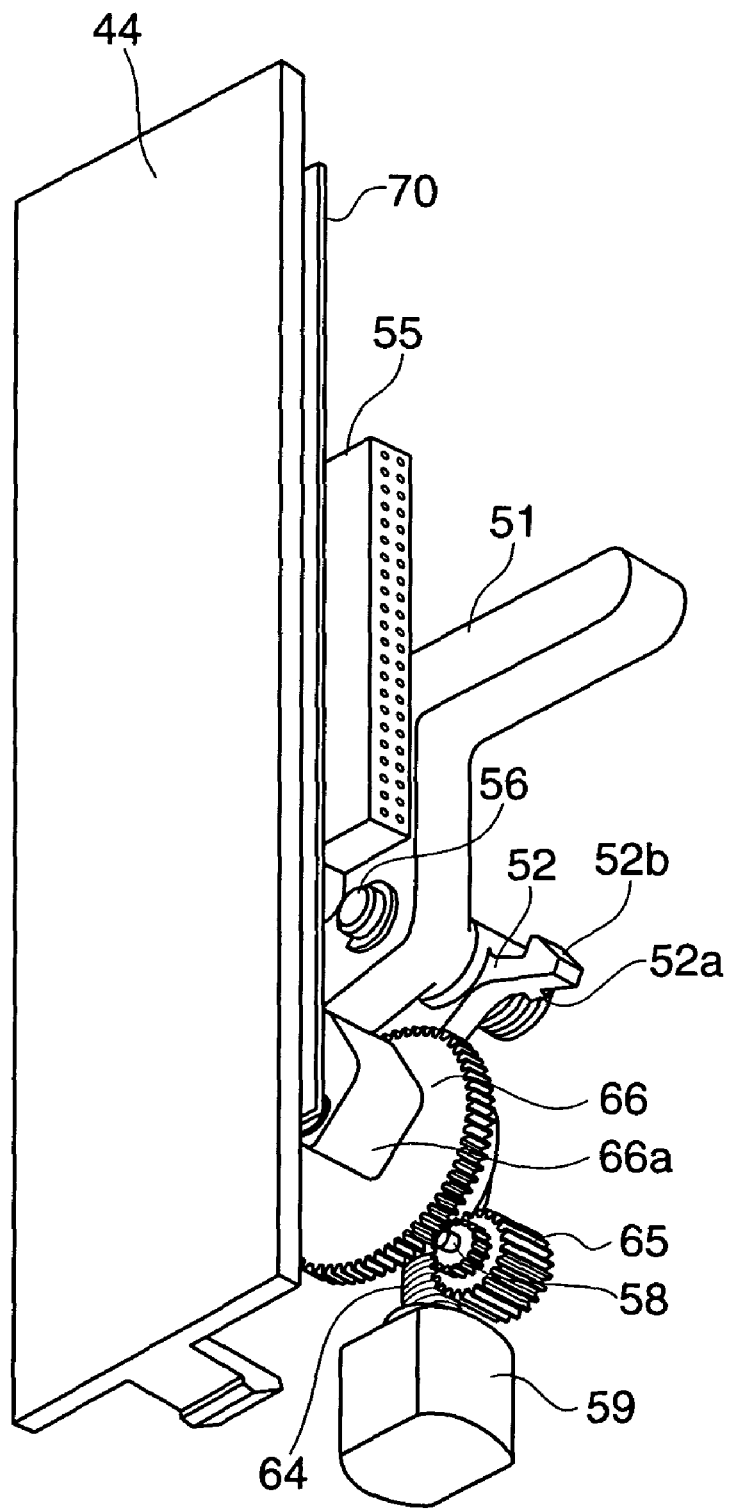
FIG. 23 is a perspective view showing the connector unit of FIG. 21, as viewed from below to the right on a back side thereof.

FIG. 21 through FIG. 23 are diagrams showing the internal construction of the connector unit 28 in FIG. 13 in a state when the disk unit 5 is ejected. FIG. 21 is an enlarged view of the connector unit 28, shown in FIG. 13. FIG. 22 is a perspective view showing the connector unit 28, as viewed from below to the left on a front side thereof. FIG. 23 is a perspective view showing the connector unit 28, as viewed from below to the right on a rear side thereof.

In FIGS. 21 to 23, the gear 66 is in a position where it has rotated by 180 degrees in a direction indicated by an arrow D from the position shown in FIG. 18. In this state, the push button 61a of the switch 61 is not in contact with the projecting part of the cam 66c and thus is projected, and hence the switch 61 is OFF. Further, a base end of the locking claw 52 is in contact with the projecting part of the cam 66b, and hence the locking claw 52 is in an unlocked state where it has rotated in the direction indicated by the arrow K. Further, the ejection lever 51 is in contact with the projecting part of the cam 66a and has rotated in the direction indicated by the arrow K into a position for ejecting the disk unit 5.

In an actual operation, when an ejection command for the disk unit 5 (to release the lock) is issued, the motor 59 is rotated in such a direction that the gear 66 rotates in the direction indicated by the arrow D from the position shown in FIG. 18, whereby the switch 61 is first turned off, and the locking claw 52 rotates in the direction indicated by the arrow K from the position shown in FIG. 18 to bring the disk unit 5 into an unlocked state. Then, the ejection lever 51 rotates in the direction indicated by the arrow K from the position shown in FIG. 18 to eject the disk unit 5. After the ejection, the motor 59 continues to rotate to cause the locking claw 52 to rotate in the direction indicated by the arrow C into the initial position. Thereafter, the switch 61 is turned on, and the motor 59 stops. The ejection operation for the disk unit 5 is thus completed. At this time, the ejection lever 51 is in the position corresponding to the disk unit 5 having been ejected. However, since the ejection lever 51 is in a position corresponding to the non-projecting part of the cam 66a, the ejection lever 51 is stored back into the connector unit 28 when the disk unit 5 is again connected to the connector unit 28.

It should be noted that the ejection command to eject the disk unit 5 is issued by a CPU110 of the personal computer 1, after the CPU110 determines that the two removable hard disks 3 in the disk unit 5 are not being accessed. Therefore, even if the user tries to eject the disk unit 5 by manipulating the input device for the personal computer 1, such as the keyboard, the disk unit 5 is not ejected, when either one of the two removable hard disks 3 is being accessed.

Figure 24:
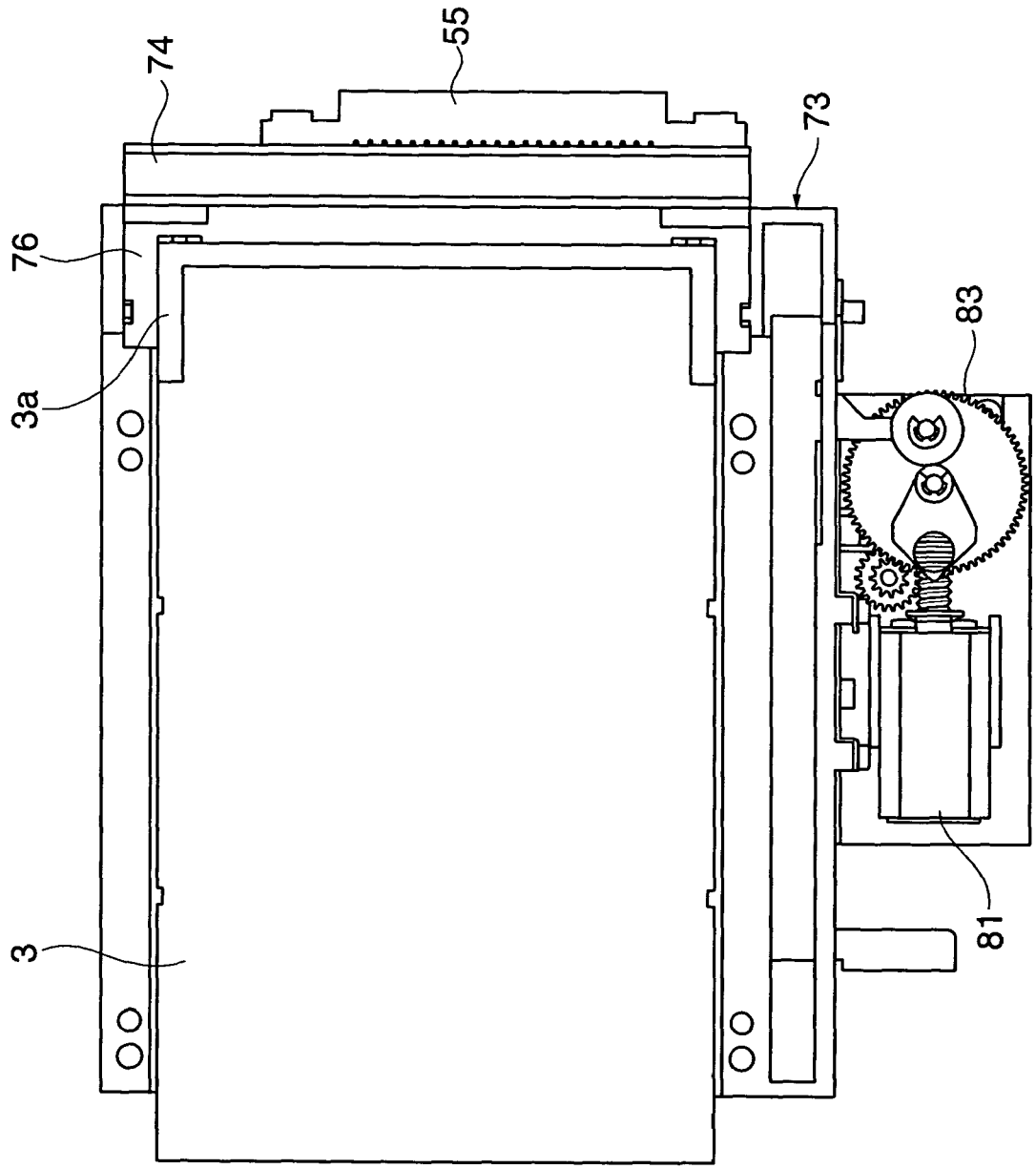
FIG. 24 is a side view showing the inside of the disk unit of FIG. 6, as viewed from a right side thereof.
Figure 25:
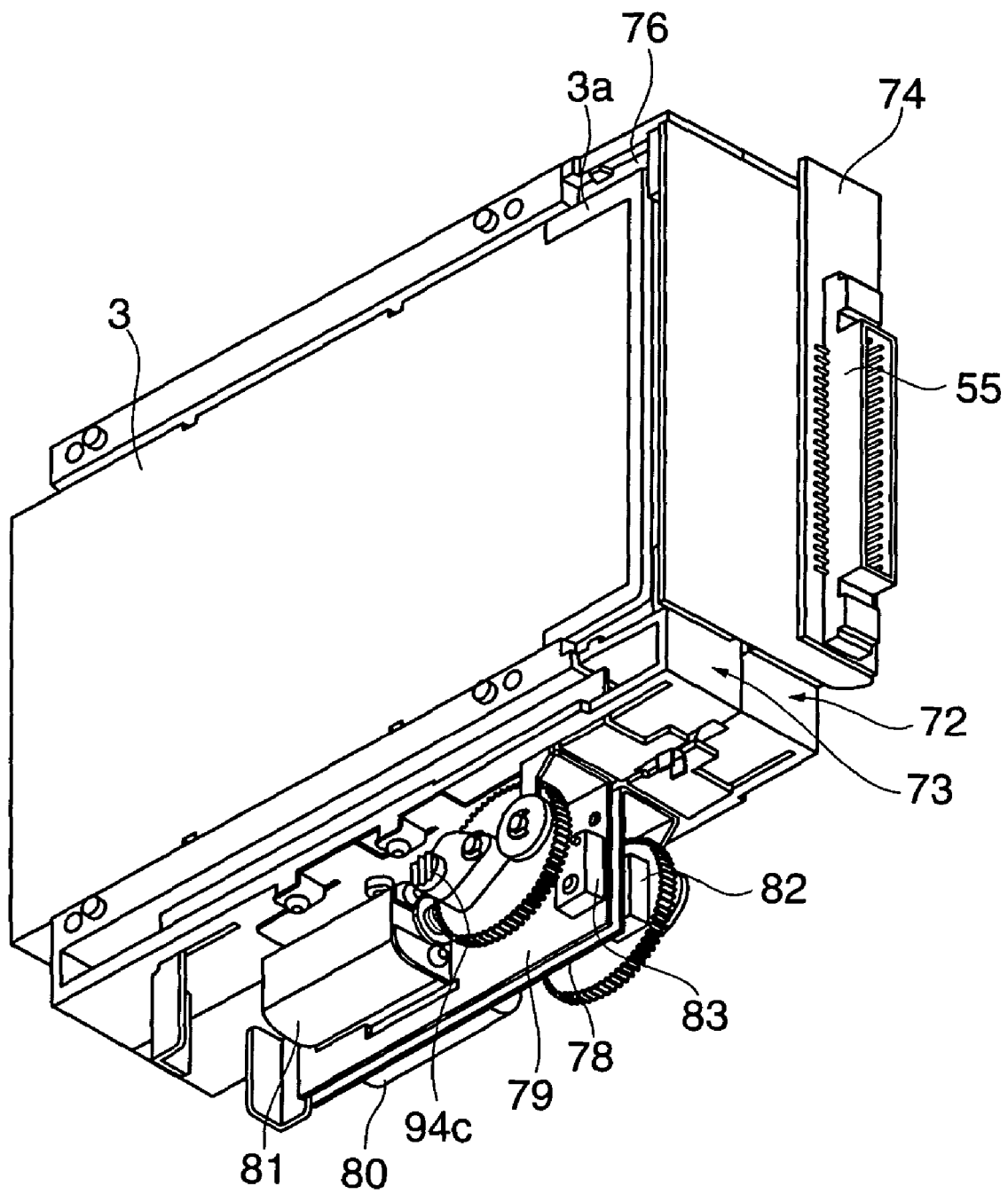
FIG. 25 is a perspective view showing the inside of the disk unit of FIG. 24, as viewed from below to the left on the back side thereof.
Figure 26:
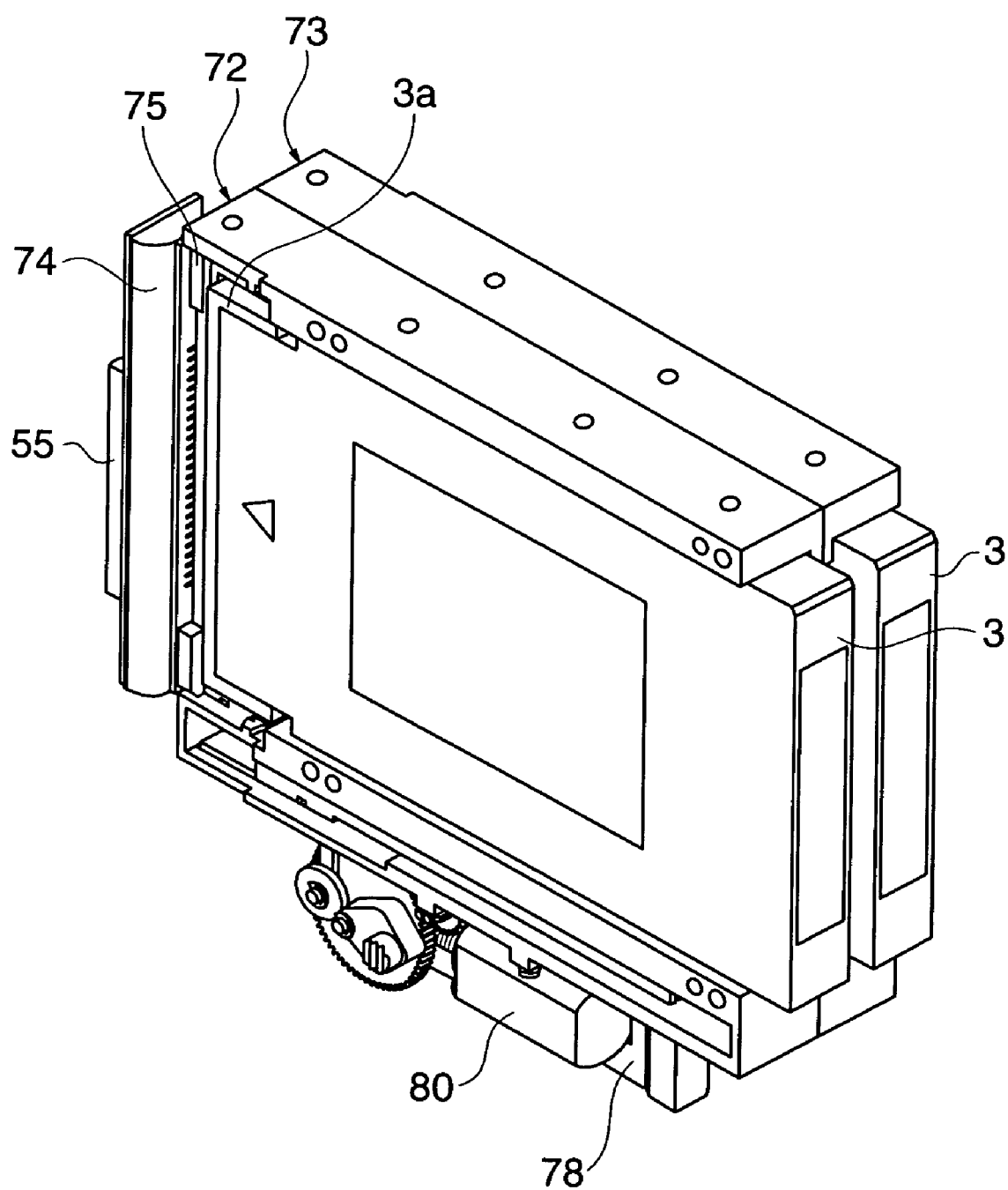
FIG. 26 is a perspective view showing the inside of the disk unit of FIG. 24, as viewed from above to the left on the front side thereof.

Next, the outlines of the internal construction of the disk unit 5 of FIG. 6, which accommodates 2.5-inch disks, and the ejection mechanism for the removable hard disk 3 will be described. FIGS. 24 to 26 are views showing the internal construction of the disk unit 5 of FIG. 6. FIG. 24 is a side view of the disk unit 5 of FIG. 6, as viewed from a right side thereof, while FIG. 25 is a perspective view of the disk unit 5 of FIG. 24, as viewed from below and to the left on the back side thereof. FIG. 26 is a perspective view of the disk unit 5 of FIG. 24, as viewed from above to the left on the front side.

In FIGS. 24 to 26, reference numerals 72 and 73 designate ejection units for ejecting the two removable hard disks 3, respectively, from within the disk unit 5 and are almost symmetrical in shape. The ejection units 72 and 73 are secured to the cover member 31 by the four screws 40 shown in FIG. 9 referred to before. Further, connectors 75, 76 are secured to the ejection units 72 and 73, respectively, and the connectors 75, 76 are soldered to a flexible printed circuit board 74. The connectors 75, 76 are electrically connected to connectors 3a of the removable hard disks 3. A connector 55 is also soldered to the flexible printed circuit board 74, and the connector 55 is secured to the cover member 31 by screws 77, as shown in FIG. 17, referred to before.

Reference numerals 78, 79 designate driver units for ejecting the two removable hard disks 3 and correspond to the ejection units 72, 73, respectively. A motor 80 and a switch 82, and a motor 81 and a switch 83 are provided for the driver unit 78 and the driver unit 79, respectively, and are electrically connected to the flexible printed circuit board 74 by lead wires, not shown. Further, the switch 6, shown in FIG. 1 and FIG. 2, for instructing the ejection of the removable hard disk 3 is also electrically connected to the flexible printed circuit board 74 by lead wires, not shown.

Next, the ejection mechanism for the removable hard disks 3 will be described in detail. As mentioned above, the ejection units 72 and 73 are almost symmetrical in shape. Therefore, the construction and operation will be described referring to the ejection unit 72 on the left hand side in FIG. 26 as an example.

Figure 27:
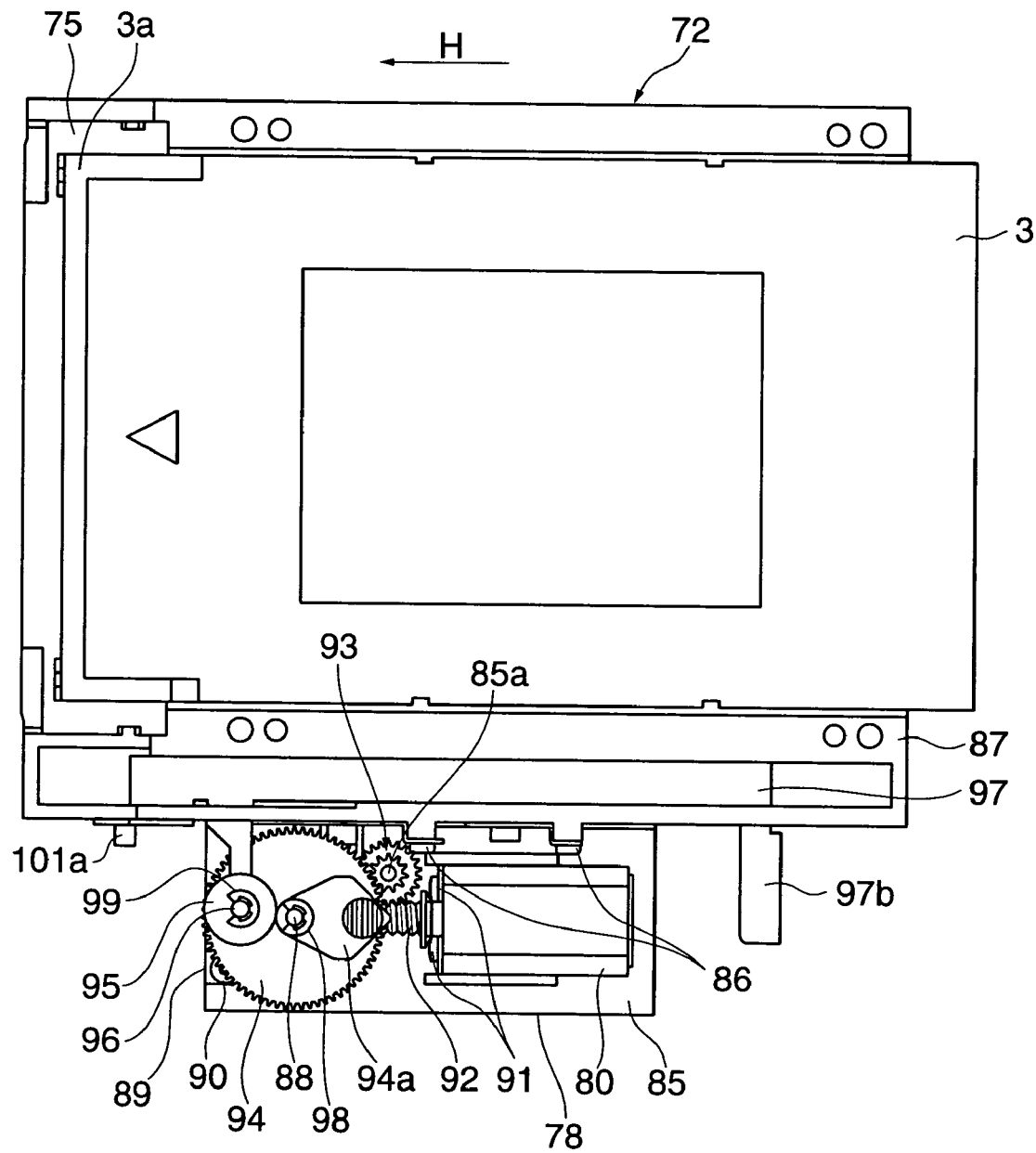
FIG. 27 is a side view of an ejection unit with the removable hard disk of FIG. 3 being attached, as viewed from a left side thereof.
Figure 28:
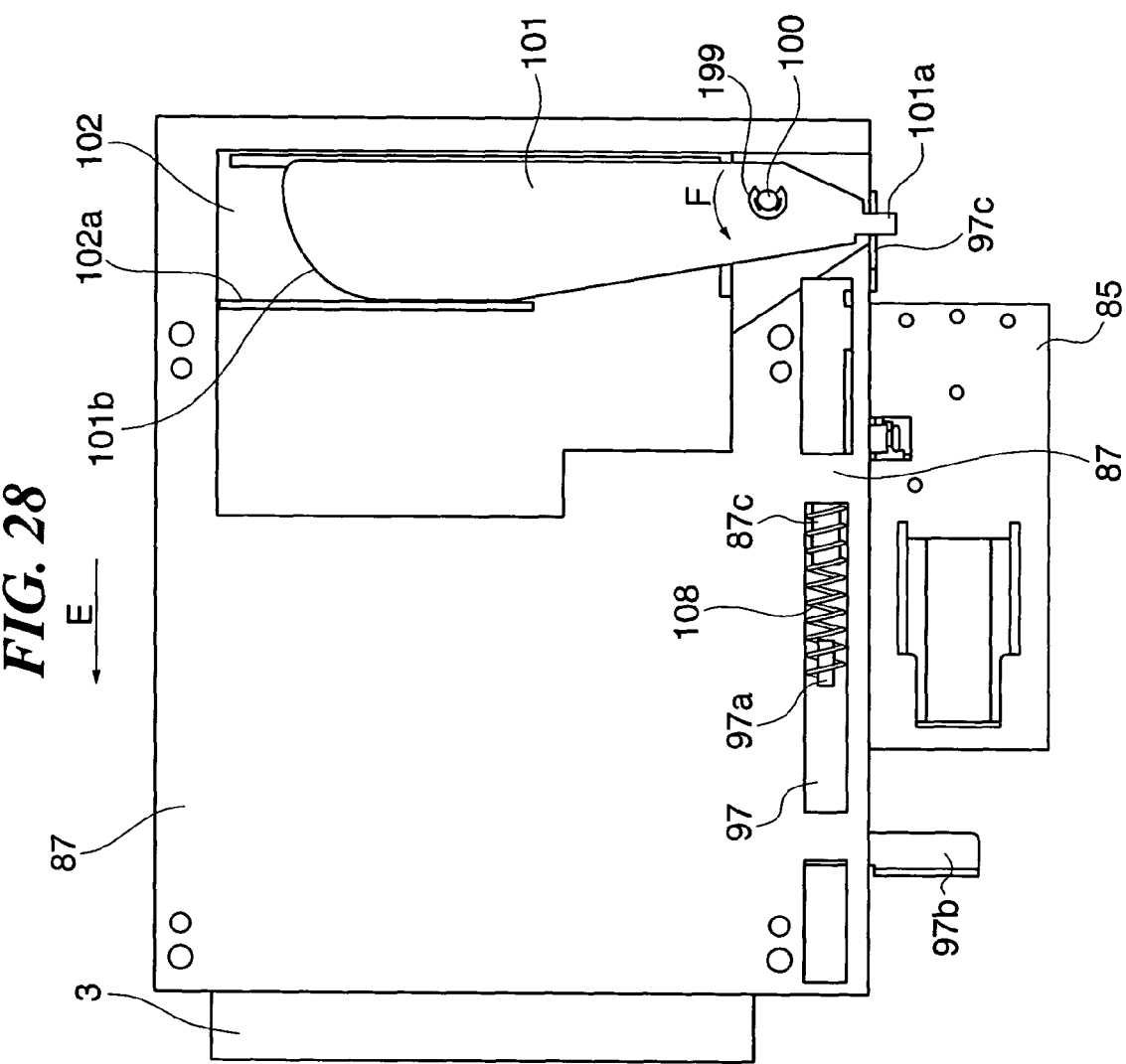
FIG. 28 is a side view showing the ejection unit of FIG. 27 with the removable hard disk being attached, as viewed from a right side thereof.
Figure 29:
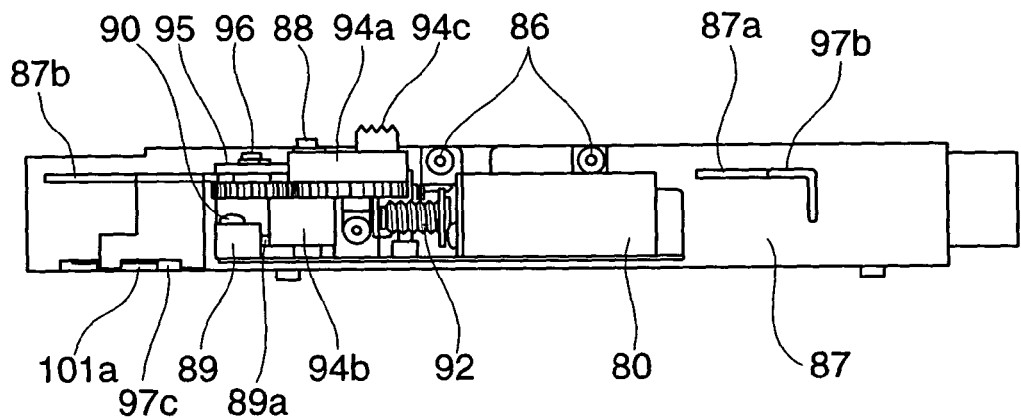
FIG. 29 is a bottom plan view showing the ejection unit of FIG. 27 with the removable hard disk being attached.
Figure 30:
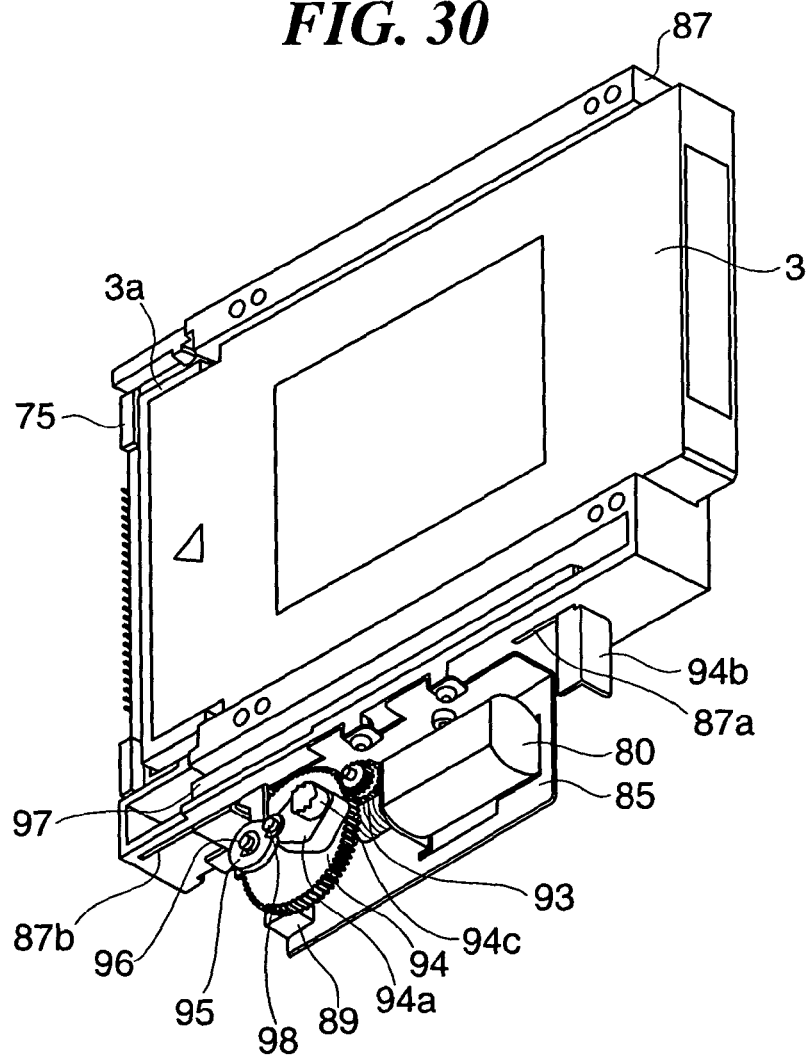
FIG. 30 is a perspective view showing the ejection unit with the removable hard disk of FIG. 27 being attached, as viewed from below to the left on the front side thereof.

FIGS. 27 to 30 show the removable hard disk 3 that is attached to the ejection unit 72 of FIG. 3. FIG. 27 is a side view of the ejection unit 72 of FIG. 3 with the removable hard disk 3 attached thereto, as viewed from the left side thereof, while FIG. 28 is a side view of the ejection unit 72 of FIG. 27 with the removable hard disk 3 attached thereto, as viewed from the right side thereof. FIG. 29 is a bottom plan view of the ejection unit 72 of FIG. 27 with the removable hard disk 3 attached thereto, while FIG. 30 is a perspective view of the ejection unit 72 of FIG. 27 with the removable hard disk 3 attached thereto, as viewed from below to the left on the front side thereof.

In FIGS. 27 to 30, the driver unit 78 has a base 85 secured to a socket 87 on which the removable hard disk 3 is mounted by screws 86. A switch 89 is secured to the base 85 by a screw 90, and the motor 80 is secured to the base 85 by screws 91. The motor 80 is composed of a pulse motor. A fulcrum shaft 85*a* and a fulcrum shaft 88 are also secured to the base 85. A worm gear 92 is press fitted into the body of the motor 80, and the worm gear 92 meshes with a gear 93, which is rotatably fitted on the fulcrum shaft 85*a*.

The gear 93 is a two-stage gear. A gear of the two-stage gear 93 that does not mesh with the worm gear 92 meshes with a gear 94 rotatably fitted on the fulcrum shaft 88. Cams 94*a* and 94*b* are disposed on both sides of the gear 94 and restrained from moving in a thrust direction by an E ring 98. It should be noted that in FIG. 29, the cam 94*b* is in a position in which a projecting part thereof urges a push button 89*a* of the switch 89 to hold the switch 89 ON.

A lever 97 is disposed in a space at a lower part of the socket 87 and is movable along, for example, grooves 87*a*, 87*b* formed in a bottom surface of the lower part of the socket 87. A fulcrum shaft 96 is secured to a projecting part of the lever 97. A roller 95 is rotatably fitted on the fulcrum shaft 96. The roller 95 is restrained from moving in a thrust direction by an E ring 99. The roller 95 is disposed in contact with a cam surface of the cam 94*a*, and the lever 97 is moved as the cam 94*a* rotates to cause the roller 95 to come into alternate contact with a projecting part and a non-projecting part of the cam 94*a*. As shown in FIG. 28, the lever 97 has a raised bent part 97*a*, into which is inserted one end of a spring 108. The other end of the spring 108 is fitted on a shaft 87*c* provided on the socket 87. With this arrangement, the roller 95 is always in urging contact with the cam surface of the cam 94*a*.

As shown in FIG. 28, a fulcrum shaft 100 is press fitted into the socket 87, and an arm 101 is fitted on the fulcrum shaft 100. The E ring 199 is fitted on the fulcrum shaft 100 to keep the arm 101 from falling off. A projection 101*a* is formed on one end of the arm 101 and is engaged in a recess 97*c* formed in the lever 97. An ejection member 102 is moveable in a direction indicated by an arrow E along a groove formed in the socket 87, not shown. A cam surface 101*b* of the arm 101 is disposed in contact with a bent part 102*a* of the ejection member 102. The ejection member 102 moves in the direction indicated by the arrow E as the arm 101 rotates in a direction indicated by an arrow F.

Next, the ejection operation of the removable hard disk 3 will be described.

Figure 31:
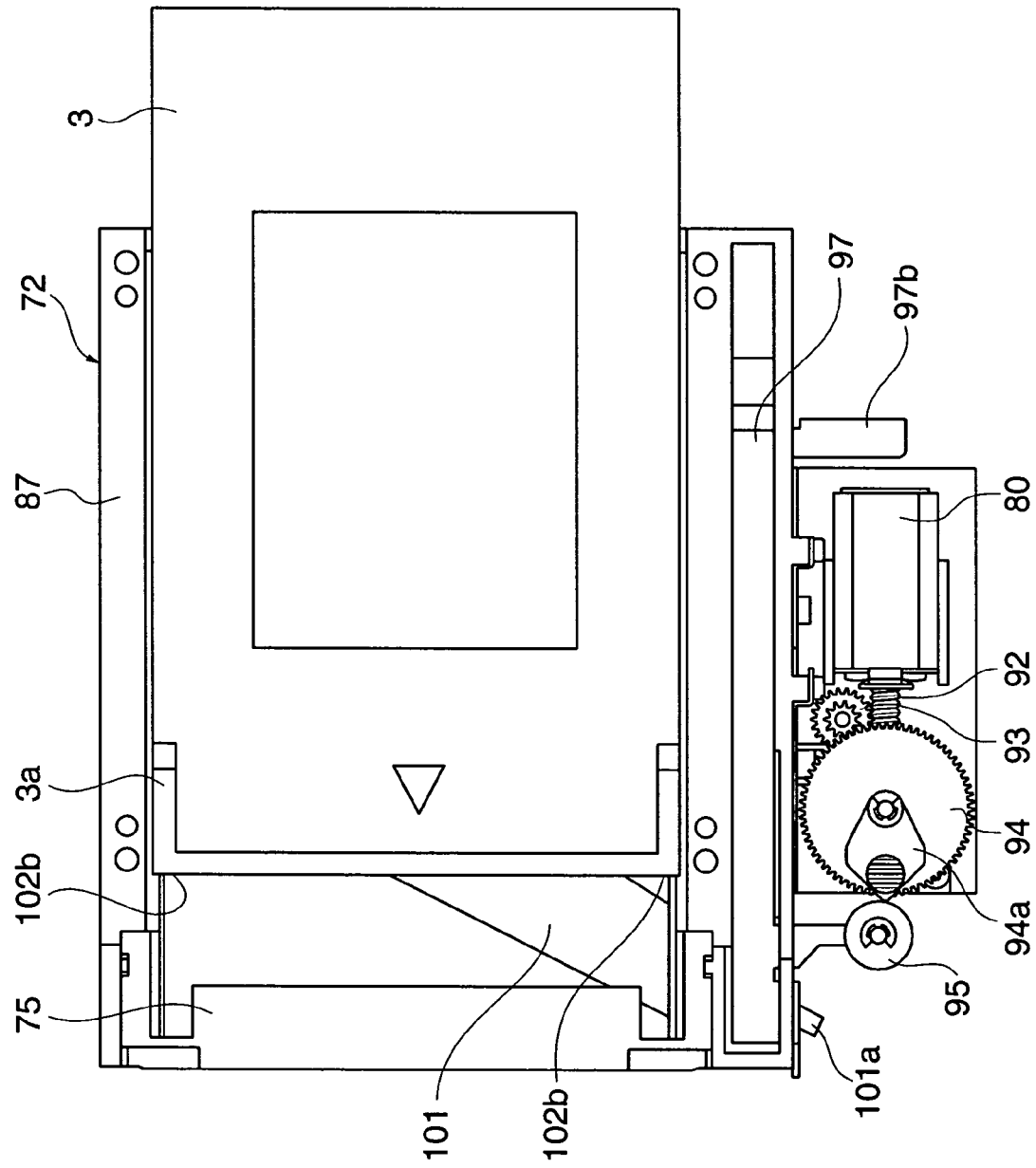
FIG. 31 is a side view showing the ejection unit of FIG. 30 with the removable hard disk being ejected, as viewed from a left side thereof.
Figure 32:
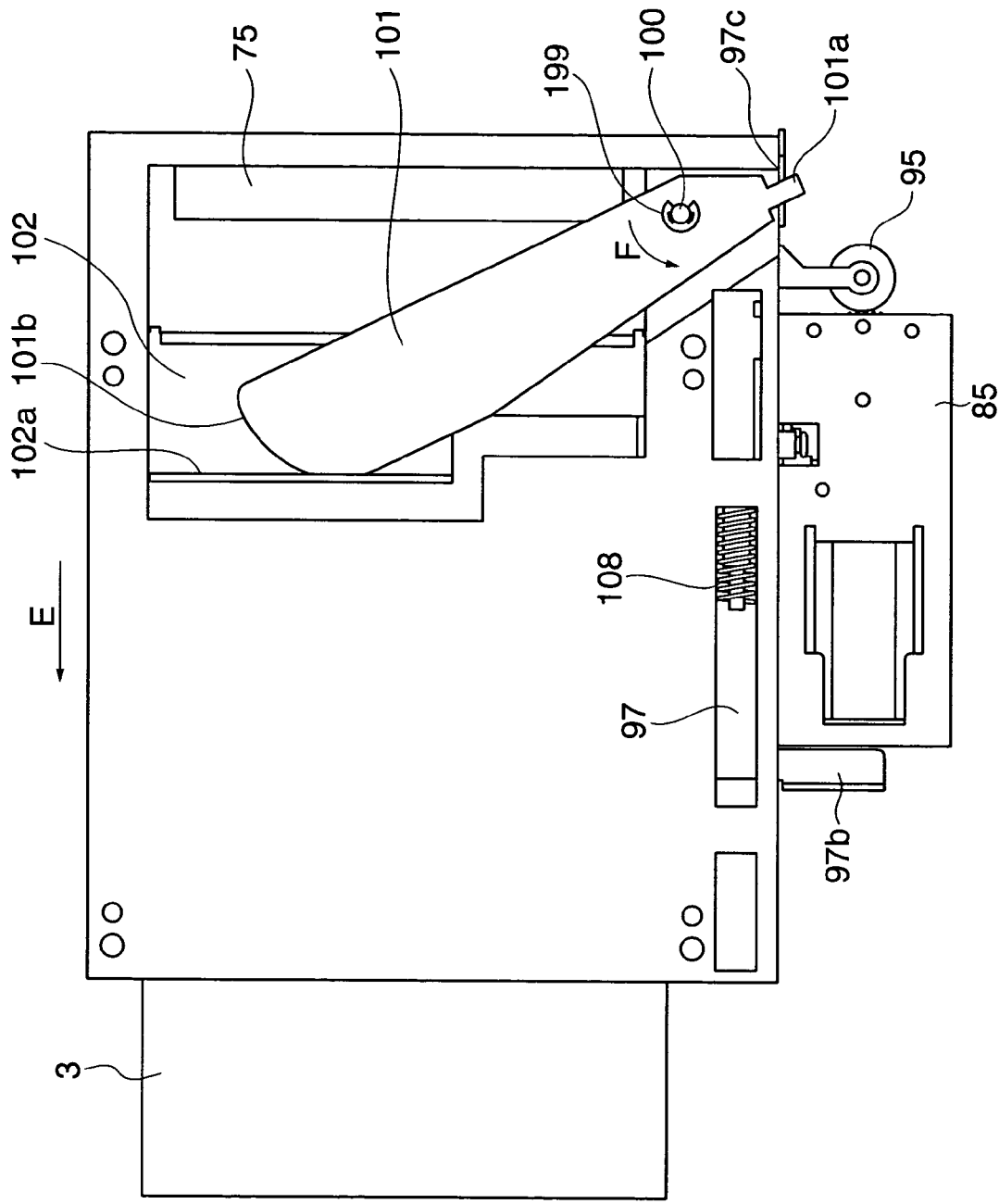
FIG. 32 is a side view showing the ejection unit of FIG. 30 with the removable hard disk being ejected, as viewed from a right side thereof.
Figure 33:
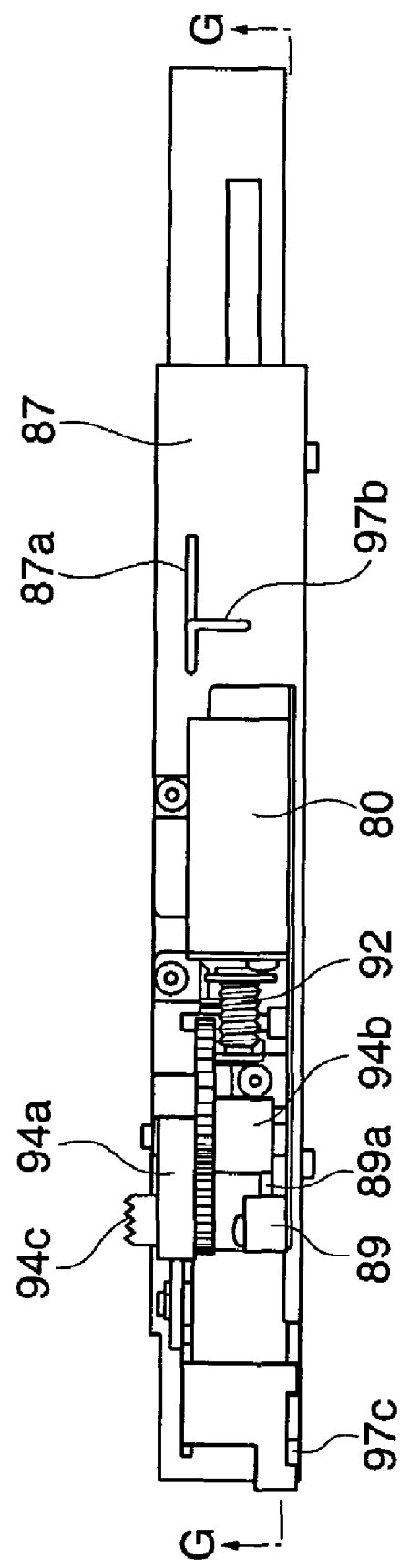
FIG. 33 is a bottom plan view showing the ejection unit of FIG. 30 with the removable hard disk being ejected.
Figure 34:
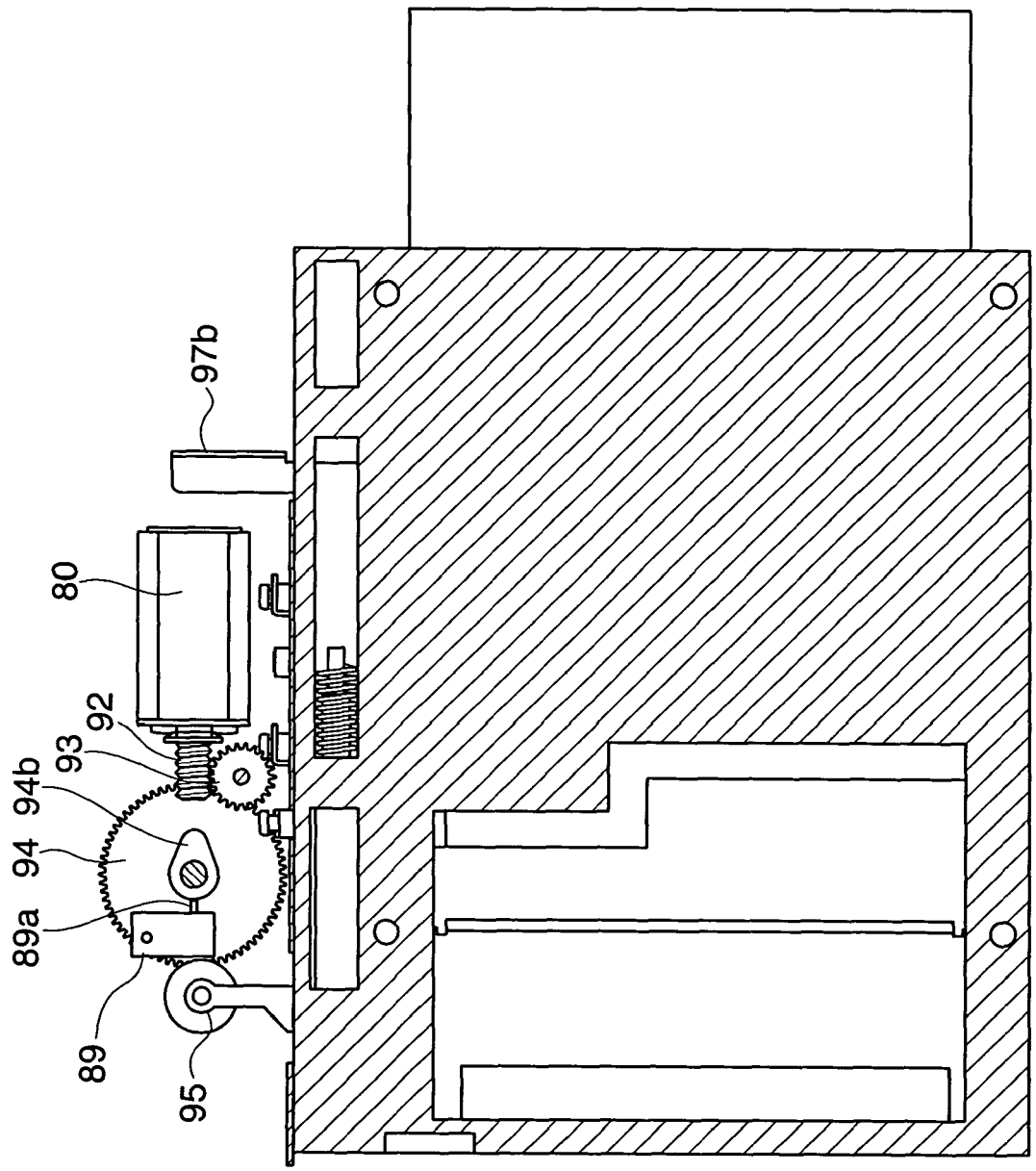
FIG. 34 is a cross sectional view taken along line G—G in FIG. 33.
Figure 35:
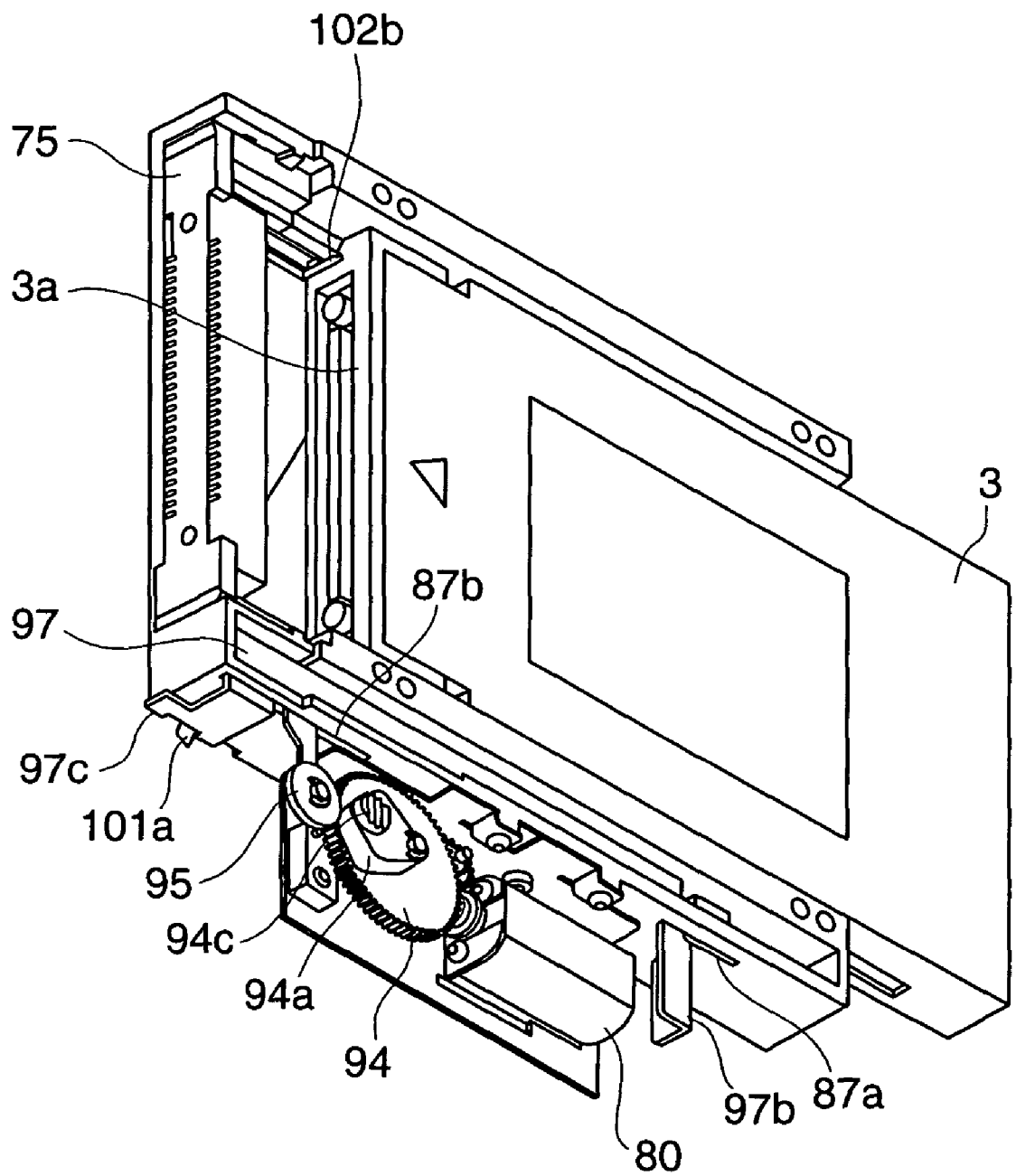
FIG. 35 is a perspective view showing the ejection unit of FIG. 30 with the removable hard disk being ejected, as viewed from below to the right on the back side thereof.

FIGS. 31 to 35 show the ejection unit 72 with the removable hard disk 3 ejected therefrom. FIG. 31 is a side view of the ejection unit 72 of FIG. 30 with the removable hard disk 3 that has been ejected, as viewed from a left side thereof, while FIG. 32 is a side view of the ejection unit 72 with the removable hard disk 3 that has been ejected, as viewed from a right side thereof. FIG. 33 is a bottom plan view of the ejection unit 72 with the removable hard disk 3 that has been ejected, while FIG. 34 is a cross sectional view taken along line G—G in FIG. 33. FIG. 35 is a perspective view of the ejection unit 72 with the removable hard disk 3 that has been ejected, as viewed from below to the right on a back side thereof.

As shown in FIGS. 31 to 35, the gear 94 rotates by 180 degrees with a rotation of the motor 80, and the cam 94*a* urgingly displaces the roller 95 and accordingly the lever 97 also is urged to be displaced. Consequently, the projection 101*a* of the arm 101, which is engaged in the recess 97*c* of the lever 97, is also urged to be displaced, so that the arm 101 rotates in the direction indicated by the arrow F to make the ejection member 102 move in the direction indicated by the arrow E, whereby the bent part 102*a* of the ejection member 102 makes an urging action on the removable hard disk 3 to eject the same. As shown in FIGS. 33 and 34, the switch 89 is OFF at this time.

In an actual operation, when the CPU110 (see FIG. 39) of the personal computer 1 issues an ejection instruction for ejecting, for example, the removable hard disk 3 on the left hand side, out of the two removable hard disks 3,3 that are attached to the disk unit 5, the gear 94 is rotated by 180 degrees, then further continue to rotate without stopping, and stops after a predetermined amount of rotation after the switch 89 is turned on, thus completing a sequence of operations.

The ejection instruction for the removable hard disk 3 on the left hand side by the CPU110 of the personal computer 1 is issued when the CPU110 determines that the removable hard disk 3 on the left hand side is not being accessed. Therefore, while the removable hard disk 3 on the left hand side is being accessed, the user is not able to automatically eject the removable hard disk 3 on the left hand side from the disk unit 5 by manipulating the input device, such as the keyboard for the personal computer 1, or by pressing the switch 6 on the front side of the disk unit 5. Similarly, the user is not be able to automatically eject the removable hard disk 3 on the right hand side, while it is being accessed.

Furthermore, as shown in FIGS. 1 and 2, the user cannot forcibly pull out the removable hard disk 3 from the disk unit 5 when the disk unit 5 is attached to the personal computer 1, because the removable hard disk 3, when attached to the disk unit 5, is positioned such that its outer surface lies inwardly of the outer surface of the front cover member 32 of the disk unit 5. In the present embodiment, however, the disk unit 5 is configured such that the removable hard disk 3, when attached to the disk unit 5, can be manually ejected from the disk unit 5 when the disk unit 5 is removed from the personal computer 1. A mechanism for performing this will be described next.

Figure 36:
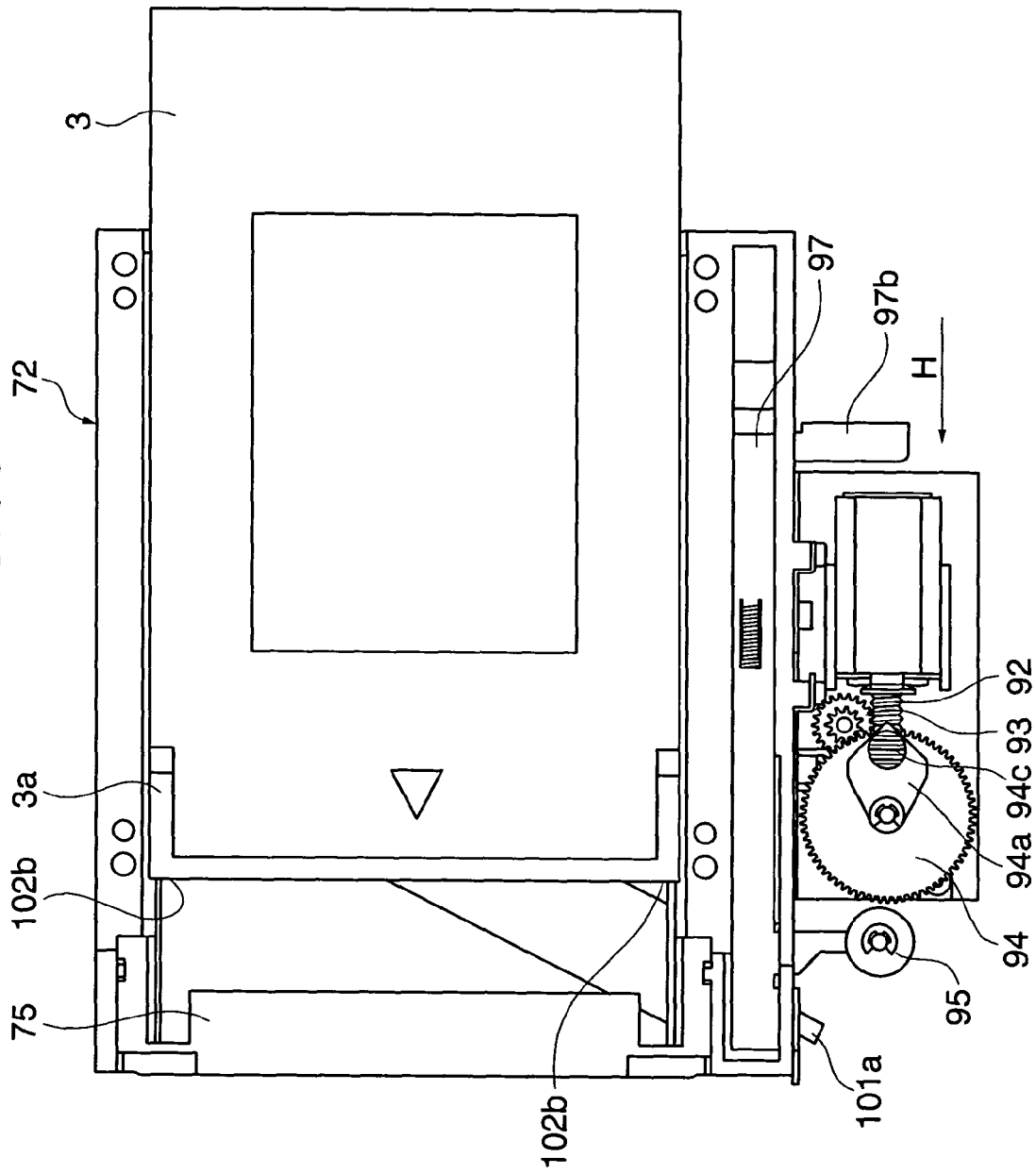
FIG. 36 is a side view showing the ejection unit of FIG. 27 with the removable hard disk that has been manually removed, as viewed from a left side thereof.

FIG. 36 is a side view of the ejection unit 72 of FIG. 27 with the removable hard disk 3 manually removed from the disk unit 5, as viewed from a left side thereof. As shown in FIGS. 27 and 31, the lever 97 normally moves as it comes into alternate contact with the projecting part and the non-projecting part of the cam 94*a* as the cam 94*a* rotates. When a force is applied to the lever 97 in a direction for compressing the spring 108 while the lever 97 is moving from a position shown in FIG. 28 to a position shown in FIG. 32, the lever 97 can be moved in a direction indicated by an arrow H in FIG. 36. When a bent part 97*b*, which is formed integrally on the lever 97, is pushed in the direction indicated by the arrow H from the position shown in FIG. 27 into the position shown in FIG. 36, the removable hard disk 3 is ejected.

On the other hand, as shown in FIGS. 8, 9, 13, the ejection holes 35 and 36 are formed in the cover member 30 and the cover member 31 of the disk unit 5 at positions corresponding to the bent part 97*b* of the lever 97. Therefore, when the disk unit 5 is removed from the personal computer 1, then the removable hard disk 3 can be manually ejected from the disk unit 5 by pressing the bent part 97*b* through the ejection holes 35 and 36 in the direction for compressing the spring 108.

Further, when the disk unit 5 is thus removed from the personal computer 1, the removable hard disk 3 is shut off from electric connection to the personal computer 1, and therefore the removable hard disk 3 can be safely ejected from the disk unit 5. Furthermore, even in the event that the removable hard disk 3 cannot be automatically ejected from the disk unit 5 due to some failure, the removable hard disk 3 can still be manually ejected from the disk unit 5 by first removing the disk unit 5 from the personal computer 1.

According to the present embodiment, as mentioned before, two removable hard disks 3 can be loaded into the disk unit 5. In the case where one of the removable hard disks 3 fails, the user can find out which of the removable hard disks 3 has failed by looking at the display device, such as a CRT display, provided for the personal computer 1, which may indicate, for example, a "C drive failure," or a "D drive failure." However, the user may not be able to easily determine which of the two removable hard disks 3 is the C drive, and which is the D drive, when attempting to replace the failed removable hard disk 3. To address this issue, the present embodiment provides a means for displaying which of the two removable hard disks 3 has failed, as described below, with only a negligible additional cost.

Next, an operation that takes place when, for example, the removable hard disk 3 on the left hand side fails, will be described.

Figure 37:
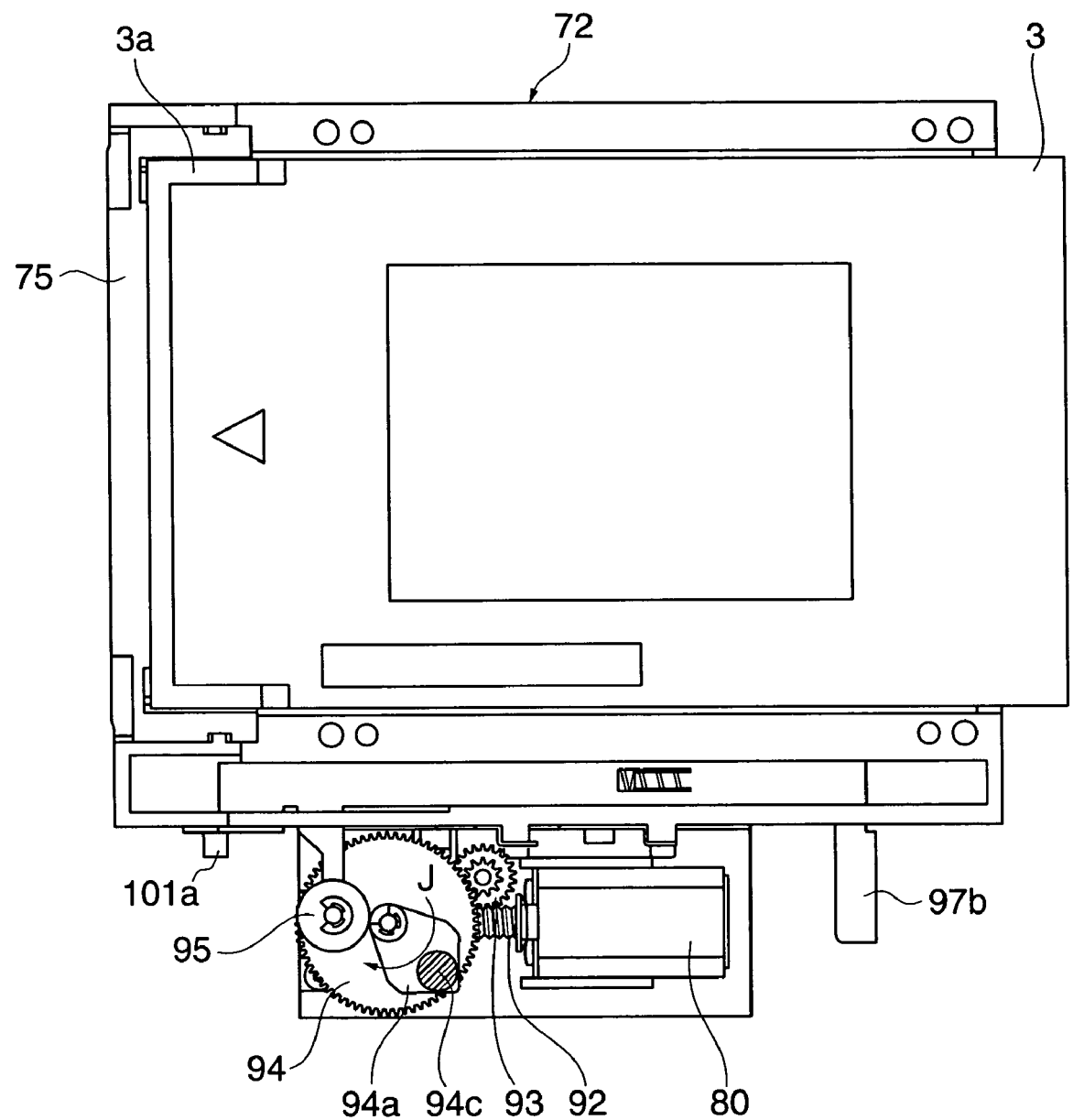
FIG. 37 is a side view showing the ejection unit of FIG. 27 when the removable hard disk on the left hand side has failed, as viewed from a left side thereof.
Figure 38:
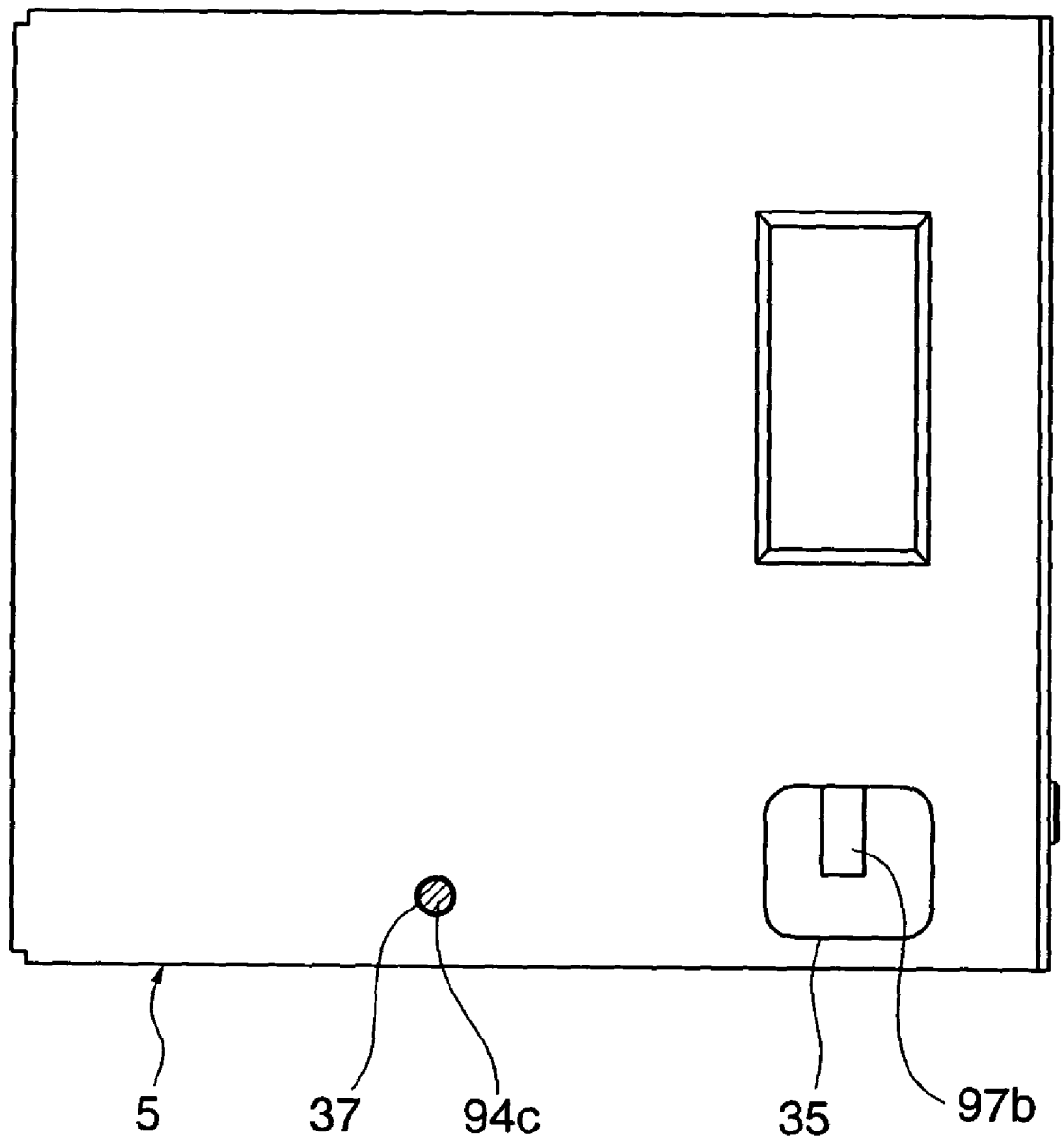
FIG. 38 is a side view of the disk unit of FIG. 27 when the removable hard disk on the left hand side has failed, as viewed from a left side thereof.

FIG. 37 is a side view of the ejection unit 72 of FIG. 27, as viewed from a left side thereof when the removable hard disk 3 on the left hand side has failed. FIG. 38 shows a side view of the disk unit 5 of FIG. 27, as viewed from a left side thereof when the removable disk drive 3 on the left hand side has failed.

When the removable hard disk 3 on the left hand side fails, the CPU110 (see FIG. 39) of the personal computer 1 detects the failure, and issues a rotation instruction to the motor 80 to rotate the gear 94 by 45 degrees in a direction indicated by an arrow J. The gear 94 is rotated by 45 degrees with the rotation of the motor 80, into a position as shown in FIG. 37. In FIG. 37, a cylindrical projecting part 94c is formed on a surface of the cam 94a, which has a surface thereof formed with saw-toothed indentations. FIG. 38 shows the disk unit 5 with the ejection unit 72 being in the condition shown in FIG. 37, in which the projecting part 94c is seen through the failure indicator hole 37. That is, because the projecting part 94c being seen through the failure indicator hole 37, the user knows that it is the removable hard disk 3 on the left hand side that has failed.

Further, when the removable hard disk 3 on the left hand side fails, the CPU110 of the personal computer 1 issues an ejection instruction. In other words, the ejection command is a command for rotating the motor 80 until the removable hard disk 3 is ejected from the disk unit 5. Specifically, the CPU controls the motor 80 to further rotate by 135 degrees in the direction indicated by the arrow J from the position into which the gear 94 has been rotated by 45 degrees, to bring the removable hard disk 3 into a position shown in FIG. 31. Thus, upon issuance of the ejection command, the removable hard disk 3 is automatically ejected from the ejection unit 72 in the disk unit 5.

While the failure indication for the removable hard disk 3 on the left hand side has been described in the present embodiment, the same structural means is provided for the failure indication for the removable hard disk 3 on the right hand side. As shown in FIG. 9, for example, an identical failure indicator hole 38 is also formed in the right side surface of the disk unit 5. As shown in FIG. 25, for example, an identical projecting part 94c is also provided on the side of the ejector unit 73. Therefore, the user can instantly determine which of the removable hard disks 3 has failed by looking at the failure indicator holes 37 and 38 on both sides of the disk unit 5. While the surface of the projecting part 94c has saw-toothed indentations in the present embodiment, the surface of the projecting part 94c may be colored in a loud color or may have applied thereon a sticker with a loud color.

Figure 39:
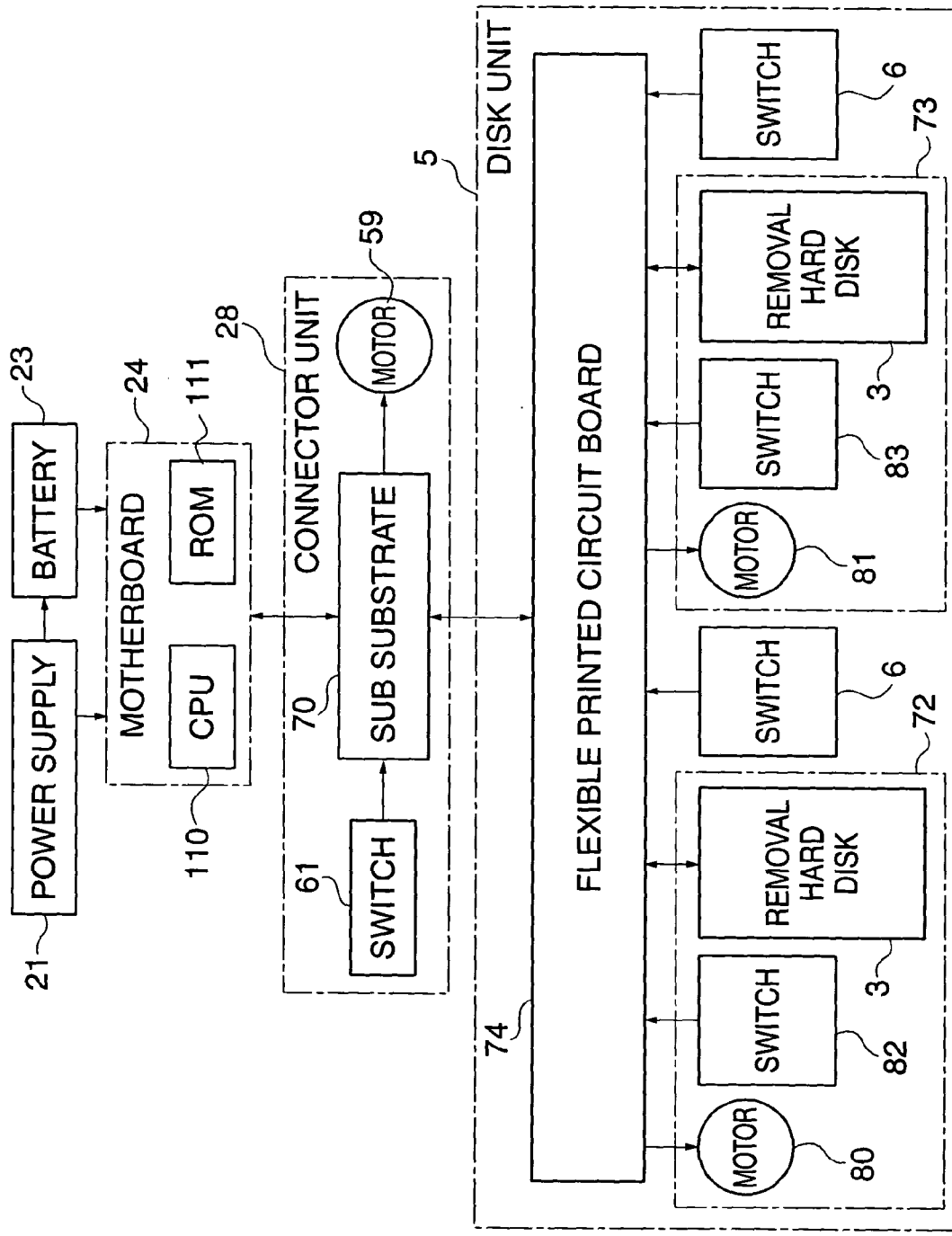
FIG. 39 is a block diagram schematically showing the electrical configuration of the personal computer of FIG. 1.

Next, the outlines of the electrical configuration of the personal computer 1 will be described by referring to FIG. 39 which is a block diagram schematically showing the electrical configuration of the personal computer 1 of FIG. 1.

The personal computer 1 includes the power supply 21, the battery 23, the motherboard 24, the connector unit 28, the disk unit 5, the input device, not shown, that includes the keyboard and the mouse, and the display device (not shown).

The motherboard 24 includes the CPU110 and a ROM111. The connector unit 28 is comprised of the motor 59, the switch 61, and the sub substrate 70. The disk unit 5 is comprised of the flexible printed circuit board 74, the ejection unit 72 on the left hand side, which includes the motor 80 and the switch 82 and is used for ejecting the removable hard disk 3 on the left hand side, the ejection unit 73 on the right hand side, which includes the motor 81 and the switch 83 and is used for ejecting the removable hard disk 3 on the right hand side, the switch 6 for the removable hard disk on the left hand side, and the switch 6 for the removable hard disk on the right hand side.

The power supply 21 supplies power to the motherboard 24 and the battery 23. The battery 23 is a so-called uninterruptible power supply, that is capable of temporarily supplying power to the motherboard 24 when there is a power failure or when the power supply plug of the personal computer 1 is pulled out of a socket, while the personal computer 1 is in operation. By using the battery 23 of this type, even if there is a power failure while the personal computer 1 is in operation, the personal computer 1 does not stop operating until after a normal process has been completed. Consequently, a power failure does not result in, for example, destruction or loss of data.

The CPU110 on the motherboard 24 operates as the brain of the personal computer 1 to make various determinations. Further, the CPU110 controls the ejection of the disk unit 5 from the connector unit 28 as well as the ejection of the removable hard disks 3 from the disk unit 5 by issuing ejection commands. The CPU110 performs writing data to and reading data from the removable hard disks 3. Furthermore, in the present embodiment, an operating apparatus (OS) is stored in the ROM111 on the motherboard 24 so that various processes can be performed even when the removable hard disks 3 are removed from the disk unit 5.

The sub substrate 70 in the connector unit 28 receives power supplied from the motherboard 24 and exchanges data with the motherboard 24. Further, the motor 59, as a driver for ejecting the disk unit 5 from the personal computer 1, and the switch 61 for controlling the rotation of the motor 59 are connected to the sub substrate 70.

The flexible printed circuit board 74 in the disk unit 5 receives power supplied from the sub substrate 70 and exchanges data with the sub substrate 70. The two removable hard disks 3, as removable electronic devices, and the motor 80, the motor 81, the switch 82, and the switch 83, which are for ejecting the removable hard disks 3, are connected to the flexible printed circuit board 74. Further, the switches 6, 6 for instructing the ejection of the two removable hard disks 3 are also connected to the flexible printed circuit board 74.

With the above arrangement, the CPU110 of the personal computer 1 issues a lock release command for releasing the lock between the disk unit 5 and the connector unit 28, removal commands for removing the disk unit 5 from the connector unit 28 and for removing the removable hard disk 3 from the disk unit 5, controls the operation of the motor 59, which drives the locking mechanism and the ejection mechanism for the disk unit 5, as well as the motor 80 and the motor 81, which drive the ejection units 72, 73, respectively, for the two removable hard disks 3, 3, respectively, and writes and reads data to and from the removable hard disks 3.

As described above, the information processing apparatus of the present embodiment is comprised of the internal connector unit 28 provided in a personal computer 1, and the disk unit 5, which can be removably attached to the connector unit 28 and is electrically connected to the connector unit 28 when attached to the connector unit 28, the disk unit 5 being configured such that the removable hard disks 3 can be removably attached to the disk unit 5 and are electrically connected with the disk unit 5 when the removable hard disks 3 are attached to the disk unit 5. When the disk unit 5 is attached to the connector unit 28, and the removable hard disks 3 are attached to the disk unit 5, the disk unit 5 cannot be removed from the connector unit 28, and the removable hard disks 3 cannot be removed from the disk unit 5, while the removable hard disks 3 are in operation. As a result, it is possible to solve the problem with the prior art that one or both of the removable hard disks are removed while the removable hard disks are in operation, which leads to unfavorable results. Further, the information processing apparatus according to the present embodiment is simple in construction and flexible in function.

Furthermore, the removable hard disks 3 can be removed from the disk unit 5 when the disk unit 5 is removed from the connector unit 28, and hence the removable hard disks 3 can be safely exchanged.

Furthermore, the disk unit 5 remains hidden inside the personal computer 1 when the disk unit 5 is attached to the connector unit 28. Besides, when the disk unit 5 is removed from the connector unit 28, the recesses 33 and 34 become exposed externally on the disk unit 5, so that the user can easily carry the disk unit 5 by hand when the disk unit 5 is removed from the connector unit 28, thus facilitating handling of the disk unit 5.

Moreover, the locking mechanism (the locking claw 52 of the connector unit 28 and the square hole 68 of the disk unit 5) locks together the connector unit 28 and the disk unit 5 when the disk unit 5 is attached to the connector unit 28, and releases the lock when an ejection command for releasing the lock is issued. As a result, the disk unit 5 cannot be inadvertently removed from the connector unit 28.

Still further, the ejection mechanism (the ejection lever 51 on the connector unit 28), for ejecting the disk unit 5 from the connector unit 28 when an ejection command is issued with the disk unit 5 attached to the connector unit 28, can prevent the disk unit 5 from being inadvertently removed from the connector unit 28 in a similar manner as the locking mechanism described above.

Furthermore, the locking mechanism for locking the disk unit 5 with the connector unit 28 and the ejection mechanism for ejecting the disk unit 5 are driven by a single driver (the motor 59 of the connector unit 28). As a result, the locking mechanism and the ejection mechanism can be realized without increasing the number of component parts.

Further, the disk unit 5 can accommodate a plurality of removable hard disks 3, and thus the personal computer 1 is flexible in function.

Furthermore, out of the plurality of removable hard disks 3 that are attached to the disk unit 5, the removable hard disk 3 that is not in operation can be removed, and hence the removable hard disk 3 can be safely exchanged.

Still further, the disk unit 5 includes the display means (the failure indicator holes 37, 38 and the projecting parts 94c) for indicating which of the removable hard disks 3 has failed, and the display means retains the failure indication even when the disk unit 5 has been removed from the connector unit 28, when one of the plurality of removable hard disks 3 which are attached to the disk unit 5 fails. As a result, the user can immediately determine which of the removable hard disks 3 has failed.

Still further, the second drivers (the motor 80 and the motor 81) for driving the ejection units 72, 73, respectively, for ejecting the respective removable hard disks 3, are also provided for controlling the failure display means described above. As a result, the failure indication for the removable hard disks 3 can be carried out without increasing the number of component parts.

Further, the removable hard disks 3 are positioned with their outer surfaces thereof lying inwardly of the outer surface of the disk unit 5 to which the removable hard disks 3 are attached. As a result, the user cannot forcibly pull out the removable hard disks 3 to impair the same.

While in the first embodiment described above, the failure of the removable hard disk 3 is addressed by indicating the failure through the failure indicator holes 37, 38 in the disk unit 5, the method of addressing the failure is not limited to such a method.

A second embodiment of the present invention will be described next.

According to the present embodiment, when the CPU110 of the personal computer 1 detects a failure in either of the removable hard disks 3, then the CPU110 issues an ejection command for ejecting the failed removable hard disk 3, so that the actually failed removable hard disk 3 is ejected by the ejection mechanism.

More specifically, the disk unit 5 includes the ejection mechanisms (the ejection units 72 and 73) for ejecting the removable hard disks 3 corresponding to the respective ejection mechanisms from the disk unit 5. When one of the plurality of removable hard disks 3 fails, the ejection unit corresponding to the failed removable hard disk 3 ejects the failed removable hard disk 3 from the disk unit 5 upon issuance of an ejection command. As a result, there is no need to manually remove the failed removable hard disk 3, thus improving the usability.

Next, a third embodiment of the present invention will be described. While the disk unit 5 in the first embodiment has a structure for allowing two removable hard disks 3 to be attached thereto.

The number of removable hard disks 3 that can be attached is not limited to two. Instead, the disk unit 5 can accommodate any number of removable hard disks 3. Further, the electronic device that can be attached to or removed from the disk unit 5 is not limited to the removable hard disk and may include, for example, a CD-RW unit or a DVD unit or any combination of such.

Next, a fourth embodiment of the present invention will be described. In the first embodiment, as shown in FIG. 37 and FIG. 38, when the removable hard disk 3 fails, the cam 94a corresponding to the failed removable hard disk 3 is rotated by 45 degrees in the direction indicated by the arrow J, so that the failure of that particular removable hard disk 3 is confirmed through the failure indicator hole 37 in the disk unit 5. The present embodiment, on the other hand, provides a structure for enabling confirmation of the failure on the front side of the disk unit 5.

Figure 40:
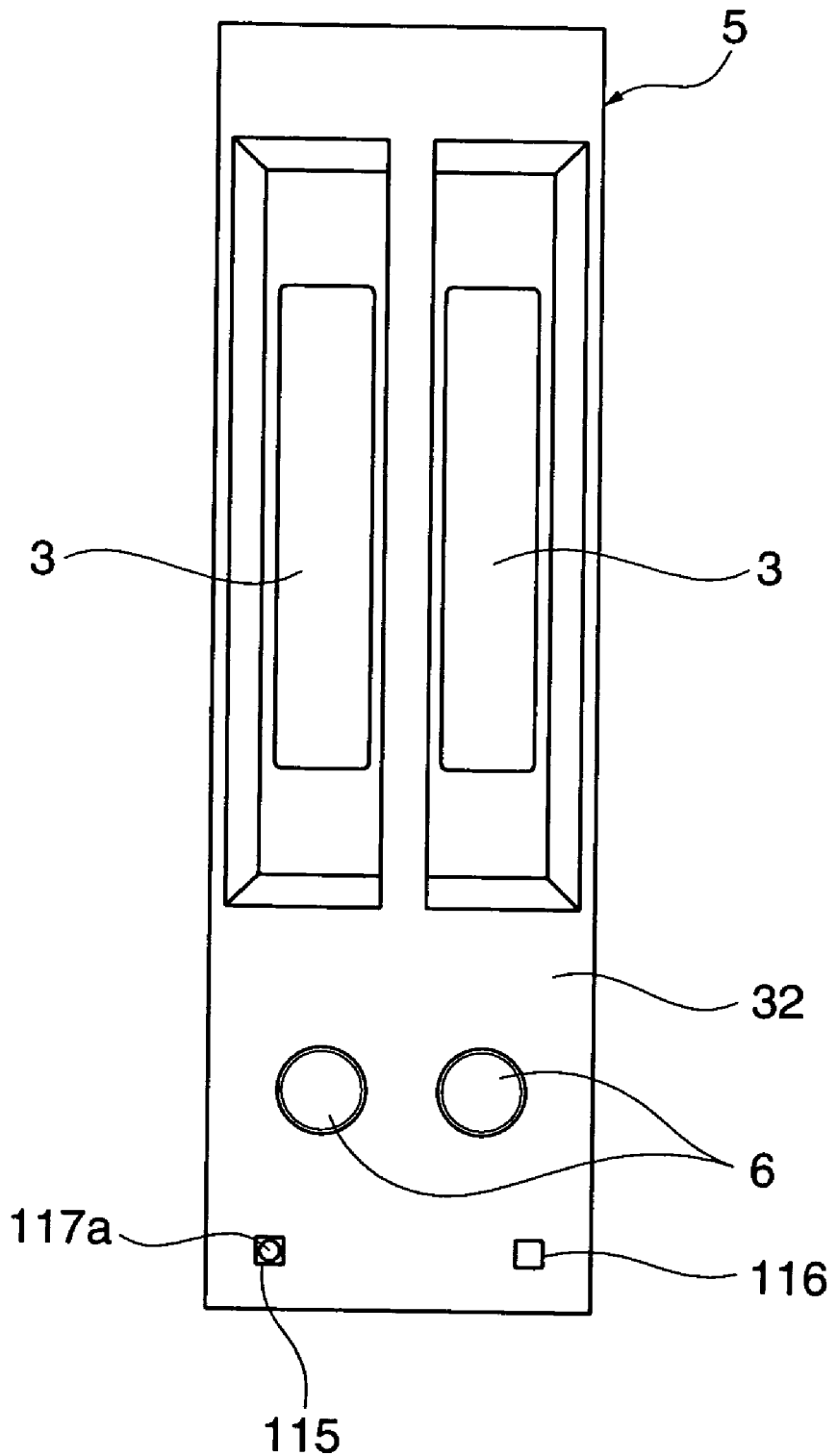
FIG. 40 is a front view schematically showing a disk unit as an electronic apparatus according to a fourth embodiment of the present invention.
Figure 41:
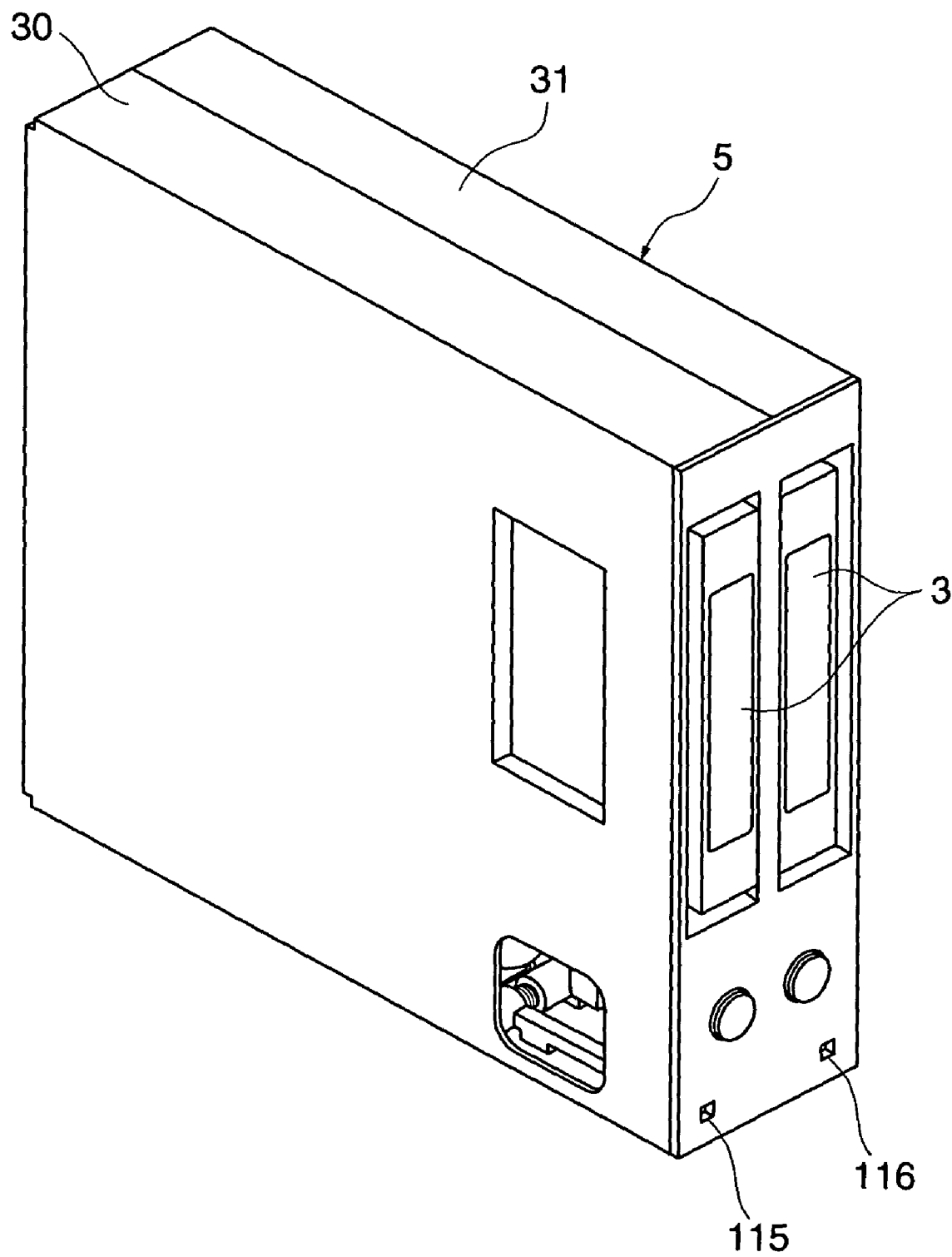
FIG. 41 is a perspective view of the disk unit of FIG. 40, as viewed from above to the left on the front side thereof.
Figure 42:
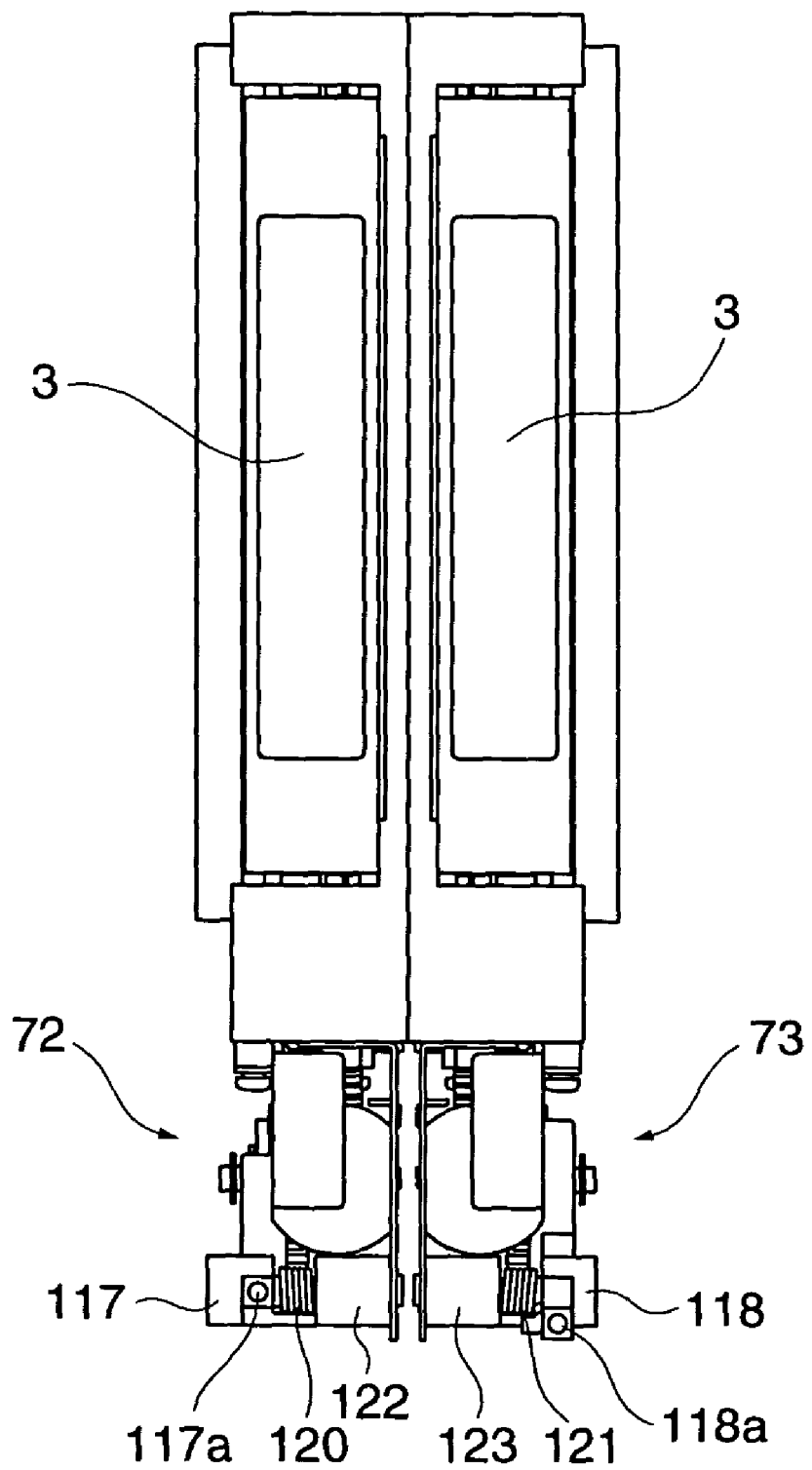
FIG. 42 is a front view showing the internal structure of the disk unit of FIG. 40.
Figure 43:
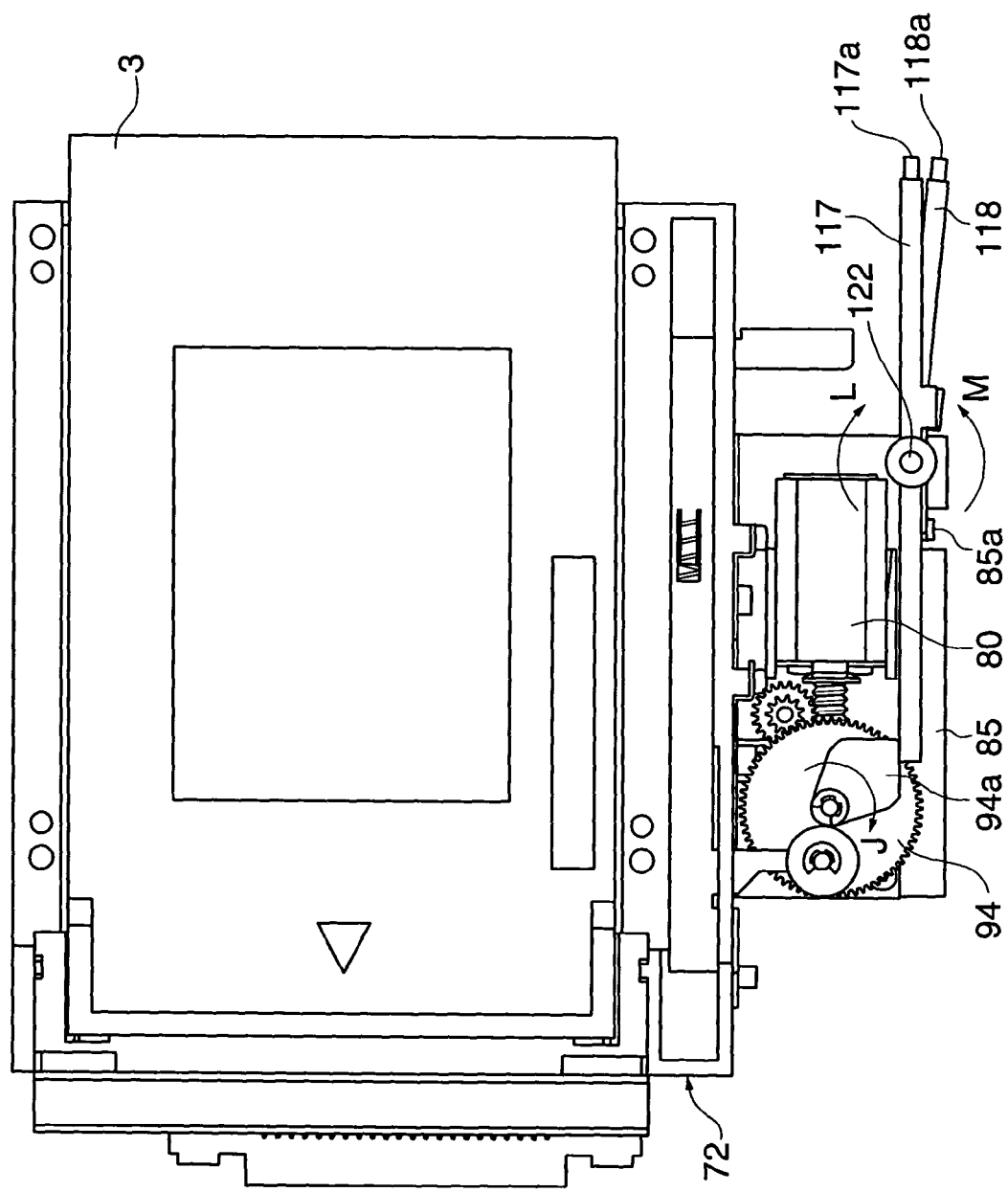
FIG. 43 is a side view showing the inside of the disk unit of FIG. 42, as viewed from a left side thereof.
Figure 44:
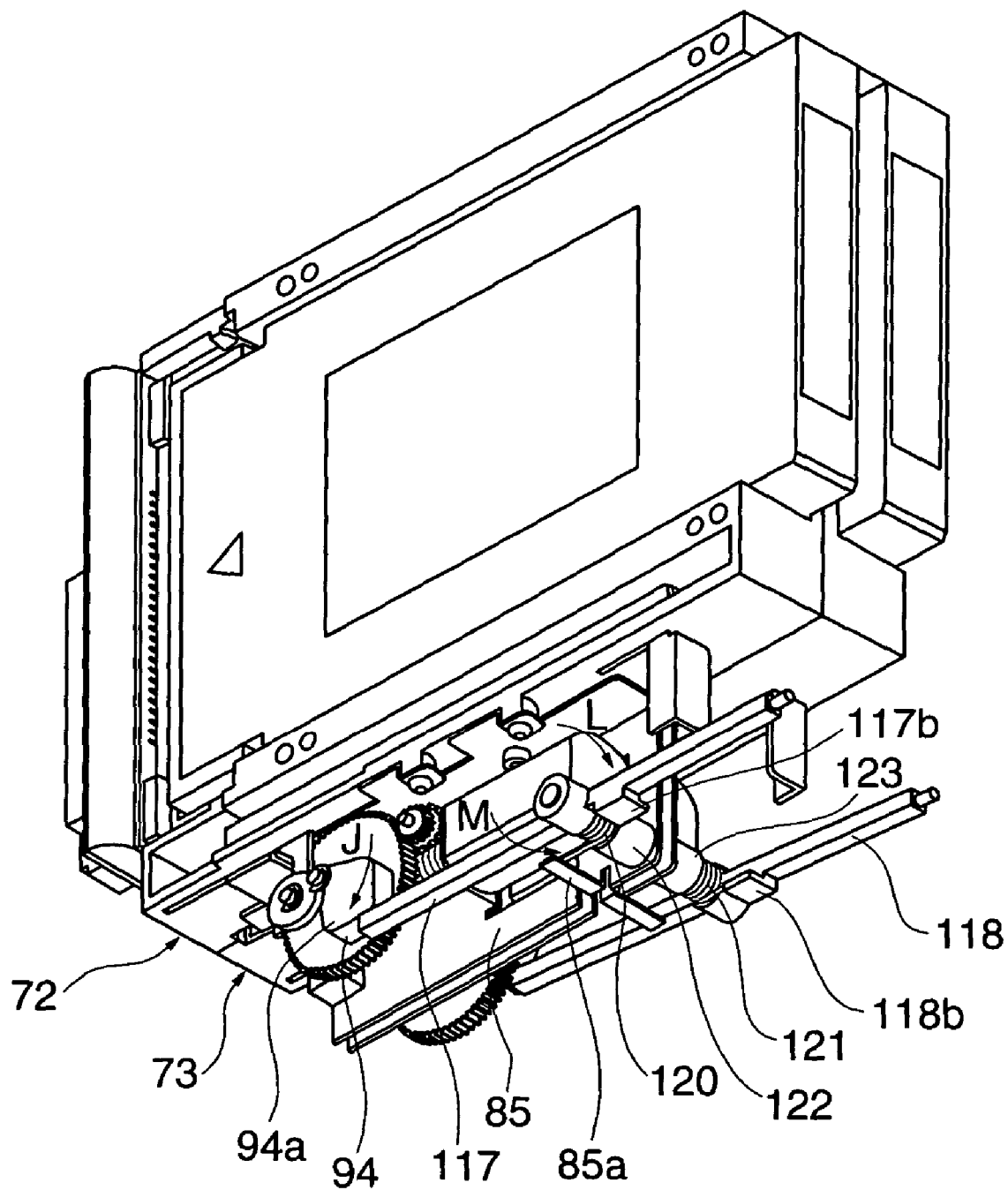
FIG. 44 is a perspective view of the inside of the disk unit of FIG. 43, as viewed from below to the left on the front side thereof.
Figure 45:
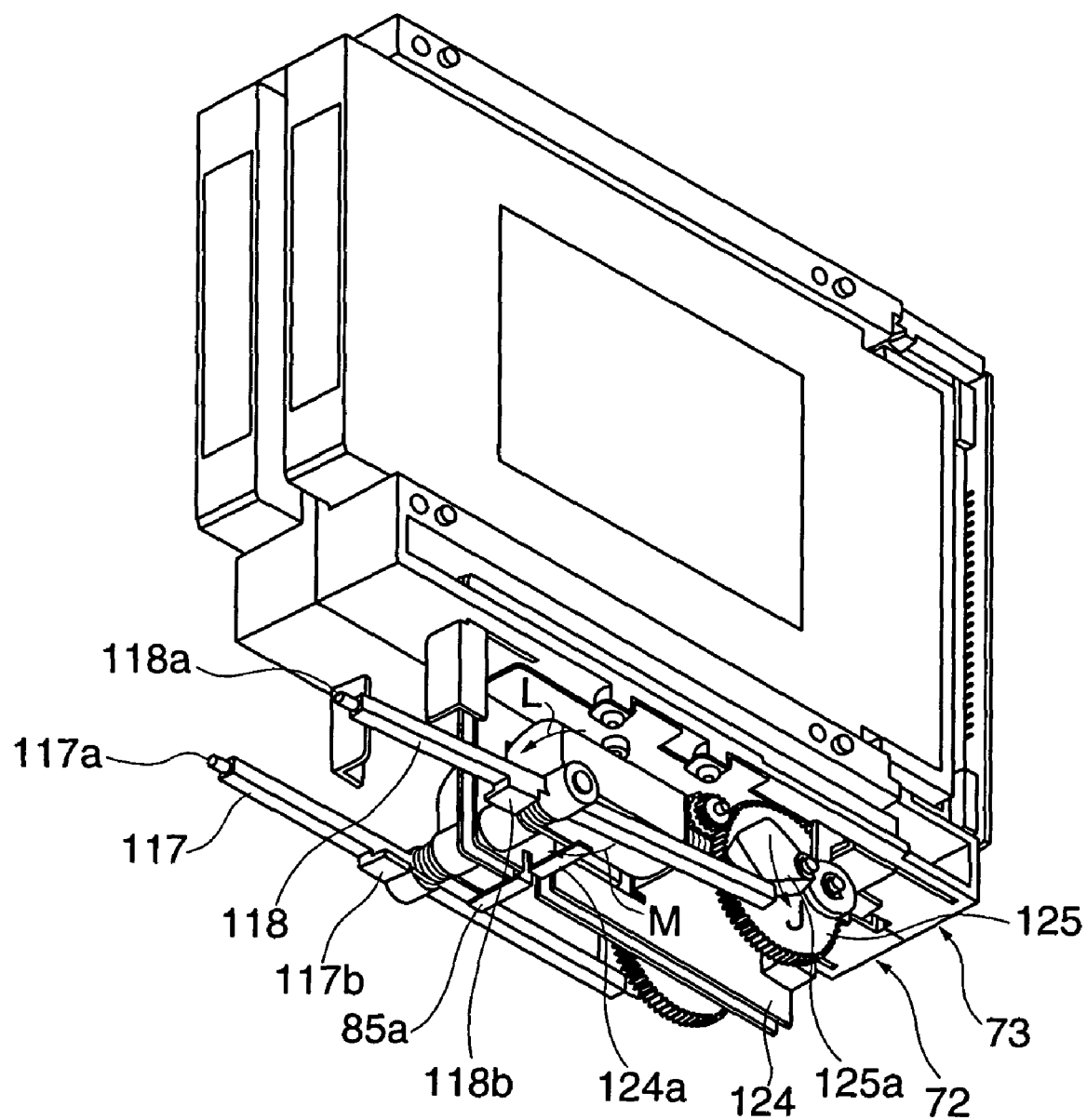
FIG. 45 is a perspective view of the inside of the disk unit of FIG. 43, as viewed from below to the right on the front side thereof.

FIGS. 40 and 41 schematically show the disk unit 5 as an electronic apparatus of the present embodiment. FIG. 40 is a front view showing the disk unit 5 as the electronic apparatus of the present embodiment, while FIG. 41 is a perspective view showing the disk unit 5 of FIG. 40, as viewed from above to the left on the front side thereof. Further, FIGS. 42 through 45 are diagrams showing the internal structure of the disk unit 5 of FIG. 40. FIG. 42 is a front view showing the internal structure of the disk unit 5 of FIG. 40, while FIG. 43 is a side view showing the inside of the disk unit 5 of FIG. 42, as viewed from the left side thereof. FIG. 44 is a perspective view showing the inside of the disk unit 5 of FIG. 43, as viewed from below to the left on the front side thereof, while FIG. 45 is a perspective view showing the inside of the disk unit 5 of FIG. 43, as viewed from below to the right on the front side thereof.

Elements and parts in FIG. 40 through FIG. 45, that are similar to those of the first embodiment described before, are designated by identical reference numerals.

As shown in FIGS. 40 and 41, the front cover member 32 of the disk unit 5 has formed therein failure indicator holes 115 and 116, which correspond to the two removable hard disks 3, respectively. In the illustrated example, the removable hard disk 3 on the left hand side has failed. As shown in FIG. 40, a circular projection 117*a* is seen through the failure indicator hole 115 on the left hand side.

Next, the internal construction of the disk unit 5 will be described. Since the ejection units 72, 73 of the right and the left of the disk unit 5 are mostly symmetrical in shape, the following description refers mainly to the ejection unit 72 on the left hand side.

As shown in FIG. 42 through FIG. 45, a fulcrum shaft 122 is secured to the base 85 of the ejection unit 72 on the left hand side. A lever 117 is rotatably fitted on the fulcrum shaft 122, and the lever 117 has a tip end thereof formed with a cylindrical projection 117*a*.

Further fitted on the fulcrum shaft 122 is a spring 120, which has an end thereof supported by a raised bent part 85*a* of the base 85 and the other end thereof supported by the projection 117*b* of the lever 117. Consequently, the lever 117 receives a force in a direction indicated by an arrow L. Furthermore, a base end of the lever 117 is disposed in contact with the cam 94*a*. When the cam 94*a* rotates as the motor 80 rotates and the lever 117 gets out of contact with the cam surface of the cam 94*a*, the rotation of the lever 117 is restricted by the inner surface of the cover member 30 (see FIG. 41). Further, the inner surface of the cover member 30 also restricts the lever 117 in a thrust direction to the left.

The cam 94*a* of the ejection unit 72 on the left hand side is seen to have rotated by 45 degrees in the direction indicated by the arrow J, compared with the position of a cam 125*a* of the ejection unit 73 on the right hand side. Further, the lever 117 of the ejection unit 72 on the left hand side is seen to have rotated by 5 degrees in a direction indicated by an arrow M, compared with the position of a lever 118 of the ejection unit 73 on the right hand side, such that the projection 117*a* is in such a position that the projection 117*a* is visible through the failure indicator hole 115. Therefore, as in the first embodiment, when one of the removable hard disks 3 fails, the CPU110 of the personal computer 1 detects the failure and causes the cam of the ejection unit corresponding to the failed removable hard disk 3 to rotate by 45 degrees so as to position the projection at the corresponding failure indicator hole to thereby indicate the failure.

While in the embodiments described above, a plurality (two in the above embodiments) of electronic devices of the same type (for example, removable hard disks) are removably attached to the disk unit 5 of the personal computer 1, the present invention is not limited to these embodiments. The present invention may be also applied to a case where a plurality of electronic devices of different types such as CD-ROM and a TV tuner that are removably attached to the disk unit 5.

While in the embodiments described above, the information processing apparatus implemented by a personal computer, the present embodiment is not limited to an information processing apparatus for a specific application and may be also applied information processing apparatuses for various applications, such as a workstation.

What is claimed is:

1. An electronic apparatus comprising:
   a main body;
   a receiving unit that is removably attached to said main body and receives at least one removable electronic device removably attached thereto to permit the removable electronic device to be selectively ejected from the receiving unit;
   a locking device that locks together said receiving unit and said main body; and
   a controller that controls said locking device to inhibit said receiving unit and said main body from being released from a state in which they are locked together while the removable electronic device is in operation.

2. An electronic apparatus as claimed in claim 1, comprising an electronic device removing device that removes the removable electronic device from said receiving unit, and wherein said controller controls said electronic device removing device to inhibit the removable electronic device from being removed from said receiving unit while the removable electronic device is in operation.

3. An electronic apparatus as claimed in claim 1, comprising a connector unit provided in said main body, and wherein said receiving unit is removably attached to said connector unit, said locking device locks together said receiving unit and said connector unit, and said controller controls said locking device to inhibit said receiving unit from being removed from said connector unit together while the removable electronic device is in operation.

4. An electronic apparatus as claimed in claim 3, wherein said receiving unit has formed therein at least one recess at such a location that the recess is hidden inside said main body when said receiving unit is attached to said connector unit, and is exposed externally when said receiving unit is removed from said connector unit.

5. An electronic apparatus as claimed in claim 3, wherein said locking device comprises a locking mechanism that locks together said connector unit and said receiving unit when said receiving unit is attached to said connector unit, said locking mechanism being responsive to a lock release command from said controller, for releasing locking of said connector unit and said receiving unit.

6. An electronic apparatus as claimed in claim 3, comprising a unit removing device that is responsive to a removal command from said controller, for removing said receiving unit from said connector unit, when said receiving unit is attached to said connector unit.

7. An electronic apparatus as claimed in claim 6, wherein said controller controls said unit removing device to inhibit said receiving unit from being removed from said connector unit while the removable electronic device is in operation.

8. An electronic apparatus as claimed in claim 7, comprising a single driver that drives said locking device and said unit removing device.

9. An electronic apparatus as claimed in claim 3, wherein the removable electronic device is configured such that the removable electronic device can be removed from said receiving unit when said receiving unit is removed from said connector unit.

10. An electronic apparatus as claimed in claim 3, wherein the removable electronic device comprises a plurality of removable electronic devices of a same type or of different types.

11. An electronic apparatus as claimed in claim 10, comprising a plurality of electronic device removing devices that are provided in association with respective ones of the plurality of removable electronic devices, for removing the respective removable electronic devices from said receiving unit, and wherein said controller controls any of the removable electronic device removing devices to enable a corresponding one of the removable electronic devices that is not in operation to be removed from said receiving unit.

12. An electronic apparatus as claimed in claim 10, comprising a display device that displays an indication as to which of the plurality of removable electronic devices attached to said receiving unit has failed in a case where any of the removable electronic devices fails, and said display device continues displaying the indication even after said receiving unit is removed from said connector unit.

13. An electronic apparatus as claimed in claim 12, comprising a plurality of electronic device removing devices that are provided in association with respective ones of the plurality of removable electronic devices, for removing the respective removable electronic devices from said receiving unit, and wherein said controller issues a removal command to any of the removable electronic device removing device corresponding to any of the removable electronic devices that has failed, for removing the failed removable electronic device from said receiving unit.

14. An electronic apparatus as claimed in claim 13, comprising a single driver that drives said removable electronic device removing devices and said display device.

15. An electronic apparatus as claimed in claim 3, wherein said removable electronic device is positioned such that outer surfaces thereof lie inwardly of an outer surface of said receiving unit on a side thereof at which the removable electronic devices are attached to said receiving unit.

16. An information processing apparatus comprising:
an electronic apparatus comprising:
a main body;
a receiving unit that is removably attached to said main body and receives at least one removable electronic device removably attached thereto to permit the removable electronic device to be selectively ejected from the receiving unit;
a locking device that locks together said receiving unit and said main body; and
a controller that controls said locking device to inhibit said receiving unit and said main body from being released from a state in which they are locked together while the removable electronic device is in operation.

* * * * *